US011483252B2

(12) United States Patent
Marshall et al.

(10) Patent No.: US 11,483,252 B2
(45) Date of Patent: *Oct. 25, 2022

(54) CONTROLLING DISTRIBUTION OF RESOURCES ON A NETWORK

(71) Applicant: AirWatch LLC, Atlanta, GA (US)

(72) Inventors: John Marshall, Atlanta, GA (US); Erich Stuntebeck, Atlanta, GA (US); Gopinath Jayaprakash, Atlanta, GA (US); John Joseph Manton, Atlanta, GA (US); Jonathon Blake Brannon, Atlanta, GA (US)

(73) Assignee: AirWatch, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/163,735

(22) Filed: Feb. 1, 2021

(65) Prior Publication Data

US 2021/0184986 A1    Jun. 17, 2021

Related U.S. Application Data

(63) Continuation of application No. 16/535,845, filed on Aug. 8, 2019, now Pat. No. 10,951,541, which is a
(Continued)

(51) Int. Cl.
*H04L 12/911* (2013.01)
*G06F 21/31* (2013.01)
(Continued)

(52) U.S. Cl.
CPC .............. *H04L 47/70* (2013.01); *G06F 21/31* (2013.01); *G06F 21/6218* (2013.01);
(Continued)

(58) Field of Classification Search
CPC ................ G06F 21/6218; G06F 21/31; G06F 2221/2111; H04L 63/101; H04L 63/08;
(Continued)

(56) References Cited

U.S. PATENT DOCUMENTS

| 4,679,226 A | 7/1987 | Muehleisen |
| 5,237,614 A | 8/1993 | Weiss |

(Continued)

FOREIGN PATENT DOCUMENTS

| CA | 2149337 | 6/1994 |
| EP | 2675137 | 12/2013 |

(Continued)

OTHER PUBLICATIONS

Anonymous: "can you download free apps without apple id | Official Apple Support Communities (1st question and answer)", May 5, 2012 (May 5, 2012), XP055335582, Retrieved from the Internet: URL:https://discussions.apple.com/thread/3928236?start=0&tstart=0 [retrieved on Jan. 16, 2017].

(Continued)

*Primary Examiner* — Abdullahi E Salad
(74) *Attorney, Agent, or Firm* — Thomas | Horstemeyer, LLP

(57) ABSTRACT

Disclosed are various embodiments for controlling a distribution of resources on a network. In one example, among others, a system is configured to transmit a request to access a plurality of resources at a distribution service and receive the plurality of resources and a plurality of location rules. The system is also configured to determine an authorized location and an authorized perimeter area based on the plurality of location rules. The authorized location and the authorized perimeter area are determined to have different access rights to the plurality of resources. The system is further configured to determine a location of the computing device and grant access to a resource based on the location of the computing device with respect to the authorization location or the authorized perimeter.

20 Claims, 18 Drawing Sheets

Related U.S. Application Data continuation of application No. 15/620,922, filed on Jun. 13, 2017, now Pat. No. 10,404,615, which is a continuation of application No. 13/623,627, filed on Sep. 20, 2012, now Pat. No. 9,705,813, which is a continuation-in-part of application No. 13/396,356, filed on Feb. 14, 2012, now Pat. No. 9,680,763.

(51) Int. Cl.
  *G06F 21/62* (2013.01)
  *H04L 29/06* (2006.01)
  *H04L 47/70* (2022.01)
  *H04L 9/40* (2022.01)

(52) U.S. Cl.
  CPC .......... *H04L 63/101* (2013.01); *H04L 63/107* (2013.01); *G06F 2221/2111* (2013.01); *H04L 63/08* (2013.01); *H04L 63/0876* (2013.01); *H04L 63/108* (2013.01)

(58) Field of Classification Search
  CPC ... H04L 47/70; H04L 63/107; H04L 63/0876; H04L 63/108
  See application file for complete search history.

(56) References Cited

U.S. PATENT DOCUMENTS

| | | | |
|---|---|---|---|
| 5,446,888 | A | 8/1995 | Pyne |
| 5,574,786 | A | 11/1996 | Dayan et al. |
| 5,625,869 | A | 4/1997 | Nagamatsu et al. |
| 5,631,947 | A | 5/1997 | Wittstein et al. |
| 5,740,395 | A | 4/1998 | Wells et al. |
| 5,799,068 | A | 8/1998 | Kikinis et al. |
| 5,826,265 | A | 10/1998 | Man et al. |
| 5,864,683 | A | 1/1999 | Boebert et al. |
| 5,870,459 | A | 2/1999 | Phillips et al. |
| 5,928,329 | A | 7/1999 | Clark et al. |
| 5,961,590 | A | 10/1999 | Mendez et al. |
| 5,966,081 | A | 10/1999 | Chesnutt |
| 5,974,238 | A | 10/1999 | Chase, Jr. |
| 5,987,609 | A | 11/1999 | Hasebe |
| 6,021,492 | A | 2/2000 | May |
| 6,023,708 | A | 2/2000 | Mendez et al. |
| 6,078,260 | A | 6/2000 | Desch |
| 6,085,192 | A | 7/2000 | Mendez et al. |
| 6,131,096 | A | 10/2000 | Ng et al. |
| 6,131,116 | A | 10/2000 | Riggins et al. |
| 6,151,606 | A | 11/2000 | Mendez |
| 6,167,253 | A | 12/2000 | Farris et al. |
| 6,233,341 | B1 | 5/2001 | Riggins |
| 6,269,369 | B1 | 7/2001 | Robertson |
| 6,286,098 | B1 | 9/2001 | Wenig et al. |
| 6,370,629 | B1 | 4/2002 | Hastings et al. |
| 6,463,470 | B1 | 10/2002 | Mohaban et al. |
| 6,480,096 | B1 | 11/2002 | Gutman et al. |
| 6,529,949 | B1 | 3/2003 | Getsin et al. |
| 6,560,772 | B1 | 5/2003 | Slinger |
| 6,578,069 | B1 | 6/2003 | Hopmann et al. |
| 6,606,662 | B2 | 8/2003 | Nagasaki |
| 6,636,489 | B1 | 10/2003 | Fingerhut |
| 6,668,322 | B1 | 12/2003 | Wood et al. |
| 6,694,335 | B1 | 2/2004 | Hopmann et al. |
| 6,708,221 | B1 | 3/2004 | Mendez et al. |
| 6,714,859 | B2 | 3/2004 | Jones |
| 6,726,106 | B1 | 4/2004 | Han et al. |
| 6,727,856 | B1 | 4/2004 | Hill |
| 6,741,232 | B1 | 5/2004 | Siedlikowski et al. |
| 6,741,927 | B2 | 5/2004 | Jones |
| 6,766,454 | B1 | 7/2004 | Riggins |
| 6,779,118 | B1 | 8/2004 | Ikudome et al. |
| 6,904,359 | B2 | 6/2005 | Jones |
| 6,965,876 | B2 | 11/2005 | Dabbiere |
| 6,995,749 | B2 | 2/2006 | Friend |
| 7,017,105 | B2 | 3/2006 | Flanagin et al. |
| 7,032,181 | B1 | 4/2006 | Farcasiu |
| 7,039,394 | B2 | 5/2006 | Bhaskaran |
| 7,039,679 | B2 | 5/2006 | Mendez et al. |
| 7,064,688 | B2 | 6/2006 | Collins et al. |
| 7,092,943 | B2 | 8/2006 | Roese et al. |
| 7,107,339 | B1 | 9/2006 | Wolters |
| 7,184,801 | B2 | 2/2007 | Farcasiu |
| 7,191,058 | B2 | 3/2007 | Laird et al. |
| 7,203,959 | B2 | 4/2007 | Nachenberg et al. |
| 7,225,231 | B2 | 5/2007 | Mendez et al. |
| 7,228,383 | B2 | 6/2007 | Friedman et al. |
| 7,275,073 | B2 | 9/2007 | Ganji et al. |
| 7,284,045 | B1 | 10/2007 | Marl et al. |
| 7,287,271 | B1 | 10/2007 | Riggins |
| 7,308,703 | B2 | 12/2007 | Wright et al. |
| 7,310,535 | B1 | 12/2007 | MacKenzie et al. |
| 7,350,229 | B1 * | 3/2008 | Lander ............... H04L 63/0815 709/225 |
| 7,353,533 | B2 | 4/2008 | Wright et al. |
| 7,363,349 | B2 | 4/2008 | Friedman et al. |
| 7,363,361 | B2 | 4/2008 | Tewari et al. |
| 7,373,517 | B1 | 5/2008 | Riggins |
| 7,398,393 | B2 | 7/2008 | Mont et al. |
| 7,430,757 | B1 | 9/2008 | Chari et al. |
| 7,437,752 | B2 | 10/2008 | Heard et al. |
| 7,444,375 | B2 | 10/2008 | McConnell et al. |
| 7,447,506 | B1 | 11/2008 | MacKenzie et al. |
| 7,447,799 | B2 | 11/2008 | Kushner |
| 7,448,023 | B2 | 11/2008 | Chory et al. |
| 7,475,152 | B2 | 1/2009 | Chan et al. |
| 7,480,907 | B1 | 1/2009 | Marolia et al. |
| 7,496,847 | B2 | 2/2009 | Koehane et al. |
| 7,496,957 | B2 | 2/2009 | Howard et al. |
| 7,539,665 | B2 | 5/2009 | Mendez |
| 7,543,146 | B1 | 6/2009 | Karandikar et al. |
| 7,565,314 | B2 | 7/2009 | Borgeson et al. |
| 7,590,403 | B1 | 9/2009 | House et al. |
| 7,594,224 | B2 | 9/2009 | Patrick et al. |
| 7,603,547 | B2 | 10/2009 | Patrick et al. |
| 7,603,548 | B2 | 10/2009 | Patrick et al. |
| 7,603,703 | B2 | 10/2009 | Craft et al. |
| 7,617,222 | B2 | 11/2009 | Coulthard et al. |
| 7,620,001 | B2 | 11/2009 | Ganji |
| 7,620,392 | B1 | 11/2009 | Maurya et al. |
| 7,650,491 | B2 | 1/2010 | Craft et al. |
| 7,657,746 | B2 | 2/2010 | Paramasivam et al. |
| 7,660,902 | B2 | 2/2010 | Graham et al. |
| 7,665,118 | B2 | 2/2010 | Mann et al. |
| 7,665,125 | B2 | 2/2010 | Heard et al. |
| 7,685,645 | B2 | 3/2010 | Doyle et al. |
| 7,702,322 | B1 | 4/2010 | Maurya et al. |
| 7,702,785 | B2 | 4/2010 | Bruton, III et al. |
| 7,735,112 | B2 | 6/2010 | Kim et al. |
| 7,735,122 | B1 | 6/2010 | Johnson et al. |
| 7,739,334 | B1 | 6/2010 | Ng et al. |
| 7,752,166 | B2 | 7/2010 | Quinlan et al. |
| 7,769,394 | B1 | 8/2010 | Zhu |
| 7,788,382 | B1 | 8/2010 | Jones et al. |
| 7,792,297 | B1 | 9/2010 | Piccionelli et al. |
| 7,840,631 | B2 | 11/2010 | Farcasiu |
| 7,865,469 | B2 * | 1/2011 | Hopmann ............ H04L 67/1095 707/638 |
| 7,873,959 | B2 | 1/2011 | Zhu et al. |
| 7,890,091 | B2 | 2/2011 | Puskoor et al. |
| 7,895,296 | B1 | 2/2011 | Dayan |
| 7,912,896 | B2 | 3/2011 | Wolovitz et al. |
| 7,917,641 | B2 | 3/2011 | Crampton |
| 7,921,155 | B2 | 4/2011 | Harrow et al. |
| 7,970,386 | B2 | 6/2011 | Bhat et al. |
| 7,991,697 | B2 | 8/2011 | Fransdonk |
| 8,001,082 | B1 | 8/2011 | Muratov |
| 8,012,219 | B2 | 9/2011 | Mendez et al. |
| 8,041,776 | B2 | 10/2011 | Friedman et al. |
| 8,046,823 | B1 | 10/2011 | Begen et al. |
| 8,051,491 | B1 | 11/2011 | Cavage et al. |
| 8,060,074 | B2 | 11/2011 | Danford et al. |
| 8,069,144 | B2 | 11/2011 | Quinlan et al. |
| 8,078,157 | B2 | 12/2011 | Maurya et al. |

(56) References Cited

U.S. PATENT DOCUMENTS

| | | |
|---|---|---|
| 8,094,591 B1 | 1/2012 | Hunter et al. |
| 8,095,124 B2 | 1/2012 | Balia |
| 8,108,687 B2 | 1/2012 | Ellis et al. |
| 8,117,344 B2 | 2/2012 | Mendez et al. |
| 8,127,133 B2 | 2/2012 | Cross et al. |
| 8,150,431 B2 | 4/2012 | Wolovitz et al. |
| 8,155,587 B2 | 4/2012 | Sasai et al. |
| 8,166,106 B2 | 4/2012 | Biggs et al. |
| 8,201,216 B2 | 6/2012 | Cha et al. |
| 8,214,862 B1 | 7/2012 | Lee et al. |
| 8,225,381 B2 | 7/2012 | Lemke |
| 8,276,209 B2 | 9/2012 | Knibbeler et al. |
| 8,332,350 B2 | 12/2012 | Pulfer et al. |
| 8,353,044 B1 | 1/2013 | Jones et al. |
| 8,407,345 B2 | 3/2013 | Lim |
| 8,411,834 B2 | 4/2013 | Gopinath et al. |
| 8,423,511 B1 | 4/2013 | Bhatia |
| 8,456,293 B1 | 6/2013 | Trundle et al. |
| 8,472,874 B2 | 6/2013 | Tang et al. |
| 8,504,831 B2 | 8/2013 | Pratt et al. |
| 8,601,102 B1 | 12/2013 | Lee et al. |
| 8,611,928 B1 | 12/2013 | Bill |
| 8,687,536 B2 | 4/2014 | Michaelis |
| 8,689,281 B2 | 4/2014 | Balinsky et al. |
| 8,769,605 B2 | 7/2014 | Kaufmann et al. |
| 8,843,413 B2 | 9/2014 | Robert et al. |
| 8,875,222 B1 | 10/2014 | Chang et al. |
| 8,933,778 B2 | 1/2015 | Birkel et al. |
| 8,934,841 B2 | 1/2015 | Koh et al. |
| 8,955,038 B2 | 2/2015 | Nicodemus et al. |
| 9,167,031 B2 | 10/2015 | Takashima |
| 9,247,014 B1 | 1/2016 | Rao |
| 9,516,066 B2 | 12/2016 | Brannon et al. |
| 9,680,763 B2 | 6/2017 | Marshall et al. |
| 9,705,813 B2 | 7/2017 | Marshall et al. |
| 2001/0047335 A1 | 11/2001 | Arndt et al. |
| 2002/0013721 A1 | 1/2002 | Dabbiere et al. |
| 2002/0049580 A1 | 4/2002 | Kutaragi et al. |
| 2002/0055967 A1 | 5/2002 | Coussement |
| 2002/0098840 A1 | 7/2002 | Hanson et al. |
| 2002/0157019 A1 | 10/2002 | Kadyk et al. |
| 2003/0020623 A1 | 1/2003 | Cao et al. |
| 2003/0037261 A1 | 2/2003 | Meffert et al. |
| 2003/0065934 A1 | 4/2003 | Angelo et al. |
| 2003/0065950 A1 | 4/2003 | Yarborough |
| 2003/0110084 A1 | 6/2003 | Eberhard et al. |
| 2003/0164853 A1 | 9/2003 | Zhu et al. |
| 2003/0172166 A1 | 9/2003 | Judge et al. |
| 2003/0186689 A1 | 10/2003 | Herle et al. |
| 2003/0204716 A1 | 10/2003 | Rockwood et al. |
| 2003/0232616 A1 | 12/2003 | Gidron et al. |
| 2004/0003133 A1 | 1/2004 | Pradhan et al. |
| 2004/0008113 A1 | 1/2004 | Pradhan et al. |
| 2004/0019626 A1* | 1/2004 | Shepherd ............... H04L 67/14 709/202 |
| 2004/0064713 A1 | 4/2004 | Yadav |
| 2004/0098715 A1 | 5/2004 | Aghera et al. |
| 2004/0123153 A1 | 6/2004 | Wright et al. |
| 2004/0167984 A1 | 8/2004 | Herrmann |
| 2004/0181687 A1 | 9/2004 | Nachenberg et al. |
| 2004/0224703 A1 | 11/2004 | Takaki et al. |
| 2005/0003804 A1 | 1/2005 | Huomo et al. |
| 2005/0005113 A1 | 1/2005 | Dillon et al. |
| 2005/0071748 A1 | 3/2005 | Shipp |
| 2005/0097032 A1 | 5/2005 | Benco et al. |
| 2005/0097327 A1 | 5/2005 | Ondet et al. |
| 2005/0181808 A1 | 8/2005 | Vaudreuil |
| 2005/0198029 A1 | 9/2005 | Pohja et al. |
| 2005/0246192 A1 | 11/2005 | Jauffred et al. |
| 2005/0272445 A1 | 12/2005 | Zellner |
| 2005/0283614 A1 | 12/2005 | Hardt |
| 2006/0013566 A1 | 1/2006 | Nakamura |
| 2006/0059100 A1 | 3/2006 | Ronning et al. |
| 2006/0067250 A1 | 3/2006 | Boyer et al. |
| 2006/0130139 A1 | 6/2006 | Sobel et al. |
| 2006/0149846 A1 | 7/2006 | Schuba |
| 2006/0190984 A1 | 8/2006 | Heard et al. |
| 2006/0234793 A1 | 10/2006 | Walker et al. |
| 2007/0033397 A1 | 2/2007 | Phillips, II et al. |
| 2007/0053306 A1 | 3/2007 | Stevens |
| 2007/0093243 A1 | 4/2007 | Kapadekar et al. |
| 2007/0130473 A1 | 6/2007 | Mazotas |
| 2007/0136492 A1 | 6/2007 | Blum et al. |
| 2007/0136579 A1* | 6/2007 | Levy ...................... H04L 67/02 713/168 |
| 2007/0143603 A1 | 6/2007 | Hadden et al. |
| 2007/0156897 A1 | 7/2007 | Lim |
| 2007/0162417 A1 | 7/2007 | Cozianu et al. |
| 2007/0174433 A1 | 7/2007 | Mendez et al. |
| 2007/0189303 A1 | 8/2007 | Sunada |
| 2007/0192484 A1* | 8/2007 | Yamaoka ................ H04L 63/08 709/225 |
| 2007/0192588 A1 | 8/2007 | Roskind et al. |
| 2007/0260883 A1 | 11/2007 | Giobbi et al. |
| 2007/0261099 A1 | 11/2007 | Broussard et al. |
| 2007/0288637 A1 | 12/2007 | Layton et al. |
| 2007/0300070 A1 | 12/2007 | Shen-Orr et al. |
| 2008/0010689 A1 | 1/2008 | Ooi et al. |
| 2008/0014947 A1 | 1/2008 | Carnall |
| 2008/0065727 A1 | 3/2008 | Majors et al. |
| 2008/0070593 A1 | 3/2008 | Altman et al. |
| 2008/0072276 A1 | 3/2008 | Pouliot |
| 2008/0125102 A1 | 5/2008 | Abel et al. |
| 2008/0133712 A1 | 6/2008 | Friedman et al. |
| 2008/0134296 A1 | 6/2008 | Amitai et al. |
| 2008/0134305 A1 | 6/2008 | Hinton et al. |
| 2008/0134347 A1 | 6/2008 | Goyal et al. |
| 2008/0160984 A1 | 7/2008 | Benes et al. |
| 2008/0201453 A1 | 8/2008 | Assenmacher |
| 2008/0228504 A1 | 9/2008 | Nguyen et al. |
| 2008/0268895 A1 | 10/2008 | Foxenland |
| 2008/0282327 A1* | 11/2008 | Winget .................... H04L 63/10 726/4 |
| 2008/0291897 A1 | 11/2008 | Sourani |
| 2008/0301057 A1 | 12/2008 | Oren |
| 2008/0307219 A1 | 12/2008 | Karandikar |
| 2008/0318548 A1 | 12/2008 | Bravo et al. |
| 2009/0036111 A1 | 2/2009 | Danford et al. |
| 2009/0049157 A1* | 2/2009 | Kimura ............... G06Q 20/1235 709/219 |
| 2009/0049510 A1 | 2/2009 | Zhang et al. |
| 2009/0061890 A1* | 3/2009 | Andreasson ...... H04M 1/72457 455/456.1 |
| 2009/0080650 A1 | 3/2009 | Selgas et al. |
| 2009/0086964 A1 | 4/2009 | Agrawal et al. |
| 2009/0089565 A1 | 4/2009 | Buchanan et al. |
| 2009/0138937 A1 | 5/2009 | Erlingsson et al. |
| 2009/0144632 A1 | 6/2009 | Mendez |
| 2009/0186633 A1 | 7/2009 | Yonker et al. |
| 2009/0198997 A1 | 8/2009 | Yeap et al. |
| 2009/0203375 A1 | 8/2009 | Gisby et al. |
| 2009/0222880 A1 | 9/2009 | Mayer et al. |
| 2009/0249440 A1 | 10/2009 | Platt et al. |
| 2009/0260064 A1 | 10/2009 | McDowell et al. |
| 2009/0287921 A1 | 11/2009 | Zhu et al. |
| 2009/0298514 A1 | 12/2009 | Ullah |
| 2009/0300739 A1 | 12/2009 | Nice et al. |
| 2009/0307362 A1 | 12/2009 | Mendez et al. |
| 2009/0327908 A1 | 12/2009 | Hayton |
| 2010/0005125 A1 | 1/2010 | Mendez et al. |
| 2010/0005157 A1 | 1/2010 | Mendez et al. |
| 2010/0005159 A1 | 1/2010 | Ishiguro |
| 2010/0005195 A1 | 1/2010 | Mendez et al. |
| 2010/0023630 A1 | 1/2010 | Mendez et al. |
| 2010/0064354 A1 | 3/2010 | Irvine |
| 2010/0083359 A1 | 4/2010 | Readshaw et al. |
| 2010/0087144 A1 | 4/2010 | Korenshtein |
| 2010/0091711 A1 | 4/2010 | Sawai |
| 2010/0094981 A1 | 4/2010 | Cordray et al. |
| 2010/0100641 A1 | 4/2010 | Quinlan et al. |
| 2010/0100972 A1 | 4/2010 | Lemieux et al. |
| 2010/0107238 A1 | 4/2010 | Stedman et al. |
| 2010/0120450 A1 | 5/2010 | Herz |
| 2010/0131527 A1 | 5/2010 | Wohlert |

(56) References Cited

U.S. PATENT DOCUMENTS

| | | |
|---|---|---|
| 2010/0131844 A1 | 5/2010 | Wohlert |
| 2010/0138667 A1 | 6/2010 | Adams et al. |
| 2010/0144323 A1 | 6/2010 | Collins et al. |
| 2010/0146269 A1 | 6/2010 | Baskaran |
| 2010/0150342 A1* | 6/2010 | Richards .............. H04L 9/0833 380/30 |
| 2010/0191837 A1 | 7/2010 | Linden et al. |
| 2010/0212016 A1 | 8/2010 | Dubhashi et al. |
| 2010/0222645 A1 | 9/2010 | Nadler et al. |
| 2010/0254410 A1 | 10/2010 | Collins |
| 2010/0257421 A1 | 10/2010 | Kohno et al. |
| 2010/0262828 A1 | 10/2010 | Brown et al. |
| 2010/0262829 A1 | 10/2010 | Brown et al. |
| 2010/0268844 A1 | 10/2010 | Quinlan et al. |
| 2010/0273456 A1 | 10/2010 | Wolovitz et al. |
| 2010/0274910 A1* | 10/2010 | Ghanaie-Sichanie ....................... H04L 67/42 709/229 |
| 2010/0299152 A1 | 11/2010 | Batchu et al. |
| 2010/0299362 A1 | 11/2010 | Osmond |
| 2010/0299376 A1 | 11/2010 | Batchu et al. |
| 2010/0299719 A1 | 11/2010 | Burks et al. |
| 2010/0317371 A1 | 12/2010 | Westerinen et al. |
| 2010/0318701 A1 | 12/2010 | Srinivansan et al. |
| 2010/0325710 A1 | 12/2010 | Etchegoyen |
| 2011/0004941 A1 | 1/2011 | Mendez et al. |
| 2011/0039506 A1 | 2/2011 | Lindahl et al. |
| 2011/0055891 A1 | 3/2011 | Rice |
| 2011/0082900 A1 | 4/2011 | Nagpal et al. |
| 2011/0113062 A1 | 5/2011 | Quinlan et al. |
| 2011/0113094 A1 | 5/2011 | Chunilal |
| 2011/0135083 A1 | 6/2011 | Lingafelt et al. |
| 2011/0136510 A1 | 6/2011 | Peterson et al. |
| 2011/0141276 A1 | 6/2011 | Borghei |
| 2011/0145932 A1 | 6/2011 | Nerger et al. |
| 2011/0153779 A1 | 6/2011 | Mendez et al. |
| 2011/0153799 A1 | 6/2011 | Ito |
| 2011/0165861 A1 | 7/2011 | Wilson et al. |
| 2011/0167474 A1 | 7/2011 | Sinha et al. |
| 2011/0202589 A1 | 8/2011 | Piernot et al. |
| 2011/0202987 A1 | 8/2011 | Bauer-Hermann et al. |
| 2011/0225252 A1 | 9/2011 | Bhat et al. |
| 2011/0270799 A1 | 11/2011 | Muratov |
| 2011/0271113 A1 | 11/2011 | Venters, III et al. |
| 2011/0276805 A1 | 11/2011 | Nagpal et al. |
| 2011/0277013 A1 | 11/2011 | Chinta |
| 2011/0296186 A1 | 12/2011 | Wong et al. |
| 2011/0317831 A1 | 12/2011 | Passera et al. |
| 2011/0320552 A1 | 12/2011 | Friedman et al. |
| 2011/0320819 A1 | 12/2011 | Weber et al. |
| 2012/0005578 A1 | 1/2012 | Hawkins |
| 2012/0011007 A1 | 1/2012 | Plewett et al. |
| 2012/0015644 A1 | 1/2012 | Danford et al. |
| 2012/0054385 A1 | 3/2012 | Lim et al. |
| 2012/0094639 A1 | 4/2012 | Carlson et al. |
| 2012/0102392 A1 | 4/2012 | Reesman et al. |
| 2012/0110345 A1 | 5/2012 | Pigeon et al. |
| 2012/0117209 A1 | 5/2012 | Sinha |
| 2012/0117611 A1 | 5/2012 | Wookey |
| 2012/0124640 A1 | 5/2012 | Bender et al. |
| 2012/0150577 A1 | 6/2012 | Berg et al. |
| 2012/0190386 A1 | 7/2012 | Anderson |
| 2012/0198547 A1 | 8/2012 | Fredette et al. |
| 2012/0204032 A1 | 8/2012 | Wilkins et al. |
| 2012/0246719 A1 | 9/2012 | Bhamidipaty et al. |
| 2012/0252494 A1 | 10/2012 | Parker et al. |
| 2012/0272287 A1 | 10/2012 | Kuhlke et al. |
| 2012/0284322 A1 | 11/2012 | Laborczfalvi et al. |
| 2012/0288091 A1 | 11/2012 | Honke et al. |
| 2012/0289153 A1 | 11/2012 | Dobyns |
| 2012/0290544 A1 | 11/2012 | Abuelsaad et al. |
| 2012/0291104 A1 | 11/2012 | Hasek |
| 2012/0311329 A1 | 12/2012 | Medina et al. |
| 2012/0311686 A1 | 12/2012 | Medina et al. |
| 2012/0331527 A1 | 12/2012 | Walters et al. |
| 2013/0007245 A1 | 1/2013 | Malik et al. |
| 2013/0036459 A1 | 2/2013 | Liberman et al. |
| 2013/0040604 A1 | 2/2013 | Sprigg et al. |
| 2013/0040629 A1 | 2/2013 | Sprigg et al. |
| 2013/0045729 A1* | 2/2013 | Haik ...................... H04W 4/50 455/418 |
| 2013/0046971 A1 | 2/2013 | Lu |
| 2013/0055363 A1 | 2/2013 | Dattagupta et al. |
| 2013/0061307 A1 | 3/2013 | Livne |
| 2013/0081101 A1 | 3/2013 | Baer et al. |
| 2013/0086466 A1 | 4/2013 | Levy et al. |
| 2013/0091550 A1 | 4/2013 | Joyce et al. |
| 2013/0132854 A1 | 5/2013 | Raleigh et al. |
| 2013/0152169 A1 | 6/2013 | Stuntebeck |
| 2013/0165232 A1 | 6/2013 | Nelson et al. |
| 2013/0174223 A1 | 7/2013 | Dykeman et al. |
| 2013/0226696 A1 | 8/2013 | Cook |
| 2013/0229930 A1 | 9/2013 | Akay et al. |
| 2013/0244614 A1 | 9/2013 | Santamaria et al. |
| 2013/0254401 A1 | 9/2013 | Marshall et al. |
| 2013/0275038 A1 | 10/2013 | Hania et al. |
| 2013/0283370 A1 | 10/2013 | Mpat et al. |
| 2013/0285855 A1 | 10/2013 | Dupray et al. |
| 2013/0304898 A1 | 11/2013 | Aggarwal et al. |
| 2013/0347053 A1 | 12/2013 | Motoyama |
| 2014/0006347 A1 | 1/2014 | Qureshi et al. |
| 2014/0007182 A1 | 1/2014 | Qureshi et al. |
| 2014/0013420 A1 | 1/2014 | Piccionelli et al. |
| 2014/0025256 A1 | 1/2014 | Armitage et al. |
| 2014/0053229 A1 | 2/2014 | Saib |
| 2014/0053250 A1 | 2/2014 | Wethington et al. |
| 2014/0066098 A1 | 3/2014 | Stern et al. |
| 2014/0068717 A1 | 3/2014 | Mayes et al. |
| 2014/0073244 A1 | 3/2014 | Ko et al. |
| 2014/0082501 A1 | 3/2014 | Bae et al. |
| 2014/0084067 A1 | 3/2014 | Vanderhulst |
| 2014/0096180 A1 | 4/2014 | Negi et al. |
| 2014/0096212 A1 | 4/2014 | Smith et al. |
| 2014/0113556 A1 | 4/2014 | Kotecha |
| 2014/0123224 A1 | 5/2014 | Nosrati |
| 2014/0143852 A1 | 5/2014 | Cottrell et al. |
| 2014/0162688 A1 | 6/2014 | Edge |
| 2014/0171060 A1 | 6/2014 | Cook et al. |
| 2014/0177495 A1 | 6/2014 | Mallikarjunan et al. |
| 2014/0198024 A1 | 7/2014 | Adzhigirey et al. |
| 2014/0213179 A1 | 7/2014 | Rosenberg |
| 2014/0214668 A1 | 7/2014 | Loi, I et al. |
| 2014/0215212 A1 | 7/2014 | Dempster et al. |
| 2014/0222504 A1 | 8/2014 | Mackenzie et al. |
| 2014/0223177 A1 | 8/2014 | Dempster et al. |
| 2014/0230038 A1 | 8/2014 | Leong et al. |
| 2014/0237235 A1 | 8/2014 | Kuno et al. |
| 2014/0237614 A1 | 8/2014 | Irvine |
| 2014/0258481 A1 | 9/2014 | Lundell |
| 2014/0282877 A1 | 9/2014 | Mahaffey et al. |
| 2014/0287688 A1 | 9/2014 | Dempster et al. |
| 2014/0310771 A1 | 10/2014 | Marshall et al. |
| 2015/0156205 A1 | 6/2015 | Yin et al. |
| 2015/0163336 A1 | 6/2015 | Ramos et al. |
| 2015/0207795 A1 | 7/2015 | Wentz et al. |
| 2017/0269955 A1 | 9/2017 | Hardy |

FOREIGN PATENT DOCUMENTS

| | | |
|---|---|---|
| GB | 2309860 | 5/2000 |
| GB | 2346716 | 8/2000 |
| GB | 2361558 | 10/2001 |
| JP | H07141245 | 6/1995 |
| JP | H08251660 | 9/1996 |
| JP | 2007304009 | 11/2007 |
| JP | 2011234084 | 11/2011 |
| WO | 9600485 | 1/1996 |
| WO | 9704389 | 2/1997 |
| WO | 9922322 | 5/1999 |
| WO | 0003316 | 1/2000 |
| WO | 0241661 | 5/2002 |
| WO | 02141661 | 5/2002 |
| WO | 2010052669 | 5/2010 |
| WO | 2011022053 | 2/2011 |

(56) References Cited

FOREIGN PATENT DOCUMENTS

| WO | 2012098596 | 7/2012 |
|---|---|---|
| WO | 2013011512 | 1/2013 |
| WO | 2013109040 | 7/2013 |

OTHER PUBLICATIONS

Asynchrony Software, Inc., "PDA Defense User Guide", 726, 2002.
Belani, Eshwar et al., "The CRISIS Wide Area Security Architecture", 726, 1998.
Benaloh, Josh et al., "Patient Controlled Encryption: Ensuring Privicy of Electronic Medical Records", 726, Nov. 13, 2009.
Fox, Armando et al., "Security on the Move: Indirect Authentication Using Kerberos", 726, 1996.
Menaria, Pankaj et al., "Security in Mobile Database Systems", 707, 726, Mar. 17, 2011.
Pfitzmann, Andreas et al., "Mobile User Devices and Security Modules: Design for Trustworthiness", 726 Feb. 5, 1996.
Steiner, Jennifer, "Kerberos: An Authentication Service for Open Network Systems", 726, Jan. 12, 1988.
Strunk, John et al., "Self-Securting Storage: Protecting Data in Compromised Systems", Symposium on Operating Systems Design and Implementation, 726, 2000.
Margaret Rouse, Client/Server (client/server model, client/server architecture), Rouser, Oct. 30, 2008, Searchnetwork, pp. 1-2 (Year: 2008).
Mobile Application Management, Meeting the BYOD challenge with next-generation application and device management, Kony, Jul. 2012, pp. 1-16 (Year: 2012).
How to Keep Your Personal Information Secured, Federal Commission, Jul. 2012, pp. 1-4 (Year: 2012).
The Dark Side of BYOD—Privacy, Personal Data Loss and Device Seizure, Trend Micro, Jan. 31, 2012, pp. 1-3 (Year: 2012).
Gong, Li; et al. "Multicast Security and Its Extension to Mobile Environment", Oct. 1995.
Infinite Technologies, "Infinite Interchange", 1997.
Kiiskinen, Jani; et al. "Data Channel Service for Wireless Telephone Links" Jan. 1996.
Latedroid, "JuiceDefender" Jan. 15, 2012.
Nokia, "Nokia 9000i Owner's Manual" 1997.
Ratner, David; et al. "Replication Requirements in Mobile Environments" Nov. 2001.
Ratner, David H. "Roam: A scalable Replication System for Mobile and Distributed Computing", Jan. 1998.
Research in Motion, "Blackberry Wireless Handheld 5810 Getting Started Guide" Jan. 15, 2003.
Research in Motion, "Blackberry Wireless Handheld 5810 Quick Reference Guide" 2003.
Research in Motion, "Blackberry Wireless Handheld 5810 User Guide" 2003.
Stajano, Frank; et al. "The Thinnest of Clients: Controlling It All Via Cellphone" Mobile Computing and Communications Review, vol. 2, No. 4, Oct. 1998.
Sybase, "MobiLink Synchronization User's Guide", Part No. 38132-01-0800-01, Nov. 2001.
Symantec Corporation, "Creating Norton pcAnywhere Scripts" 1994.
Traveling Software, Inc., "LapLink for Windows 95" 1996.
Wachowicz, Moniza; et al. "Combining Location and Data Management in an Environment for Total Mobility" In Proceedings for the International Workshop on Information Visualization an Mobile Computing, 1996.
Xcellenet, Inc., "RemoteWare Client for Windows NT and Windows 95 User's Guides" 1996.
Xcellenet, Inc., "RemoteWare Forms and RemoteWare Query" 1994.
Xcellenet, Inc., "RemoteWare Forms Getting Started Guide" 1994.
Xcellenet, Inc., "RemoteWare Server for Windows NT Administrator's Guide" 1996.
Xcellenet, Inc., "RemoteWare Server for Windows NT Reference Manual" 1996.
Xcellenet, Inc., "RemoteWare Server Operations Guide" 1992.

\* cited by examiner

Resource Grouping
Identifier:
Board Meeting — 501

Documents — 503

Content
Documents
XXXXXXX

Settings
Categories

Add Document  XXXXXX — 519
516

| Action | Type | Name | Categories | Assignment | Category [As ▽] | Type [As ▽] | XXXX   Q GO | | |
|---|---|---|---|---|---|---|---|---|---|
| | | | | | | Authorized Start Time | Authorized End Time | XXXXX | |
| ○ ● | [icon] | xxxxx | xxxxx | Team Kyle | | 12/7/2011 13:00:00 | 12/7/2011 14:00:00 | ✎ ⚙ ▽ ⦻ ○ | |
| ○ ● | [PDF] | xxxxx | xxxxx | Team Kyle | | 12/7/2011 13:00:00 | 12/7/2011 14:00:00 | ✎ ⚙ ▽ ⦻ ○ | |
| ○ ● | [W] | xxxxx | xxxxx | Team Kyle | | 12/7/2011 13:00:00 | 12/7/2011 14:00:00 | ✎ ⚙ ▽ ⦻ ○ | |
| ○ ● | [PDF] | xxxxx | xxxxx | Team Kyle | | 12/7/2011 13:00:00 | 12/7/2011 14:00:00 | ✎ ⚙ ▽ ⦻ ○ | |
| ○ ● | [W] | xxxxx | xxxxx | Team Kyle | | 12/7/2011 13:00:00 | 12/7/2011 14:00:00 | ✎ ⚙ ▽ ⦻ ○ | |
| ○ ● | [PDF] | xxxxx | xxxxx | Team Kyle | | 12/7/2011 13:00:00 | 12/7/2011 14:00:00 | ✎ ⚙ ▽ ⦻ ○ — 513 | |

Page Size [50 ▽]

137e — 523

506 — Google

Edit Document 20000 Leagues — 137g, 703

| Edit | XXXXX | XXXXXXXX | Security | Assignment | XXXXXXXX |

706 → Name: 20000 Leagues

EM: 20000 Leagues each

Version: 1.0

Description:

Instances: Normal

Category: XXXXXX

Select a Category

709 → Save   Reset ← 713

FIG. 7

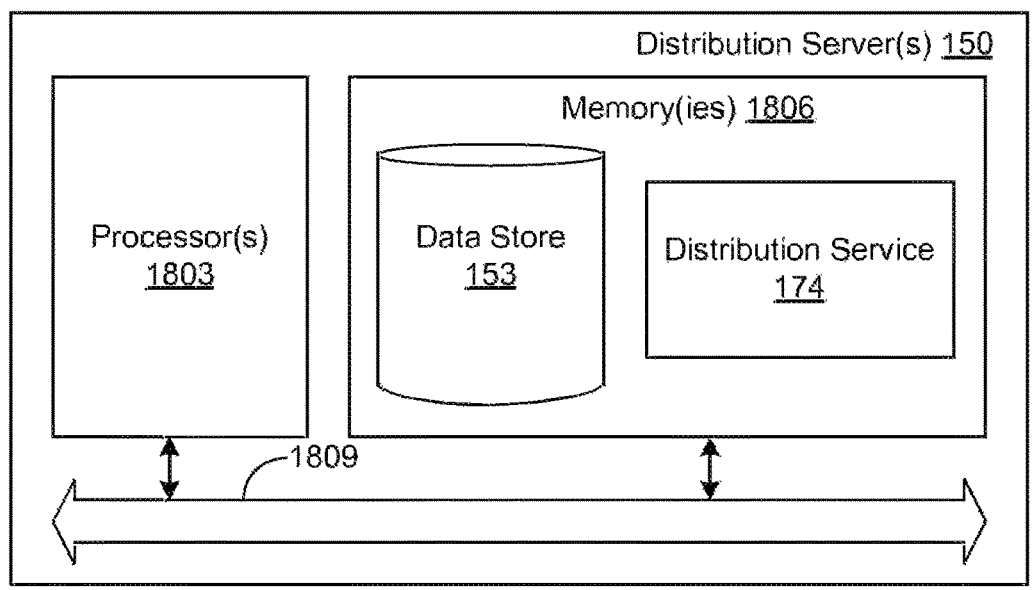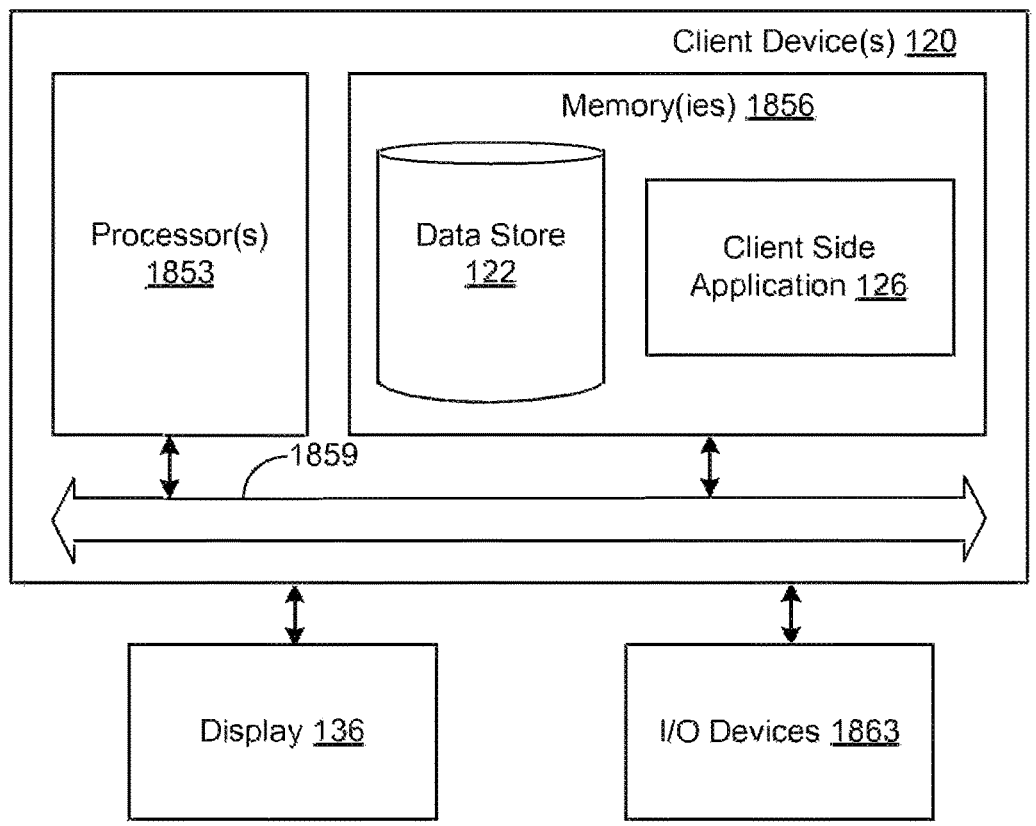
FIG. 18

CONTROLLING DISTRIBUTION OF RESOURCES ON A NETWORK

CROSS REFERENCE TO RELATED APPLICATIONS

This application is a continuation of, and claims priority to, co-pending U.S. Patent Application entitled "CONTROLLING DISTRIBUTION OF RESOURCES ON A NETWORK," filed on Aug. 8, 2019 and assigned application Ser. No. 16/535,845, which is a continuation of, and claims priority to, co-pending U.S. Patent Application entitled "CONTROLLING DISTRIBUTION OF RESOURCES ON A NETWORK," filed on Jun. 13, 2017 and assigned application Ser. No. 15/620,922, which is a continuation of U.S Patent Application "CONTROLLING DISTRIBUTION OF RESOURCES ON A NETWORK", filed on Sep. 20, 2012, and assigned application Ser. No. 13/623,627, which is a continuation in part of U.S Patent Application "CONTROLLING DISTRIBUTION OF RESOURCES ON A NETWORK," filed on Feb. 14, 2012 and assigned application Ser. No. 13/396,356. The patent applications identified above are incorporated herein by reference in their entirety.

BACKGROUND

Controlling access to and distribution of enterprise resources, such as documents, databases, and executable applications, in a networked environment is critical to ensure that only authorized users and network-connected devices may gain access to sensitive information. Depending on the sensitivity of a given resource, an array of authorization rules may be necessary to ensure that the resource is adequately protected. Some resources may only require ensuring that the proper user is requesting the resource. Other resources may require compliance with more stringent authorization rules, such as determining whether the client device is located within an authorized location, determining whether the current time is within an authorized time window, determining whether an appropriate transport protocol is used (i.e., http and/or https) by the requesting device, determining whether the resource is accessed from a secured device, etc.

To date, enterprises have distributed resources to network-connected resources using internal secured networks and VPN tunnels to those networks. While these methods provide a secure channel for distribution, these methods typically do not authenticate the recipient beyond ensuring a proper recipient. Additionally, these methods are ineffective to continuously ensure that the resource is protected, as they fail to ensure that the resource is protected beyond the initial grant of access to the resource. This is problematic because the recipient of the resource may at some point cease to comply with the conditions required to receive access to the resource. Consequently, these methods fails to continuously ensure that only authorized client devices retain access to location-sensitive and time-sensitive resources. Finally, these methods do not restrict an authorized recipient from subsequently transmitting certain resources to other potentially unauthorized recipients.

SUMMARY OF THE INVENTION

Disclosed are embodiments for a non-transitory computer-readable medium embodying a program executable in a computing device, the program comprising code that, when executed by a computing device, causes the computing device to perform a method comprising the steps of receiving a client device request to access resources hosted by a distribution service, determining whether the client device is authorized to access the distribution service, identifying the resource grouping identifiers associated with client devices authorized to access the distribution service, identifying the resources associated with the identified resource grouping identifiers, identifying the distribution rules associated with the identified resources including location rules and time rules, transmitting the identified resources and identified distribution rules to the client device, the resources being configured to be exclusively accessible via a containerized client side application on the client device while the client device satisfies the distribution rules.

Disclosed are embodiments for a containerized application executed by a client device for determining whether the client device is located at an authorized location, transmitting a request for access to resources hosted by a distribution service if the client device is located at an authorized location, receiving resources that are configured to be exclusively accessible via the containerized client side application, and removing the resources from the client device if the client device is no longer at an authorized location.

Disclosed are embodiments for a computing device configured to execute a distribution service for controlling distribution of resources in a networked environment. The distribution service comprises a processor and a memory device including instructions that when executed by the processor cause the processor to perform a method comprising the steps of receiving a client device request to access resources hosted by a distribution service, determining whether the current time associated with the client device is within an authorized time window, transmitting the resources to the client device if the current time associated with the client device is within an authorized time window, monitoring the current time of the client device on a continuous basis, and removing the resources from the client device if the current time associated with the client device is no longer within an authorized time window.

Disclosed are embodiments for a method for receiving a request to access resources hosted by a distribution service from a client device located at an authorized location, transmitting the resources to the client device where the resources are configured to be exclusively accessible via a containerized client side application executed on the client device, monitoring the location of the client device on a continuous basis, and removing the resources from the client device if the client device is no longer at an authorized location.

Disclosed are embodiments for a non-transitory computer-readable medium embodying a program executable in a computing device, the program comprising code that, when executed by a computing device, causes the computing device to perform a method comprising the steps of transmitting requests to access resources hosted by a distribution service from a containerized client side application executed on a client device and receiving access to the resources if the client device is located at an authorized location and if the current time associated with the client device is within an authorized time window.

Disclosed are embodiments for a computing device configured to execute a distribution service for controlling distribution of resources in a networked environment. The distribution service comprises a processor and a memory device including instructions that when executed by the processor cause the processor to perform a method comprising the steps of determining whether a client device has access to resources associated with authorized time windows, determining whether the current time associated with the client device is within an authorized time window, and removing access to the resources on the client device if the current time associated with the client device is not within an authorized time window.

BRIEF DESCRIPTION OF THE DRAWINGS

Many aspects of the present disclosure can be better understood with reference to the following diagrams. The drawings are not necessarily to scale, emphasis instead being placed upon clearly illustrating certain features of the disclosure. Moreover, in the drawings, like reference numerals designate corresponding parts throughout the several views.

FIGS. 2-7 are exemplary user interfaces rendered on a client device in the networked environment of FIG. 1 according to certain embodiments of the present disclosure.

FIG. 18 shows schematic block diagrams illustrating a distribution server and client device employed in the networked environment of FIG. 1 according to certain embodiments of the present disclosure.

DETAILED DESCRIPTION

Disclosed are various embodiments for systems and methods for controlling distribution of resources in a network. The exemplary system comprises a distribution server and a plurality of client devices configured as described herein.

In one embodiment, a distribution service executed by a distribution server transmits resources to a client device if a pairing of a user of the client device and the client device are authorized to receive the resources. The distribution service first determines whether the user and client device pairing are authorized to communicate with the distribution service based at least in part on a plurality of authorization rules. For example, an authorization approach as described in application Ser. No. 13/316,073 entitled "CONTROLLING ACCESS TO RESOURCES ON A NETWORK," which is incorporated herein by reference in its entirety, may be employed to determine whether the client device and the user of the client device are authorized.

Upon determining that the user and the client device pairing are authorized, the distribution service determines which of a plurality of resource grouping identifiers are associated with the user and client device pairing. For instance, each resource may be associated with one or more resource grouping identifiers. Resource grouping identifiers are used to identify a grouping (i.e., one or more) of resources that may be provided to authorized user and client device pairings. The distribution service then identifies a plurality of resources that are associated with each one of the resource grouping identifiers and transmits the identified resources to the client device if the client device satisfies the distribution rules associated with each one of the identified resources. For instance, the distribution service may determine that the client device complies with the distribution rules based at least in part on data selected from a device profile of the client device, such as location information specifying the location of the client device and/or time information specifying the current time.

In one embodiment, the resources referenced herein may include any electronic data, such as databases, text files, word processor files, spreadsheet files, presentation files, graphic files, audio files, photographic files, video files, applications and application files, and/or the like. More specifically, resources may include: data files, audio files, video files, three-dimensional image files, raster image files, vector image files, page layout files, spreadsheet files, database files, executable files, CAD files, web files, plug-in files, font files, system files, settings files, encoded files, compressed files, disk image files, developer files, backup files, and/or any other files.

Figure 1:
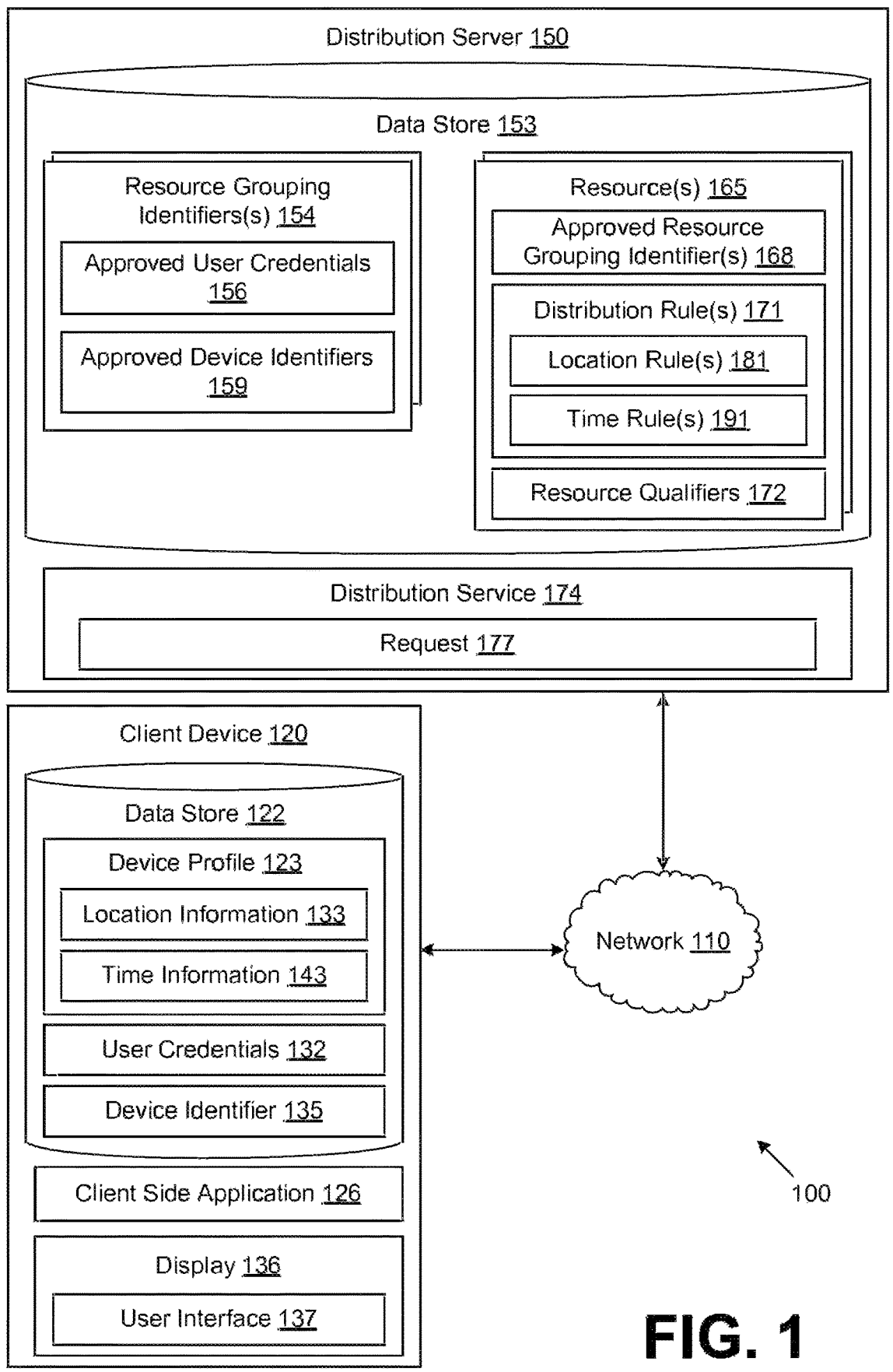
FIG. 1 is a block diagram of a networked environment according to certain exemplary embodiments of the present disclosure.

FIG. 1 illustrates a networked environment 100 according to various embodiments. The networked environment 100 includes a network 110, a client device 120, and a distribution server 150. The network 110 may be or include, for example, any type of wireless network such as a wireless local area network (WLAN), a wireless wide area network (WWAN), or any other type of wireless network now known or later developed. Additionally, the network 110 may be or include the Internet, intranets, extranets, microwave networks, satellite communications, cellular systems, PCS, infrared communications, global area networks, or other suitable networks, etc., or any combination of two or more such networks. In one embodiment, the network 110 facilitates transmission of resources 165 between one or more client devices 120 and a distribution server 150.

The client device 120 may be a desktop computer, a laptop computer, a personal digital assistant, a cellular telephone, a set-top box, a music player, a web pad, a tablet computer system, a game console, and/or another device with like capability. The client device 120 may include a wired network connectivity component (not shown in FIG. 1), for example, an Ethernet network adapter, a modem, and/or the like. The client device 120 may further include a wireless network connectivity interface (not shown in FIG. 1), for example, a PCI (Peripheral Component Interconnect) card, USB (Universal Serial Bus) interface, PCMCIA (Personal Computer Memory Card International Association) card, SDIO (Secure Digital Input-Output) card, NewCard, Cardbus, a modem, a wireless radio transceiver, and/or the like. The client device 120 is operable to communicate via wired connection with the distribution server 150 with the aid of the wired network connectivity component. The client device 120 is further operable to communicate wirelessly with the distribution server 150 with the aid of the wireless network connectivity component. Additionally, the client device 120 may further comprise a memory for storing data and applications, a processor for executing applications stored in memory, and a local interface such as a bus, as will be described with respect to FIG. 18.

Additionally, the client device 120 may store in a data store 122 a device profile 123, user credentials 132, a device identifier 135, and other data. In one embodiment, the device profile 123 may represent hardware, software, and security attributes that describe the client device 120. For instance, the device profile 123 may represent hardware specifications of the client device 120, version and configuration information of various software programs and hardware components installed on the client device 120, transport protocols enabled on the client device 120, version and usage information of various other resources stored on the client device 120, and/or any other attributes associated with the state of the client device 120. The device profile 123 may further include characteristics describing the current state of the client device 120, such as location information 133 specifying the location of the client device 120 and time information 143 specifying the current time. Moreover, the device profile 123 may include data indicating a date of a last virus scan of the client device 120, a date of a last access by an IT representative, a date of a last access by the distribution server 150, a date of a last service by the IT representative, and/or any other data indicating a date of last maintenance.

The user credentials 132 may uniquely identify the user of the client device 120. For example, the user credentials 132 may include a username, a password, and/or biometric data related to facial recognition, retina recognition, fingerprint recognition, and the like. The device identifier 135 may uniquely identify the client device 120. For example, the device identifier 135 may be a unique hardware identifier such as a GUID (Globally Unique Identifier), UUID (Universally Unique Identifier), UDID (Unique Device Identifier), serial number, IMEI (Internationally Mobile Equipment Identity), Wi-Fi MAC (Media Access Control) address, Bluetooth MAC address, a CPU ID, and/or the like, or any combination of two or more such hardware identifiers. Additionally, the device identifier 135 may be represented by a unique software identifier such a token or certificate, based at least in part on the aforementioned unique hardware identifiers.

The client device 120 may further be configured to execute various applications. For example, the client device 120 may be configured to execute applications such as web browsing applications, email applications, instant messaging applications, and/or other applications capable of receiving and/or rendering resources 165 on a display 136 associated with the client device 120. Any applications capable of receiving and/or rendering resources 165 on a display 136 is generally referred to herein as a "client side application" 126. The client side application 126 may be stored in the memory of the client device 120. In one embodiment, the client side application 126 may be a secure container program that may be authorized to receive and render selected resources 165, as described herein. The secure container program may further contain a decryption key specific to a distribution service 174 that enables the secure container program to decrypt resources 165 transmitted by the distribution service 174 that have been encrypted by the distribution service 174 to prevent unauthorized programs from accessing the resources 165 on the client device 120. In another embodiment, the client side application 126 may be a browser configured to be executed as described herein.

The client side application 126 may executed to transmit requests to access resources 165 to the distribution server 150 and render a user interface 137 on the display 136 that provides access to the resources 165. In particular, the resources 165 may be presented in a user interface 137 by decompressing compressed files and presenting the uncompressed files, mounting disk image files and presenting the mounted image files, running executable files and presenting the executed files, by enabling a data search of the resources 165 and presenting the featured output in a user interface, by calling on another application on the client device 120 to respond to data links contained within the resources 165, and/or by transmitting a part or the whole of the resources 165 to another application on the client device 120. Furthermore, a client side application 126 may be executed to present a single resource 165 or a series of resources 165 in a comprehensive manner, for instance, presenting photograph files in a slideshow presentation. Additionally, the client side application 126 may be executed to render an environment that presents an array of resources 165 in a single view, such as a category-based tree or outline format, based at least in part on a resource qualifier 172 associated with the resources 165.

In one embodiment, the resource qualifier 172 may be or include metadata that describes and/or regulates the use of the respective resource 165. For example, a resource qualifier may include categories/sub-categories to which the resource 165 belongs, an indication that the resource 165 is considered a favorite, an indication of whether the resource 165 is privately owned, publicly owned, and/or enterprise-owned, an indication of whether the resource 165 is confidential, an indication of whether the resource 165 is password protected, an indication of the historical version of the resource 165, a description of the resource 165, one or more comments regarding the resource 165, an indication of the size and format of the resource 165, an indication of the download priority associated with the resource 165, an indication of the expiration date associated with the resource 165, an indication of the effective date associated with the resource 165, an indication of the ownership of the resource 165, an indication of the managing party of the resource 165, and/or the like, or any combination of resource qualifiers 172. Additionally, the resource qualifiers 172 may indicate that the resources 165 are encrypted and may facilitate the decryption of the resources 165 when the client device 120 has access to an appropriate decryption key, such as a decryption key provided by a distribution service 174 associated with the resources 165.

The client side application 126 may also facilitate the modification of resources 165 provided by the distribution service 174 and the modification of data associated with the provided resources 165. For example, the client side application 126 may include functionality for adding content to the existing resources 165, removing content from the existing resources 165, altering the content of existing resources 165, adding resource qualifiers 172 associated with the existing resources 165, and/or the like, or any combination of manipulations of the resources 165.

The client side application 126 may further be executed to add new resources 165 to be hosted by the distribution server 150. For example, a user having administrator-level user credentials 132 may manipulate the user interface 137 to transfer copies of resources 165 locally stored on the client device 120 to the distribution server 150 to be included in the data store 153. In one embodiment, the user of the client device 120 may initiate an upload of one or more resources 165 via the user interface 137 rendered by the client side application 126, as can be appreciated. In addition, the user may specify one or more approved resource grouping identifiers 168 that are permitted to access the uploaded resource 165 and specify distribution rules 171 that are required to be complied with in order to access the uploaded resource 165, as will be described. In another embodiment, a user without administrator-level user credentials 132 may manipulate the user interface 137 to transfer local copies of personal resources 165 to the distribution server 150. In this example, the resources qualifiers 172 associated with the personal resources 165 may be configured by default to restrict access by any other user.

Additionally, the client side application 126 may also be configured to optionally restrict access to the resources 165 by other applications executed by the client device 120, thereby preventing access to the resources 165 from an application other than the client side application 126. In one embodiment, the client side application 126 may monitor network traffic between the client device 120 and the distribution server 150 and identify any data being transmitted between the distribution server 150 and an application executed by the client device 120 other than the client side application 126. The client side application 126 may then determine whether a resource 165 is being provided to an application other than the client side application 126 executed by the client device 120 and intercept and/or block the incoming resource 165. In one embodiment, the client side application 126 may then allow the intercepted resource 165 to be accessible to the user via a user interface 137 rendered by the client side application 126. In other embodiments, the client side application 126 may deny access to the intercepted resource 165 by any other application on the client device 120. Additionally, the client side application 126 may be executed to call on other services associated with the resources 165 that are executed on the distribution server 150 or another server or device accessible to the client side application 126, for instance, a technical support service that may be executed on the distribution server 150.

Furthermore, the client side application 126 may be a containerized application that prohibits the resources 165 from being accessed by other applications, prohibits the resources 165 from being transmitted to other applications on the client device 120, and is configurable to restrict the manner of access to the resources 165 within the client side application 126. The containerized client side application 126 may be configured to identify metadata associated with the resources 165 that specifies that the resources 165 are not authorized for transmission outside of the containerized application. Examples of such transmission restrictions may include restricting cutting, copying, and pasting of the resources 165 while the resources 165 are being accessed by the client side application 126.

The distribution server 150 may comprise, for example, a server computer or any other system providing distribution capability. Alternatively, a plurality of distribution servers 150 may be employed that are arranged, for example, in one or more server banks or computer banks or other arrangements. For example, a plurality of distribution servers 150 together may comprise a cloud computing resource, a grid computing resource, and/or any other distributed computing arrangement. Such distribution servers 150 may be located in a single installation or may be distributed among many different geographic locations. For purposes of convenience, the distribution server 150 is referred to herein in the singular. Even though the distribution server 150 is referred to in the singular, it is understood that a plurality of distribution servers 150 may be employed in the arrangements as descried herein.

Certain applications and/or other functionality may be executed in the distribution server 150 according to certain embodiments. Also, certain data is stored in a data store 153 that is accessible to the distribution server 150. The data store 153 may be representative of a plurality of data stores, as can be appreciated. The data stored in the data store 153, for example, is associated with the operation of the applications and/or functional entities described herein. The data store 153 may utilize strong encryption standards to protect the resources 165 from unauthorized access. For example, the data store 153 may utilize SHA-1 (Standard Hash Algorithm) or a similar strong encryption standard commonly utilized for server-side data storage.

The components executed on the distribution server 150, for example, include the distribution service 174 and other applications, services, processes, systems, engines, or functionality not disclosed in detail herein. The distribution service 174 is executed to provide resources 165 stored in the data store 153 to a requesting client device 120 based on resource grouping identifiers 154 and distribution rules 171, as will be described. In addition, the distribution service 174 may also accept new resources 165 provided by the user of the client device 120, and previously provided resources 165 modified by the user of the client device 120, as will be described.

The data store 153 may include resource grouping identifiers 154, resources 165, and/or other data. The resource grouping identifiers 154 may represent unique identifiers for previously determined resource groupings and are used to determine which resources 165 are transmitted to the user of the client device 106, as will be described. For example, a resource grouping may relate to organizational groups, organizational roles, geographic locations, and/or any other type of grouping that require access to a type of resource. Each resource grouping identifier 154 may be associated with a pairing of at least one of a plurality of approved user credentials 156 and at least one of a plurality of approved device identifiers 159. In one embodiment, each combination of approved user credentials 156 and approved device identifiers 159 may be associated with more than one of the resource grouping identifiers 154. Additionally, the pairing of approved user credentials 156 and approved device identifiers 159 may be associated with a user's organizational role and/or capacity. For instance, the pairing of approved user credentials 156 and the approved device identifiers 159 may be predetermined by an IT administrator. In another embodiment, the pairing of approved user credentials 156 and the approved device identifiers 159 may be automatically associated with the resource grouping identifiers 154 based at least upon a user's pay grade, organizational level, status within the organization, and/or any other organizational factor.

Each resource 165 may be associated with a listing of approved resource grouping identifiers 168 and a plurality of distribution rules 171. The resources 165, the approved resource grouping identifiers 168, and the distribution rules 171 may be stored on the data store 122 or another data store accessible to the client device 120 and/or other storage facility in data communication with the distribution server 150. For instance, the resources 165, approved resource grouping identifiers 168, and the distribution rules 171 may further be stored on an internal email server, a web-based email server, an internal file server, a third-party hosted file server, a cloud-based server, or a cached local data store on the client device 120.

In one embodiment, the listing of approved resource grouping identifiers 168 includes a plurality of resource grouping identifiers 154 that regulate access to the respective resource 165, which may be predetermined by an IT administrator. For instance, the IT administrator may specify which resource grouping identifiers 154 are permitted access to the respective resource 165. Additionally, the distribution rules 171 regulate how a user having the appropriate user credentials 132 and device identifier 135 combination may access the respective resource 165. For example, in some embodiments, the distribution rules 171 may describe a required and/or a permitted state that an accessing client device 120 must satisfy in order for the client device 120 to be permitted to access to the resource 165. The distribution rules 171 may include but are not limited to hardware requirements, software requirements, configuration requirements, maintenance requirements of a client device, and/or requirements related to the resource 165.

In one embodiment, hardware requirements may include requirements associated with the CPU, memory, power supply, external storage, peripherals, and/or the like. Software requirements may include requirements associated with the operating system type and version, operating system authenticity and jailbreak/rooted status, installed application types and versions, and/or the like. Configuration requirements may include requirements associated with the configuration of the hardware, software, data encryption methods, transport protocols, and/or the like. Maintenance requirements may include requirements associated with the date of last virus scan for the client device 120, the date of the last access of the client device 120 by IT, the date of last communication between the client device 120 and the distribution server 150, the date of last tune-up of the client device 120, and/or the like. Requirements related to the resource 165 may include whether the resources 165 may be rendered while the client device 120 is offline and/or not in communication with the distribution service 174, whether to permit synchronization of the resources 165 with a remote data store, whether to restrict the resources 165 from being forwarded, whether to permit storing resources 165 locally on the client device 120, whether the resources 165 may only be accessed by client devices 120 located at specified locations, whether the resources 165 may only be accessed during specified times, and/or the like.

For instance, the resources 165 may be associated with a set of distribution rules 171 that include a plurality of location rules 181. In one embodiment, the location rules 181 specify one or more locations at which a client device 120 may access the resources 165. In another embodiment, the location rules 181 specify one or more location perimeters within which a client device 120 may access the resources 165. More specifically, a location perimeter may encompass a location to establish a buffer area within which the client device 120 is authorized to access the resources 165 based on its proximity to the location. As an example, an administrator of the distribution service 174 may designate the boundaries of the locations and/or location perimeters within which client devices 120 may access the resources 165. For instance, the designated boundaries of a location such as a corporate board meeting room may be smaller than the designated boundaries of a location such as a football stadium. Similarly, the designated boundaries of a location perimeter encompassing a corporate board meeting room may be smaller than the designated boundaries of a location perimeter encompassing a football stadium.

Additionally, the resources 165 may be associated with a set of distribution rules 171 that include a plurality of time rules 191. In one embodiment, the time rules 191 specify one or more times when a client device 120 may access the resources 165. In another embodiment, the time rules 191 specify one or more time windows within which a client device 120 may access the resources 165. As an example, an administrator of the distribution service 174 may designate the times when a client device 120 may access the resources 165 and/or may designate the time windows within which a client device 120 may access the resources 165.

Both the location rules 181 and time rules 191 may further specify that access to the associated resources 165 must be terminated once the client device 120 is no longer compliant with such distribution rules 171. The location rules 181 and time rules 191 may specify that access to the resources 165 is to be terminated by preventing a recipient client device 120 from accessing the resources 165 on the client device 120 while the client device 120 is non-compliant, by removing the resources 165 from the client device 120 once the client device 120 becomes non-compliant, and/or terminating access to the resources 165 by some other approach. For example, the distribution service 174 removes the resources 165 by transmitting a command to the client side application 126 to block access to the resources 165, delete the resources 165, and/or otherwise terminate access to the resources 165. Additionally, removing of the resources 165 from the client device 120 may include removing local copies of the resources 165, links to downloadable copies of the resources 165, downloaded copies of the resources 165, and/or any other copies of the resources 165. The distribution service 174 may also instruct the client side application 126 to restore the client device 120 to its default state, thereby removing all data related to the resource 165 from the client device 120.

A user operating a client device 120 may wish to access resources 165 stored on the distribution server 150. In one embodiment, the user may manipulate a user interface 137 rendered by the client side application 126 to transmit a request 177 for accessing one or more resources 165 on the distribution server 150. For instance, the user may provide user credentials 132, such as, a unique user name, a password, biometric data, and/or other types of user credentials 132 to request access to the distribution server 150. The client side application 126 may transmit the request 177 to the distribution service 174. In one embodiment, the request 177 may include the user credentials 135 provided by the user, the device identifier 135 that uniquely identifies the client device 120, and/or any other relevant information such as the location information 133 specifying the location of the client device 120 and time information 143 specifying the current time.

The distribution service 174 receives the request 177 and determines whether the user is authorized to access the resources 165 from the client device 120. For instance, the distribution service 174 may use an authorization approach as described in U.S. application Ser. No. 13/316,073 entitled "CONTROLLING ACCESS TO RESOURCES ON A NETWORK," which is incorporated herein by reference. As another example, the distribution service 174 may determine that the user is authorized to access the resources 165 from the client device 120 based on the user credentials 132 associated with the user of the client device 120 and the device identifier 135 associated with the client device 120 that are provided with the request 177.

Upon determining that the user is authorized to access the resources 165 from the client device 120, the distribution server 150 determines which of the resources 165 to provide to the client device 120. In one embodiment, the distribution service 174 determines which resources 165 to provide based on the resource grouping identifiers 154 associated with each resource 165. For instance, the distribution service 174 may first determine which resource grouping identifiers 154 are associated with the pairing of user credentials 132 and the device identifier 135 included in the request 177. In one embodiment, the distribution service 174 parses the listing of approved user credentials 156 and the listing of approved device identifiers 159 of each resource grouping identifier 154 to determine whether the respective resource grouping identifier 154 is associated with both the user credentials 132 and the device identifier 135.

Next, the distribution service 174 identifies a resource 165 to provide to the user of the client device 120 based on the determined resource grouping identifiers 154. In one embodiment, the distribution service 174 identifies one or more resources 165 associated with each one of the determined resource grouping identifiers 154. In another embodiment, the distribution service 174 identifies the resource 165 if the resource 165 is associated with all of the determined resource grouping identifiers 154. Additionally, in another embodiment, the distribution service 174 identifies the resource 165 if it is associated with a threshold number of the resource grouping identifiers 154. The distribution service 174 may then provide the identified resources 165 to the client device 120.

In one embodiment, before the identified resources 165 are provided to the client device 120, the distribution service 174 may encrypt the resources 165 and/or obfuscate the data of the resources 165 in a manner which only the intended recipient may access the resources 165. For example, the distribution service 174 may encrypt the resources 165 using symmetric encryption and then transmit both the resources 165 and the decryption key to the client device 120. Alternatively, if the distribution service 174 determines that the client device 120 has been previously provided with the decryption key associated with the distribution service 174, then the distribution service 174 may encrypt the resources 165 and transmit the resources 165 to the client device 120.

In another embodiment, before the identified resources 165 are provided to the client device 120, the distribution service 174 may additionally determine whether the client device 120 satisfies the distribution rules 171 associated with each one of the identified resources 165. For example, the distribution service 174 may determine whether the device profile 123 describing the state of the client device 120 satisfies the distribution rules 171 of each identified resource 165. As discussed above, the device profile 123 may include hardware specifications of the client device 120, software specifications of the client device 120, version information of various other components of the client device 120, location information 133, time information 143, and/or any other information profiling the client device 120. The distribution service 174 may, for instance, only transmit resources 165 to client devices 120 whose location information 133 indicates that the client device 120 satisfies location rules 181 associated with the resources 165. Similarly, the distribution service 174 may only transmit resources 165 to client devices 120 whose time information 143 indicates that the client device 120 satisfies time rules 191 associated with the resources 165. In one embodiment, the distribution service 174 may provide the client device 120 with access to each identified resource 165 if the client device 120 satisfies all of, or at least a portion of, the distribution rules 171 associated with each of the identified resources 165. Additionally, in another embodiment, the distribution service 174 may provide access to the identified resource(s) 165 if the client device 120 satisfies at least a threshold number of the distribution rules 171 associated with each of the identified resources 165.

Responsive to a determination that the client device 120 is in a state of compliance with the distribution rules 171, the distribution service 174 may be further executed to transmit the identified resources 165 to the client device 120. In one embodiment, the distribution service 174 may automatically transmit the identified resources 165 to the client device 120. In another embodiment, the distribution service 174 may make the identified resources 165 available for download by the client device 120 based on a resource qualifier 172 associated with the respective resource 165. For instance, the resource qualifier 172 may indicate the respective resource 165 be made available for download to the client device 120. In this example, the user may transmit a request 177 to the distribution service 174 to download the respective resource 165.

In one embodiment, the state of the client device 120 may have been modified between the time the distribution service 174 makes the identified resource 165 available for download and the time the distribution service 174 receives the request to download the identified resource 165. For example, the client device 120 may have switched connectivity from a secured network 110 to an unsecured network 110. In this embodiment, the distribution service 174 may determine for a second time whether the client device 120 satisfies the distribution rules 171 associated with the resources 165. For example, the request 177 to download transmitted from the client device 120 may include an updated device profile 123. The distribution service 174 may make the second determination of whether the client device 120 satisfies the distribution rules 171 based on the updated device profile 123. For instance, the distribution rules 171 may require that the client device 120 be connected to a secured network 110 to gain access to the resource 165 and the second determination of compliance may reveal that the client device 120 is connected to an unsecured network 110. Responsive to the second determination that the client device 120 satisfies the distribution rules 171 associated with the resources 165, the distribution service 174 may provide the resources 165 to the client device 120.

In another embodiment, the device profile 123 may be periodically transmitted by the client side application 126 to the distribution server 150. In this embodiment, each time the device profile 123 is transmitted to the distribution server 150, the distribution service 174 may determine whether the updated client device 120 satisfies the distribution rules 171 using the updated device profile 123. Upon determining that a client device 120 no longer satisfies the distribution rules 171, the distribution service 174 may be further executed to temporarily terminate access to the resources 165 by hiding the presentation of the resources 165 on the client device 120 until the client device 120 returns to a compliant state, permanently terminate access to the resources 165 by deleting the resources 165 from the client device 120, and/or otherwise terminate access to the resources 165. For example, the distribution service 174 may determine that a client device 120 is no longer satisfies the location rules 181 and/or the time rules 191 associated with distributed resources 165 based on updated location information 133 and/or time information 143, respectively. In response, the distribution service 174 may terminate access to the resources 165 associated with the location rules 181 and/or time rules 191 that are not satisfied by the client device 120.

In another embodiment, the distribution service 174 may transmit the distribution rules 171 associated with each one of the identified resources 165 to the client device 120. For example, the distribution service 174 may transmit the distribution rules 171 to the client side application 126 for determining whether the client device 120 satisfies the distribution rules 171. In one embodiment, the distribution service 174 may not determine whether the client device 120 satisfies the distribution rules 171 associated with each of the identified resources 165 and instead permit the client side application 126 to make this determination. For instance, the client side application 126 may determine whether the client device 120 satisfies the distribution rules 171 associated with a received resource 165 prior to rendering the received resource 165 on the display 136.

In another embodiment, the distribution service 174 may transmit the distribution rules 171 to the client device 120 prior to transmitting the identified resources 165. The client side application 126 may then determine whether the client device 120 satisfies the distribution rules 171, as described above. The client side application 126 may then transmit an indication back to the distribution service 174 of the compliance status. Responsive to receiving an indication from the client device 120 that the client device 120 satisfies all and/or a sufficient portion of the distribution rules 171 associated with each respective resource 165, the distribution service 174 may then transmit the appropriate identified resources 165 to the client device 120. Additionally, the client side application 126 may store the distribution rules 171 in a memory associated with the client device 120, such as the data store 122. Upon subsequent requests to access the identified resource 165, the distribution service 174 may wait to receive an indication from the client side application 126 that the client device 120 satisfies the distribution rules 171 associated with the requested resource 165 before transmitting the resource 165. For example, the client side application 126 may use the stored distribution rules 171 received from a previous request to make the compliance determination and transmit the request 177.

The distribution service 174 may be further executed to log all activity related to the resources 165 for asset tracking purposes. For example, the distribution service 174 may log activities such as transmission of resources 165, historical data related to the transmission of the resource 165, data related to the rendering of the resources 165 by the client device 120, data related to a storage location of the resources 165, data related to communication with the client device 120, data related to resource qualifiers 172 associated with the resources 165, data related to client device 120 compliance with distribution rules 171, data related to usage and availability of bandwidth, and/or any other data related to the resources 165.

In an additional embodiment, the distribution service 174 may periodically determine whether the transmitted resources 165 have been modified on the client device 120 and synchronize the modified resource 165 on the client device 120 with the unmodified resource 165 on the distribution server 150. For instance, the distribution service 174 may determine whether the resource 165 has been modified based on an edit date, modified date, and/or an access date associated with the resource 165. In this embodiment, the distribution service 174 may periodically request to receive the relevant date from the client side application 126. Upon receiving the relevant date, the distribution service 174 compares the relevant date from the client device 120 with the corresponding date on the distribution server 150 and determines to synchronize the respective resources 165 if the two relevant dates do not match. For instance, the distribution service 174 may employ a synchronization approach as is known in the art. In one embodiment, the distribution service 174 may employ the synchronization approach after determining whether the user is permitted to modify the resource 165 on the client device 120. In another embodiment, the distribution service 174 may remove the resource 165 on the client device 120 upon synchronizing with the distribution server 150. In another embodiment, the distribution service 174 stores the modified resource 165 in the data store 153 as one of a plurality of versions of the respective resource 165.

In another embodiment, the client side application 126 may be pre-authorized to access at least some of the resources 165 hosted by the distribution server 150. In such embodiments, the distribution service 174 may be configured to provide to the client side application 126 a listing of all resources 165 available for download by the client device 120 based only on certain embedded authorization data (e.g., device identifier 135, and/or device profile 123, etc.) and without requiring the client side application 126 to provide additional authorization data (e.g., user name and password). For example, the distribution service 174 may identify resources 165 to include in the listing by determining which of the resources 165 are associated with distribution rules 171 that correspond with the device profile 123 of the client device 120. As another example, the distribution service 174 may provide a listing of resources 165 that may be accessible to client devices 120 based at least in part on the location information 133 and the time information 143 as indicated by the device profile 123 of the client device 120. In this example, the distribution service 174 may determine that a resource 165 is accessible to the client device 120 if its location information 133 satisfies location rules 181 associated with the resources 165 and/or if its time information 143 satisfies time rules 191 associated with the resources 165. The distribution service 174 may then allow the client side application 126 to download at least some of the available resources 165.

However, one or more of the available resources 165 may be associated with a distribution rule 171 that requires additional authorization. For instance, the resource 165 may be a document containing sensitive information that requires authorization of a username and password or other additional authorization data. Thus, if the client side application 126 submits a request to download such a resource 165, the distribution server 174 may prompt the client side application 126 to provide additional authorization data. In response, the client side application 126 may prompt the user to provide user credentials 132. In one embodiment, the client side application 126 may transmit the user credentials 132 and/or the device identifier 135 of the client device 120 to the distribution service 174. The distribution service 174 may then authorize the user to access the sensitive resource 165 using an authorization approach as described in U.S. application Ser. No. 13/316,073 entitled "CONTROLLING ACCESS TO RESOURCES ON A NETWORK," which is incorporated herein by reference. Upon determining that the user is authorized to access the sensitive resource 165 from the client device 120, the distribution service 174 may allow the client side application 126 to download the sensitive resource 165.

Figure 2:
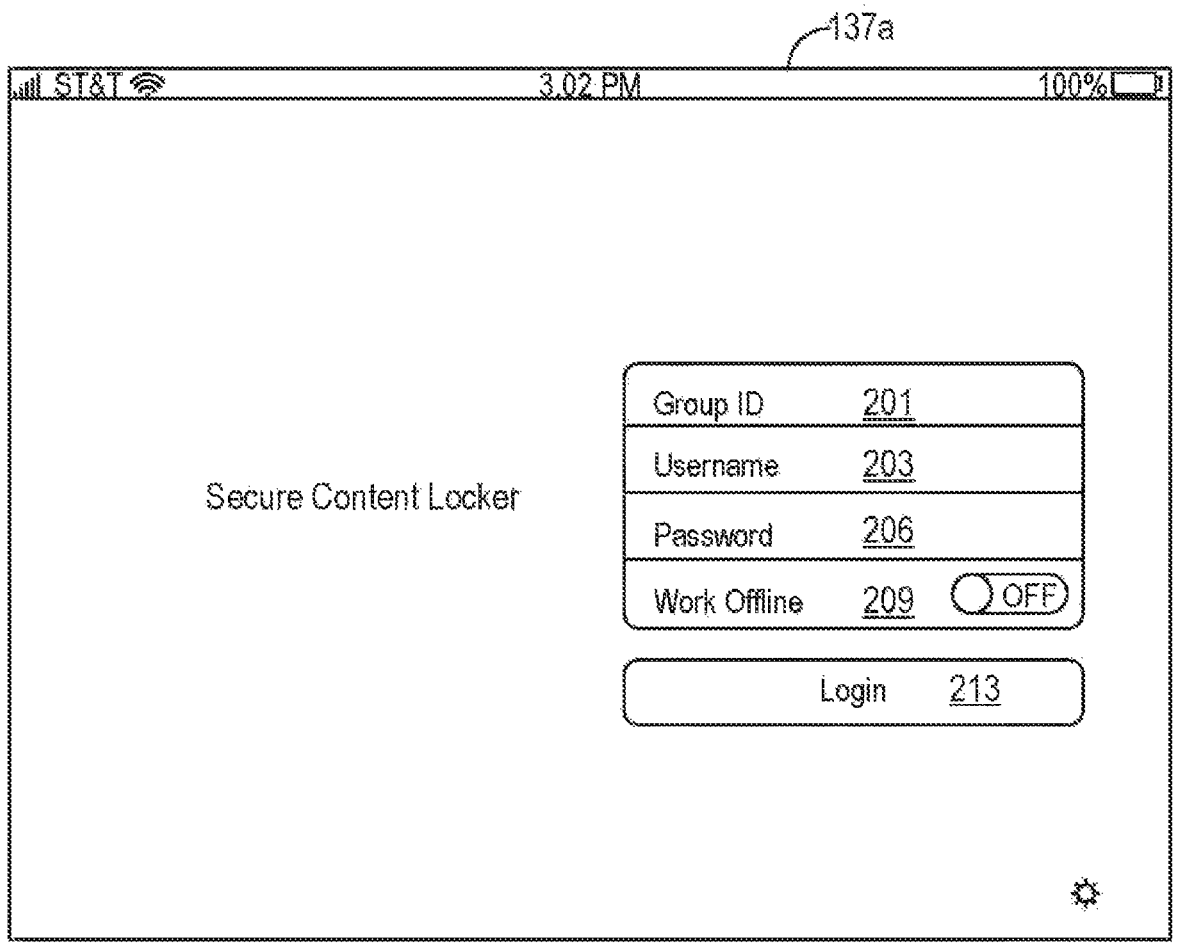
Figure 3:
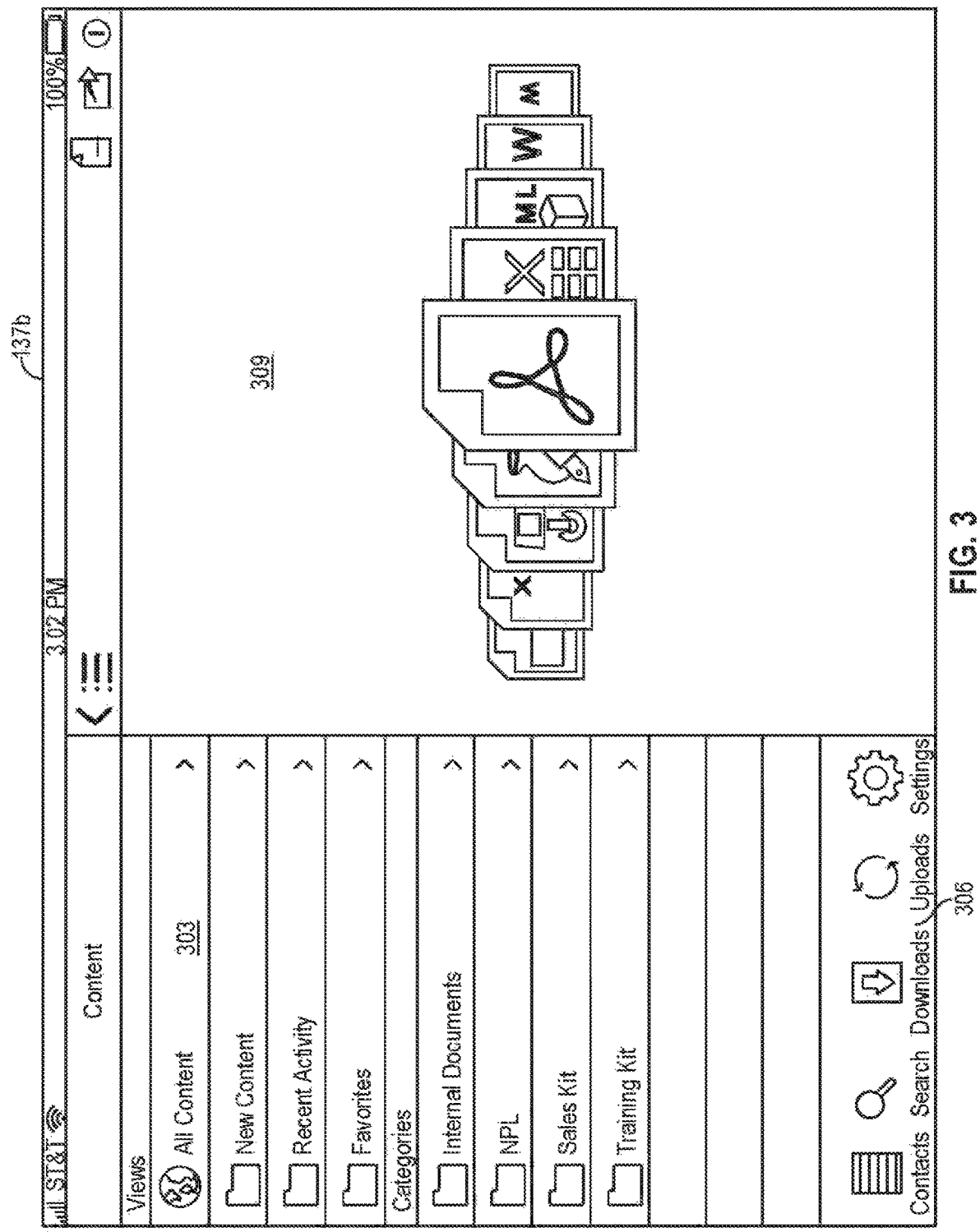
Figure 4:
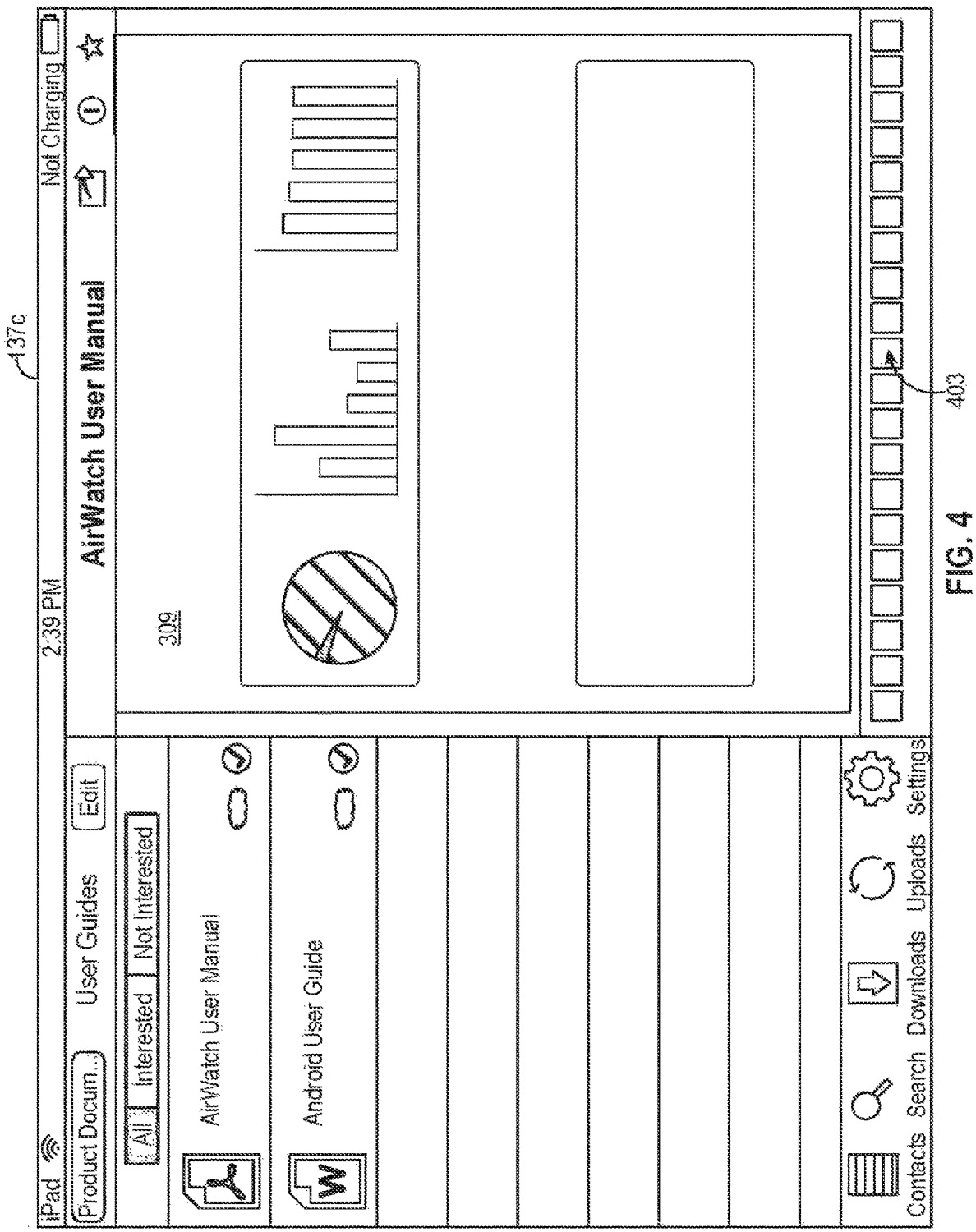

Next, an exemplary set of user interfaces is discussed in connection with FIGS. 2-7, depicting user interfaces that may be displayed as a client device requests access to the distribution server 150 and receives any available resources 165, if appropriate. In one embodiment, the user interfaces 137 depicted in FIGS. 2-4 are generated by the distribution service 174 (FIG. 1) and rendered by the client side application 126 (FIG. 1) on the display 136 (FIG. 1) of the client device 120 (FIG. 1). In another embodiment, the user interfaces 137 depicted in FIGS. 2-4 are generated and rendered by the client side application 126 on the display 136. The graphical elements and components that comprise user interfaces 137 of FIGS. 2-4 are presented by way of example only. Other approaches for presenting the content depicted in the exemplary user interfaces 137 and/or for presenting other content for implementing the subject matter described herein will be readily appreciated by those skilled in the art.

FIG. 2 is an example of a log-in interface 137*a*, according to certain embodiments of the present disclosure. The exemplary log-in interface 137*a* allows a user to provide user credentials 132 (FIG. 1) in order to request access to the distribution server 150 (FIG. 1). For example, the log-in interface 137*a* may include a group ID field 201, a username field 203, a password field 206, a work offline switch 209, and a login button 213. The user may provide one or more resource grouping identifiers 154 (FIG. 1) in the group ID field 201, user credentials 132 in the username field 203, and a password in the password field 206. Additionally, the user may optionally elect whether to access the distribution server 150 via an offline mode by activating the work offline switch 209. For example, the user may wish to access the resources 165 (FIG. 1) that have been previously stored locally on the client device 120 (FIG. 1), without establishing a current connection to the distribution service 174 (FIG. 1). Invoking the login button 213 transmits a request 177 (FIG. 1) to access the distribution server 150. In one embodiment, the client side application 126 transmits the request 177 that may include the user credentials 132, a device identifier 135 (FIG. 1) of the client device 120, and a device profile 123 (FIG. 1) of the client device 120, as discussed above. As will be appreciated, the client side application 126 may be configured to access the device identifier 135 and device profile 123 from the data store 122 (FIG. 1).

FIG. 3 is an example of a browsing interface 137*b*, according to certain embodiments of the present disclosure. The exemplary browsing interface 137*b* provides functionality for browsing resources 165 (FIG. 1) accessible to the client device 120 (FIG. 1). In this example, the browsing interface 137*b* includes a content navigation area 303, an interface navigation area 306, and a content viewing area 309. The content navigation area 303 may include a plurality of navigation controls to browse through the available resources 165 provided to the user. As an example, the navigation controls may permit the user to browse "all content," "new content," recent activity," "favorites," and/or browse by a category. For example, resources 165 available to the user and client device 120 may be accessible through one or more of the navigation controls based on a plurality of resource qualifiers 172 (FIG. 1) associated with each of the respective resources 165. The resource qualifier 172 may indicate that the respective resource 165 is marked as a "favorite," for instance.

Additionally, the interface navigation area 306 may include a plurality of navigation controls to navigate through the interface generated by the distribution service 174 (FIG. 1). For instance, the navigation controls may include a "content" button, a "search" button, a "downloads" button, an "updates" button, and a "settings" button. In one embodiment, invoking the "content" button may transmit a request 177 (FIG. 1) to the distribution service 174 to view all and/or a portion of the resources 165 available to the client device 120. Invoking the "search" button may transmit a request 177 to the distribution service 174 to search the data store 153 for a specific resource 165. For instance, the user may be able to search by a name, genre, type, category, creation date, owner, and/or any other aspect of the resource 165. Invoking the "downloads" button may transmit a request 177 to the distribution service 174 to view and/or otherwise access all previously downloaded resources 165 (e.g., previously downloaded by the current client device 120 or by other client devices 120 operated by the user). In another embodiment, invoking the "downloads" button may also transmit a request 177 to the distribution service 174 to download any resources 165 made available to the user. Invoking the "updates" button may transmit a request 177 to the distribution service 174 to view and/or otherwise access available updates for the client side application 126. Additionally, invoking the "settings" button may transmit a request 177 to the distribution service 174 to view, change, and/or otherwise access any settings and/or preferences associated with the client side application 126.

The content viewing area 309 may include a viewing area for viewing, accessing, manipulating, editing, executing, consuming, and/or otherwise using the resource 165 provided by the distribution service 174. In one embodiment, the resources 165 may be automatically received from the distribution server 150 and made available for the user in the content viewing area 309. For example, the distribution service 174 may automatically transmit a resource 165 to the client device 120 based on one or more resource qualifiers 172, as discussed above. In another embodiment, the user may be presented with a download button to transmit a request 177 to download a resource 165 made available by the distribution service 174. For example, the distribution service 174 may provide a resource 165 to be available upon a download request 177 by the user of the client device 120 based on one or more resource qualifiers, as discussed above.

FIG. 4 is another example of a user interface 137, denoted herein as user interface 137*c*, according to certain embodiments of the present disclosure. The exemplary user interface 137*c* depicts a resource 165 (FIG. 1) displayed in the content viewing area 309. For instance, the resource 165 may be a document comprising a plurality of pages that may be navigated using a resource navigation panel 403. In one embodiment, the resource 165 displayed in the content viewing area 309 may be edited by the user, saved locally, saved on a removable drive, saved on a cloud device, emailed, transmitted via a social network, and/or otherwise manipulated using tools and functions provided by the client side application 126 (FIG. 1). Additionally, the distribution rules 171 associated with the displayed resource 165 may regulate whether the resource 165 may be manipulated, as discussed above. For instance, the distribution rules 171 may prevent the resource 165 from being edited, emailed and/or transmitted via a social network.

Figure 6:
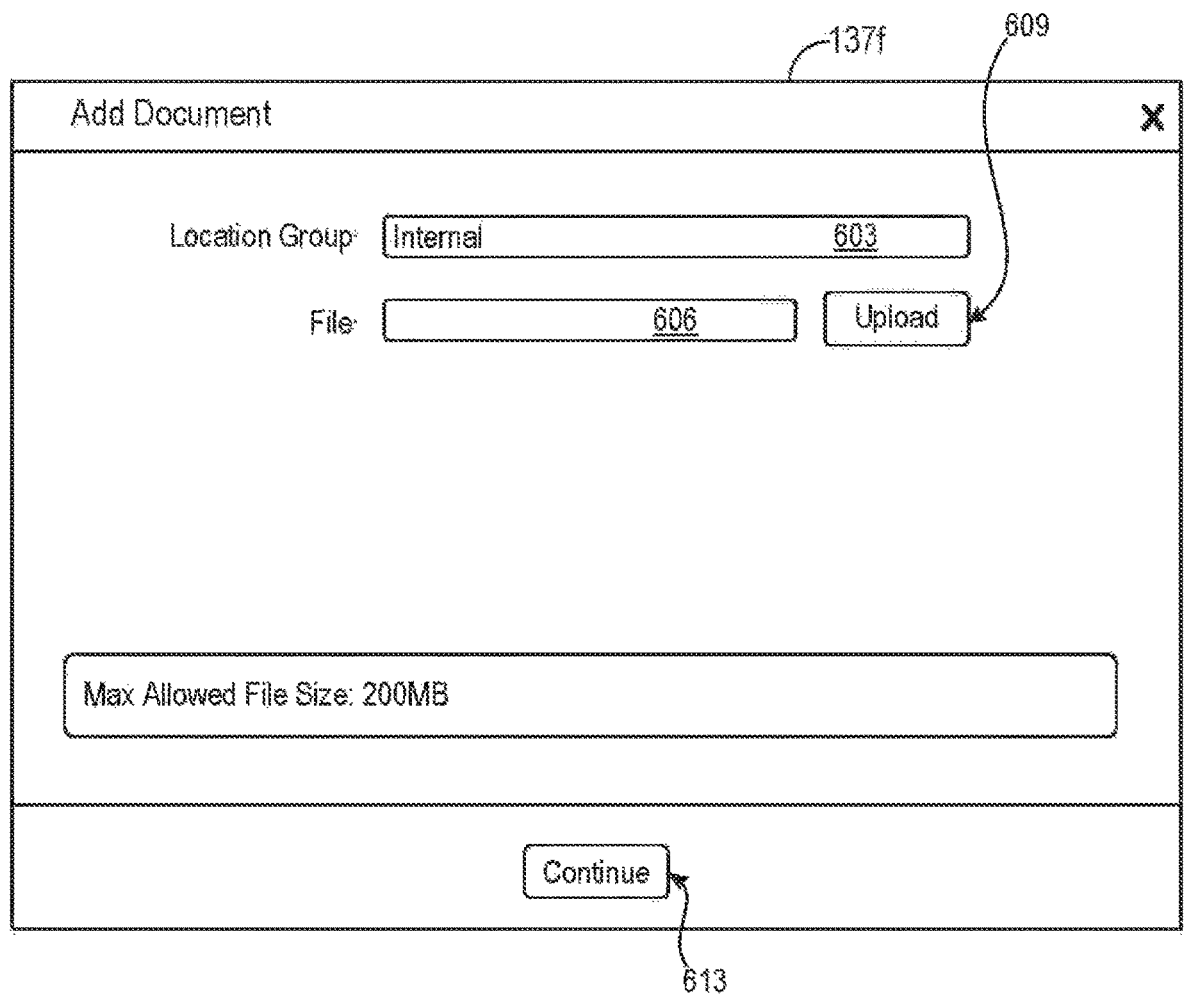

Next, an exemplary set of user interfaces 137 (FIG. 1) is discussed in connection with FIGS. 5-7, depicting user interfaces 137 that may be displayed for a user managing resources 165 (FIG. 1) hosted by the distribution server 150 (FIG. 1). In one embodiment, the user interfaces 137 depicted in FIGS. 5-7 are generated by the distribution service 174 (FIG. 1) and rendered by the client side application 126 (FIG. 1) and/or a browser on the display 136 (FIG. 1) of the client device 120 (FIG. 1). In another embodiment, the user interfaces 137 depicted in FIGS. 5-7 are generated and rendered by the client side application 126 and/or a browser on the display 136. The graphical elements and components that comprise user interfaces 137 of FIGS. 5-7 are presented by way of example only. Other approaches for presenting the content depicted in the exemplary user interfaces 137 and/or for presenting other content for implementing the subject matter described herein will be readily appreciated by those skilled in the art.

FIG. 5 is an example of a landing interface 137e for an administrator of the distribution server 150, according to certain embodiments of the present disclosure. The exemplary landing interface 137e includes a resource group indicator 501, navigation area 503, and a documents area 506. In one embodiment, the resource group indicator 501 may depict a resource grouping identifier 154 (FIG. 1) currently being managed. As an example, user interface 137e depicts the resources 165 associated with the resource grouping identifier 154 called "Team Kyle." A drop-down button may be associated with the resource group indicator 501 for managing resources 165 (FIG. 1) associated with other resource grouping identifiers 154. The navigation area 503 may include a plurality of navigation controls that permit the user to manage the content hosted by the distribution server 150 that is associated with the resource grouping identifier 154 depicted by the resource group indicator 501. For example, the navigation controls may include a plurality of buttons, such as a "documents" button, to manage resources 165 associated with the "Team Kyle" resource grouping identifier 154.

Additionally, the documents area 506 includes a listing of resources 165 that are associated with the resource grouping identifier 154 depicted by the resource group indicator 501. In one embodiment, the resources 165 may be presented in a table 509 where each row in the table includes identifying information for each of the respective resources 165. For instance, the table may include a name of the resource 165, a type of the resource 165, a brief description of the resource 165, an owner of the resource 165, an effective date of the resource 165, and a date of last modification of the resource 165. Additionally, a plurality of management buttons 513 may be presented for each resource 165. For instance, the management buttons 513 may permit the administrator to edit the resource qualifiers 172 (FIG. 1) associated with the resource 165, add version information, view a listing of resource grouping identifiers 154 with access to the respective resource 165, download a copy of the resource 165, and remove the resource 165 from being hosted by the distribution server 150.

In one embodiment, the documents area 506 may also include an "add document" button 516, a "bulk import" button 519, and sorting options 523. For instance, invoking the "add document" button 516 may transmit a request to the distribution service 174 to add new resources 165 to be hosted by the distribution server 150, as will be described with respect to FIGS. 6 and 7. Additionally, invoking the "bulk import" button 519 may transmit a request 177 (FIG. 1) to the distribution service 174 to simultaneously add and/or import a plurality of resources 165, as can be appreciated. Further, the sorting options 523 may include a plurality of options for the administrator to transmit a request 177 to sort the resources 165 presented in the table 509, such as according to a resource category, a resource type and/or any other sorting option.

FIG. 6 is an example of a user interface 137f that allows an administrator to add a new resource 165 to be hosted by the distribution server 150, according to certain embodiments of the present disclosure. For instance, the user interface 137f includes a grouping field 603, a resource field 606, an upload button 609, and a continue button 613. In one embodiment, the administrator may provide one or more resource grouping identifiers 154 (FIG. 1), in the grouping field 603, that permit users and client devices 120 to access the new resource 165 to be added. Additionally, an administrator may indicate a location of the new resource 165 to be added in the resource field 606. For example, the administrator may specify the location of the new resource 165 to be added as residing on a SharePoint sever, a cloud storage account, and/or any other storage system accessible to the client device 120 and/or the distribution server 150. Invoking the upload button 609 transmits a request 177 (FIG. 1) to the distribution service 174 to upload the resource 165 specified in the resource field 606 and to associate it with the resource grouping identifiers 154 specified in the grouping field 603. Invoking the continue button 613 may transmit a request 177 to the distribution service 174 to advance to another user interface 137, such as the interface described with respect to FIG. 7.

FIG. 7 is an example of a user interface 137g that allows an administrator to specify distribution rules 171 for a resource 165, according to certain embodiments of the present disclosure. In one embodiment, the user interface 137g includes a rules navigation panel 703, a rules specification area 706, a save button 709, and a reset button 713. The rules navigation panel 703 may include a plurality of tabs for specifying various types of distribution rules 171. For example, the tabs may include an "information" tab for providing general information related to the resource 165, a "details" tab for providing specific details related to the resource 165, a "previous versions" tab for providing distribution rules 171 related to a previous version of the resource 165, a "security" tab for providing security measures such as encryption and/or write capability for the resource 165, an "assignment" tab for providing ownership criteria related to the resource 165, and a "deployment" tab for specifying whether the resource 165 will be made available for download or automatically transmitted to a user upon request. Activation of each tab will change the user interface 137g to display fields, buttons, menus, and/or other components for inputting the appropriate details.

In one embodiment, invoking one of the tabs in the navigational panel 703 may transmit a request 177 (FIG. 1) to the distribution server 150 to specify distribution rules 171 associated with the respective type. As shown in FIG. 7, the rules specification area 706 depicts a plurality of fields for specifying distribution rules 171 related to the information tab. For example, the fields in the rules specification area 706 may include a field for specifying a name, a location, a version, a description, an importance level, a resource grouping identifier 154, and/or any other information related to the new resource 165. Additionally, invoking the save button 709 may transmit a request 177 to the distribution service 174 to save the distribution rules 171 specified via the user interface 137g. Invoking the reset button 713 may transmit a request 177 to the distribution service 174 to reset the distribution rules 171 associated with a particular resource.

Figure 8:
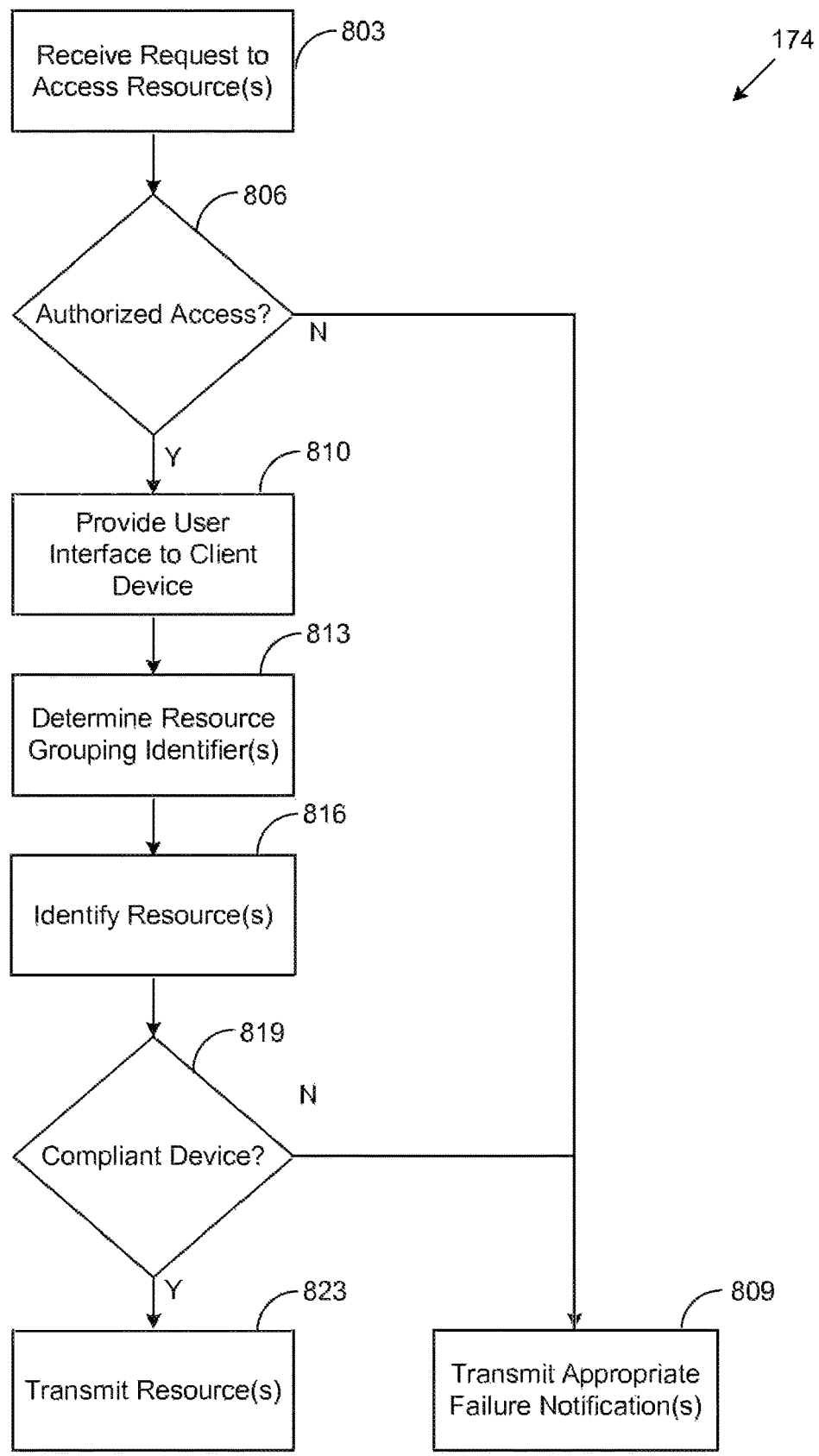
FIG. 8 is a flowchart illustrating exemplary functionality performed by a distribution service executed by a distribution server in the networked environment of FIG. 1 according to certain embodiments of the present disclosure.

FIG. 8 is a flowchart illustrating exemplary functionality performed by the distribution service 174 (FIG. 1) according to certain embodiments. It is understood that the flowchart of FIG. 8 provides merely an example of the many different types of functional arrangements that may be employed to implement the operation of the distribution service 174 as described herein. As an alternative, the flowchart of FIG. 8 may be viewed as depicting an example of steps of a method implemented in the distribution server 150 (FIG. 1) according to one or more embodiments.

Beginning with step 803, the distribution service 174 receives a request 177 (FIG. 1) from a client device 120 (FIG. 1) to access resources 165 (FIG. 1) hosted by the distribution server 150. In one embodiment, the request 177 may include a device identifier 135 (FIG. 1) associated with the client device 120 and user credentials 132 (FIG. 1) of the user operating the client device 120. In another embodiment, the request 177 may additionally include a device profile 123 (FIG. 1) and/or information related to the device profile 123 that describes a state of the client device 120.

Next, in step 806, the distribution service 174 determines whether the client device 120 and the user operating the client device 120 are authorized to access the resources 165 hosted by distribution service 174. In one embodiment, the distribution service 174 may authorize the user and client device 120 pairing according to the approach described in application Ser. No. 13/316,073 entitled "CONTROLLING ACCESS TO RESOURCES ON A NETWORK," as described above. If the distribution service 174 determines that the user may not access the resources 165 from the client device 120, then the distribution server 150 advances to step 809 and notifies the user. For instance, the distribution service 174 may transmit a notification indicating that the user is not authorized to access the resources 165 from the client device 120.

Returning to step 806, if the distribution service 174 determines that the user is authorized to access the resources 165, then the distribution service 174 proceeds to step 810 and provides a user interface 137 (FIG. 1) to the client device 120. For instance, the distribution service 174 may provide a browsing interface 137b as shown in FIG. 3 to the client device 120. Then, in step 813, the distribution service 174 determines the resource grouping identifiers 154 of the resources 165 accessible by the user from the client device 120. In one embodiment, the distribution service 174 determines the resource grouping identifiers 154 based on the user credentials 132 of the user and the device identifier 135 of the client device 120. For instance, each resource grouping identifier 154 may be associated with a pairing of user credentials 132 and a device identifier 135. The distribution service 174 may determine one or more resource grouping identifiers 154 associated with the pairing of user credentials 132 and the device identifier 135, as described above.

Then, in step 816, the distribution service 174 identifies the resources 165 that are associated with the determined resource grouping identifiers 154. In one embodiment, each resource 165 may be associated with more than one resource grouping identifier 154. Additionally, each resource grouping identifier 154 may have an association with more than one resource 165, as described above. Upon identifying all of the resources 165 associated with the determined resource grouping identifiers 154, the distribution service 174 proceeds to step 819 and determines whether the client device 120 from which the request 177 was received complies with the distribution rules 171 associated with each one of the identified resources 165. In one embodiment, the distribution service 174 determines whether the client device 120 is compliant based on the device profile 123 associated with the client device 120. For instance, the distribution service 174 may have received the device profile 123 in conjunction with the request 177. As another example, the distribution service 174 may determine whether the location information 133 (FIG. 1) associated with the client device 120 satisfies the location rules 181 associated with an identified resource 165.

If the distribution service 174 determines that the client device 120 does not comply with any of the distribution rules 171 associated with each one of the resources 165, then the distribution service 174 proceeds to step 809 and transmits a notification of noncompliance to the client device 120. In one embodiment, the distribution service 174 may determine that the client device 120 complies with the distribution rules 171 of a portion of the identified resources 165. In this example, the distribution service 174 may transmit a notification of noncompliance to the client device 120 that includes a name of the identified resources 165 and a message that the client device 120 is not authorized to receive due to noncompliance with the distribution rules 171 associated with the identified resource 165.

Returning to step 819, if the distribution service 174 determines that the client device 120 complies with the distribution rules 171 of all and/or a portion of the identified resources 165, the distribution service 174 proceeds to step 823 and transmits the identified resources 165 associated with the distribution rules 171 with which the client device 120 is in compliance. In one embodiment, the distribution service 174 automatically transmits the identified resources 165 that the client device 120 is authorized to receive based on compliance with distribution rules 171. In another embodiment, the distribution service 174 may make available for download the identified resources 165 that the client device 120 is authorized to receive. For instance, the client device 120 may receive an indication that the resource 165 is available for download and may transmit a request 177 to the distribution service 174 for downloading the applicable resource 165. Upon receiving the request, the distribution service 165 may transmit the resource 165 to the client device 120. Additionally, in another embodiment, the distribution rules 171 associated with the transmitted resources 165 may be transmitted in conjunction with the resources 165. For instance, a client side application 126 (FIG. 1) on the client device 120 may periodically determine whether the client device 120 remains compliant to access the received resources 165, as described above.

Figure 9:
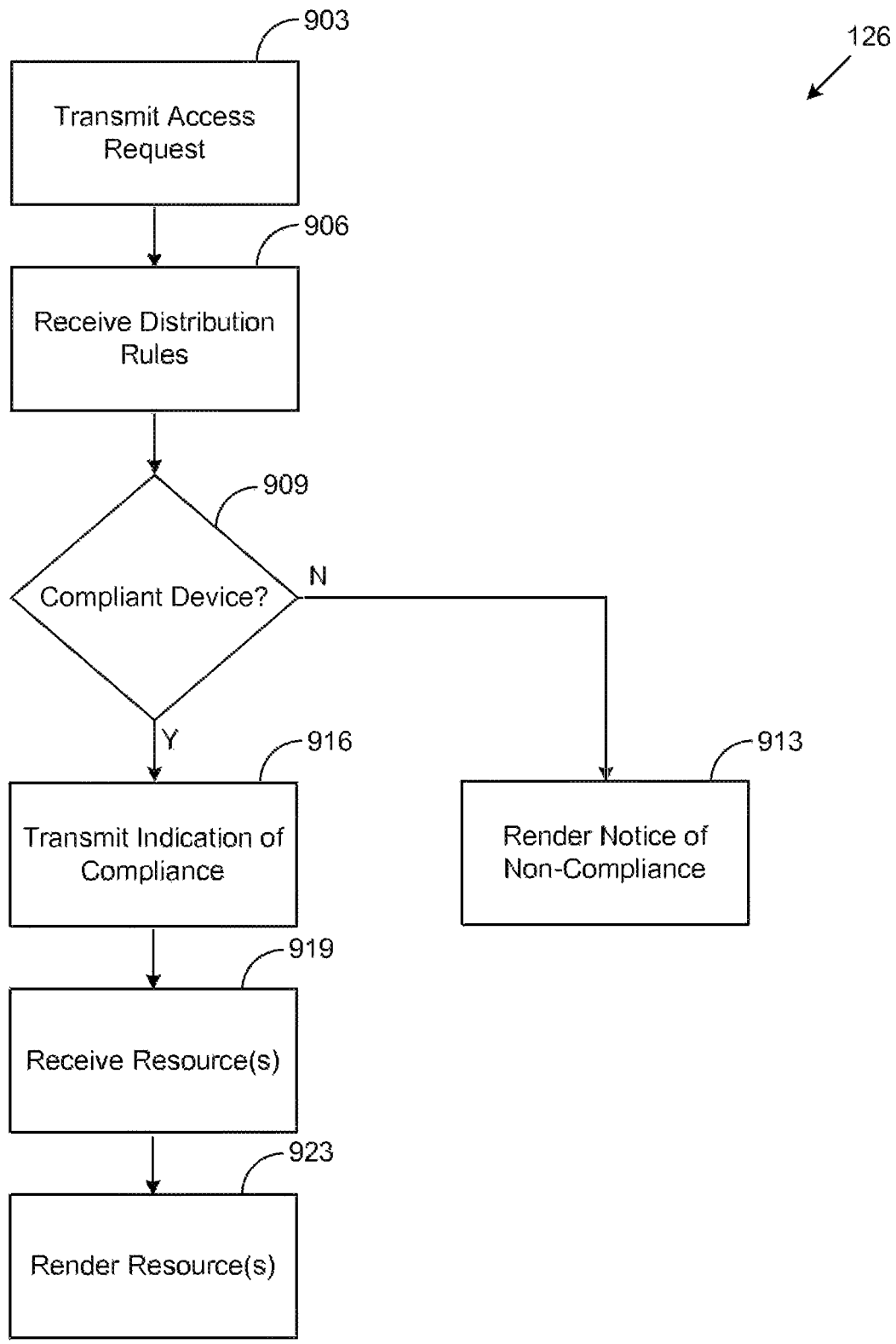
FIG. 9 is a flowchart illustrating exemplary functionality performed by a client side application executed by a client device in the networked environment of FIG. 1 according to certain embodiments of the present disclosure.

FIG. 9 is a flowchart illustrating exemplary functionality performed by a client side application 126 (FIG. 1) according to certain embodiments. It is understood that the flowchart of FIG. 9 provides merely an example of the many different types of functional arrangements that may be employed to implement the operation of the client side application 126 as described herein. As an alternative, the flowchart of FIG. 9 may be viewed as depicting an example of steps of a method implemented in the client device 120 (FIG. 1) according to one or more embodiments.

Beginning with step 903, the client side application 126 transmits a request 177 (FIG. 1) to the distribution service 174 (FIG. 1) to access resources 165 (FIG. 1). In one embodiment, the client side application 126 may include user credentials 132 (FIG. 1) of a user and a device identifier 135 (FIG. 1) of the client device 120 in conjunction with the request 177. For instance, the client side application 126 may prompt the user of the client device 120 to provide the user credentials 132 for requesting the access and may access the device identifier 135 from a local data store 122 or from the device hardware of the client device 120.

Then, in step 906, the client side application 126 receives a plurality of sets distribution rules 171 (FIG. 1) from the distribution server 150 (FIG. 1). In one embodiment, the client side application 126 may receive the sets of distribution rules 171 if the user and the client device 120 are authorized to access the resources 165. For instance, the user and the client device 120 may be authorized based on the user credentials 132 and the device identifier 135 transmitted in conjunction with the request 177. In addition, each of the received sets of distribution rules 171 may be associated with one of a plurality of resources 165 that are determined to be accessible to the user and the client device 120. For instance, the resources 165 accessible to the user and the client device 120 may be determined based on a plurality of resource grouping identifiers 154 (FIG. 1), wherein the resource grouping identifiers 154 are determined based on the user credentials 132 of the user and the device identifier 135 of the client device 120, as described above.

Upon receiving the distribution rules 171, the client side application 126, in step 909, determines whether the client device 120 is compliant with the sets of distribution rules 171 associated with the resources 165 accessible to the user and client device 120 pairing. In one embodiment, the client side application 126 may determine whether the client device 120 is compliant with the sets of distribution rules 171 based on the device profile 123 (FIG. 1) of the client device 120, as described above. If the client side application 126 determines that the client device 120 is not compliant with a portion and/or all of the sets of distribution rules 171, then the client side application 126 proceeds to step 913 and renders a notice of non-compliance on a display 136 (FIG. 1) of the client device 120. In one embodiment, the notice may identify a plurality of resources 165 associated with the sets of distribution rules 171 that resulted in the non-compliance. Additionally, if the client side application 126 determines that the client device 120 is not compliant with any of the sets of distribution rules 171, the client side application may transmit a notification to the distribution service 174 indicating that the client device 120 is non-compliant.

Returning to step 909, if the client side application 126 determines that the client device 120 is compliant with all and/or a portion of the sets of distribution rules 171, then the client side application 126 proceeds to step 916 and transmits an notification of compliance to the distribution service 174. In one embodiment, if the client side application 126 determines that the client device 120 is compliant with only a portion of the sets of distribution rules 171, then the notification may include an indication of the sets of distribution rules 171 with which the client device 120 complies.

Then, in step 919, the client side application 126 receives the resources 165 associated with the distribution rules 171 with which the client device 120 complies. In one embodiment, the resources 165 may be automatically received by the client device 120. In another embodiment, the client side application 126 may receive an indication that the resources 165 are available for download. In step 923, the received resources 165 are rendered on the display 136. In one embodiment, the client side application 126 may render a notification to the user that the resources 165 are available for download. Then, upon receiving a request 177 from the user to download the resources 165, the client side application 126 may download the resources 165 from the distribution server 150 and render the downloaded resources 165 on the display 136.

Figure 10:
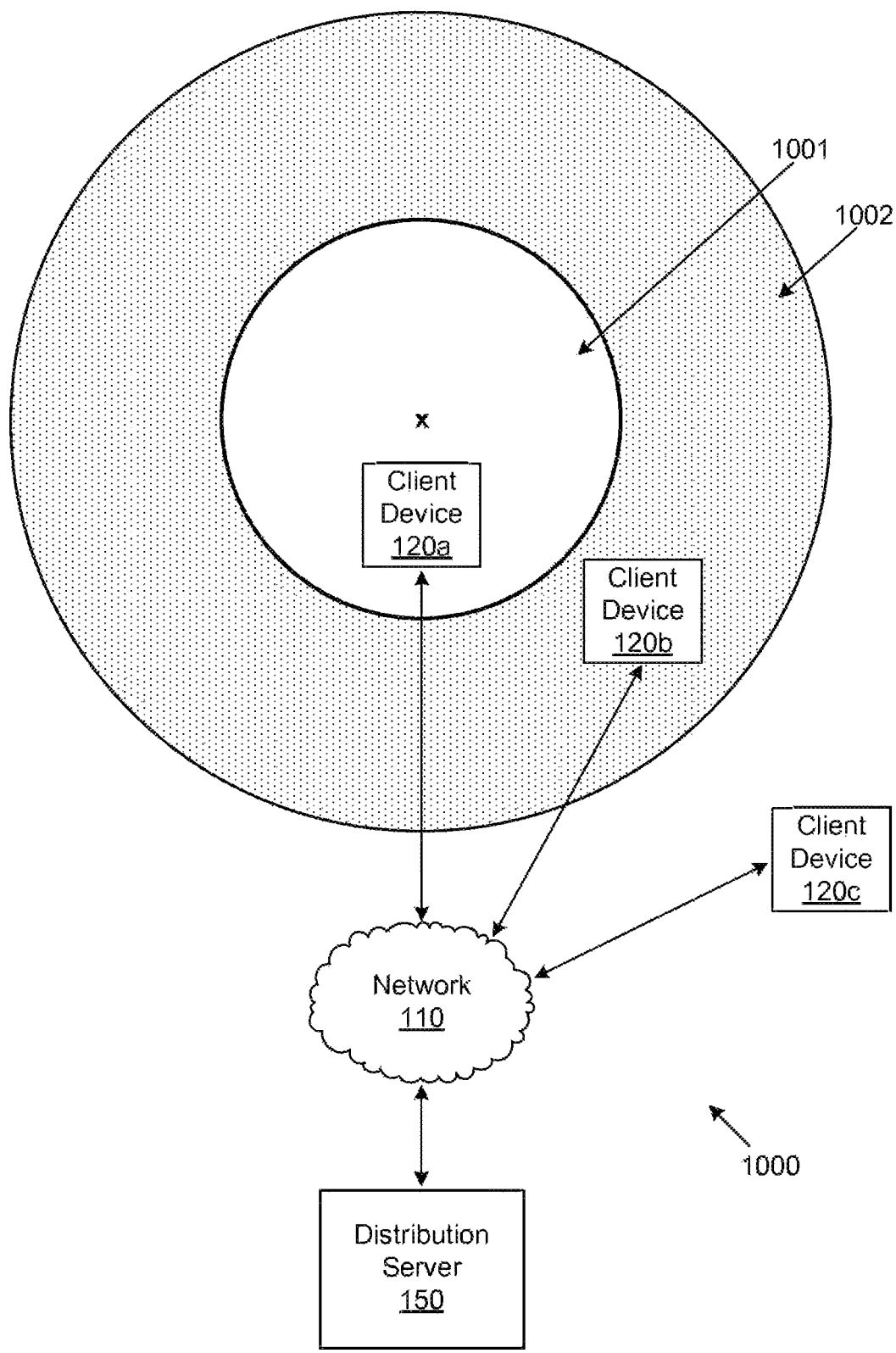
FIG. 10 is a flowchart illustrating exemplary functionality performed by a client side application executed by a client device in the networked environment of FIG. 1 according to certain embodiments of the present disclosure.

FIG. 10 illustrates a second networked environment 1000 according to various embodiments, similar to the networked environment 100 of FIG. 1. Here, the network 110 may also be or include, for example, any type of wireless network such as a wireless local area network (WLAN), a wireless wide area network (WWAN), or any other type of wireless network. Additionally, the network 110 may be or include the Internet, intranets, extranets, microwave networks, satellite communications, cellular systems, PCS, infrared communications, global area networks, or other suitable networks, etc., or any combination of two or more such networks. For example, the network 110 may include satellite communications such as passive communication systems, active communication systems, global positioning systems, and multibeam communication systems. The network 110 facilitates transmitting resources 165 (FIG. 1) between a distribution server 150 and client devices 120, such as client devices 120*a*, 120*b*, and 120*c*. More specifically, the network 110 facilitates transmitting resources 165 between a distribution service 174 (FIG. 1) executed on the distribution server 150 and a client side application 126 (FIG. 1) executed on each of the client devices 120. The client side application 126 may be "containerized" to restrict the resources 165 from being utilized in an unauthorized manner, such as transmitting the resources 165 outside of the containerized environment of the client side application 126. In particular, the administrator of the distribution service 174 may configure one or more restrictions to control the manner of which resources 165 may be utilized within the containerized client side application 126.

The network 110 may also facilitate the identification of location information 133 (FIG. 1) describing the location of client devices 120 by employing one or more client device 120 positioning methodologies well known in the art. In one embodiment, the location of a client device 120 may be identified based on the client device's detection of the presence of a transmission beacon. Transmission beacons may include Wi-Fi beacons, Bluetooth beacons, microwave beacons, infrared beacons, ultrasound beacons, cellular beacons, satellite beacons, and/or other types of beacons related to transmission. The location of a transmission beacon may be known, as many transmission beacon types require fixed physical installations. The characteristics of a transmission beacon may also be known such as its identity and hardware specifications, which may indicate the magnitude of the transmission range of the transmission beacon. As a client device 120 must be within the transmission range of a transmission beacon for the client device 120 to detect the presence of the transmission beacon, the location of the client device 120 may be identified based on the location and specifications of the detected transmission beacon.

In another embodiment, the location of a client device 120 may be identified based on the client device's detection of the signal strength of more than one transmission beacon, known well in the art as "triangulation." In particular, the two-dimensional location of a client device 120 may be identified by comparing the signal strength of two transmission beacons detected by the client device 120. Similarly, the three-dimensional location of a client device 120 may be identified by comparing the signal strength of three transmission beacons detected by the client device 120.

In a further embodiment, the location of a client device 120 may be identified based on the detection of the client device 120 by the network 110. In particular, the network 110 may include one or more transmission beacons. The transmission beacons may provide the network 110 with an indication of which client devices 120 are connected to the transmission beacon. The transmission beacons may further provide the network 110 with an indication of the characteristics of the transmission beacon such as its identity and hardware specifications, which may indicate the transmission range of the transmission beacon. Thus, the location of a client device 120 may be identified by the network 110 by determining which transmission beacon the client device 120 is utilizing and the maximum distance that the client device 120 may be from the transmission beacon based on the characteristics of the transmission beacon.

In yet another embodiment, the location of a client device 120 may be identified based on the known previous location of the client device 120 and the known movements of the client device 120, which is well known in the art as "dead reckoning." The location of a client device 120 may have been previously identified based on any of the aforementioned client device 120 positioning methodologies. Additionally, the client device 120 may be capable of determining any movement of the client device 120 from the previously identified location of the client device 120. For example, the client device 120 may include movement sensors capable of determining the rate of movement of the client device 120, the duration of movement of the client device 120, and the direction of movement of the client device 120. Thus, the client device 120 may use the data obtained from the movement sensors to identify the location of the client device 120 based on its movement from its previously identified location.

In yet a further embodiment, the location of the client device 120 may be identified based on the device profile 123 associated with the client device 120. More specifically, the device profile 123 may hold an indication of the location of the client device 120 that was obtained by the device profile 123 on any of the aforementioned client device 120 positioning methodologies. Alternatively, the indication of the location of the client device 120 provided by the device profile 123 may be identified based on data obtained from satellites and/or Global Positioning Systems.

Additionally, FIG. 10 depicts an authorized location 1001 and an authorized perimeter 1002 that encompasses the authorized location 1001. The authorized location 1001 and the authorized perimeter 1002 may be determined from the location rules 181 (FIG. 1). In particular, the authorized location 1001 and authorized perimeter 1002 may specify one or more locations where client devices 120 may access resources 165. The administrator of the distribution service 174 may specify the boundaries of an authorized location 1001 and/or authorized perimeter 1002. The administrator may define the boundaries of the authorized location 1001 and authorized perimeter 1002 by specifying one or more geographic coordinates that encompass the authorized location 1001 and authorized perimeter 1002. In one embodiment, the geographic coordinates may specify the center of an authorized location 1001 and/or authorized perimeter 1002. The administrator may further specify the magnitude of a radius that extends from the central coordinate pair to establish a boundary encompassing the authorized location 1001 and/or authorized perimeter 1002. In another embodiment, coordinates may specify boundary points for an authorized location 1001 and/or authorized perimeter 1002. The distribution service 174 may be configured to establish a boundary for the authorized location 1001 and/or authorized perimeter 1002 by connecting coordinates. For example, the distribution service 174 may establish a rectangle shaped boundary, a square shaped boundary, and/or a boundary of another shape based on an administrator's input of coordinates. Alternatively, the distribution service 174 may execute a drawing tool that allows an administrator to visually designate the boundaries of an authorized location 1001 and/or authorized perimeter 1002 on a map, a floor plan, and/or other layout.

The networked environment 1000, including the authorized location 1001 and the authorized perimeter 1002, provide for heightened security of location-sensitive resources 165. In one embodiment, the distribution service 174 administrator may specify that resources 165 with high sensitivity may only be accessed by client devices 120 located within the authorized location 1001. In another embodiment, the administrator may specify that resources 165 with low sensitivity may be accessed by client devices 120 located within either the authorized location 1001 or the authorized perimeter 1002. The magnitude of the authorized perimeter 1002 may be based at least in part on the type of authorized location 1001. For example, an authorized perimeter 1002 encompassing a large authorized location 1001, such as a football stadium, may be larger than an authorized perimeter 1002 encompassing a small authorized location 1001, such as a corporate board meeting room. Additionally, the magnitude of the authorized perimeter 1002 may be based at least in part on the sensitivity of associated resources 165. For example, authorized perimeters 1002 associated with resources 165 with high sensitivity may be smaller than authorized perimeters 1002 associated with resources 165 with low sensitivity.

As described with regard to FIG. 1, client devices 120 may receive access to resources 165 from the distribution server 150 if the client devices 120 are both authorized to communicate with the distribution server 150 and comply with one or more distribution rules 171 (FIG. 1) associated with the resources 165. The client devices 120a, 120b, and 120c of the networked environment 1000 may be similar with respect to their hardware configurations, software configurations, and maintenance records. Client devices 120a, 120b, and 120c may further have user credentials 132 (FIG. 1) and device identifiers 135 (FIG. 1) that are authorized for access to the distribution service 174. Nevertheless, client devices 120a, 120b, and 120c may not be equally authorized for access to resources 165 based on one or more location rules 181 associated with the resources 165.

As an example, the location rules 181 may specify that client devices 120 located within the authorized location 1001 may be authorized for access to a "high sensitivity" subset of resources 165, client devices 120 located within the authorized perimeter 1002 may be authorized for access to a "medium sensitivity" subset of resources 165, and client devices 120 located outside of both the authorized location 1001 and authorized perimeter 1002 may be authorized for access to a "low sensitivity" subset of resources 165. Additionally, the location rules 181 may specify that client devices 120 authorized for access to the "high sensitivity" subset resources 165 are further authorized for access to both the "medium sensitivity" and "low sensitivity" subsets of resources 165 and that client devices 120 authorized for access to the "medium sensitivity" subset of resources 165 are further authorized for access to the "low sensitivity" subset of resources 165. Thus, client devices 120 that are authorized for access to resources 165 associated with more restrictive location rules 181 may further be authorized for access to resources 165 associated with less restrictive location rules 181. Additionally, the location rules 181 may specify that the resources 165 must be deleted from client devices 120 that cease to comply with the location rules 181 associated with such resources 165. While in some examples, client devices 120 located outside of both the authorized location 1001 and authorized perimeter 1002 to be authorized for access to a "low sensitivity" subset of resources 165, it is to be understood that a more restrictive security schema may prohibit client devices 120 located outside of both the authorized location 1001 and authorized perimeter 1002 from accessing any resources 165.

In one embodiment, the client side application 126 executed by the client device 120a may transmit a request 177 (FIG. 1) for access to resources 165 to the distribution service 174 executed by the distribution server 150. As described with regard to FIG. 1, the access request 177 may include user credentials 132 (FIG. 1) and a client device identifier 135 (FIG. 1) associated with the client device 120a. The access request 177 may further include location information 133 (FIG. 1) specifying the location of the client device 120a. As previously described, the client side application 126 may identify the location information 133 associated with the client device 120a from the device profile 123 associated with the client device 120a, and the location information 133 may be identified based at least in part on network 110 data. In another embodiment, the distribution service 174 may identify the location of the client device 120a based at least in part on data associated with the network 110. On a first request for access, the distribution service 174 may determine whether the client device 120a is authorized to access the distribution server 150 based at least in part on the user credentials 132 and device identifier 135 of the request 177. In this example, the user credentials 132 and device identifier 135 associated with the client device 120a are authorized, and the distribution service 174 may determine that the client device 120a is authorized to access the distribution server 150.

Next, the distribution service 174 may determine which, if any, of the subsets of resources 165 that the client device 120a is authorized to access. More specifically, the distribution service 174 may authorize the client device 120a for access to resources 165 associated with location rules 181 that are satisfied by the location information 133 associated with the client device 120a. The location information 133 associated with the client device 120a may indicate that the client device 120a is located within the authorized location 1001. If the distribution service 174 determines that the client device 120a is located within the authorized location 1001, the distribution service 174 may then authorize the client device 120a to access the "high sensitivity" subset of resources 165, the "medium sensitivity" subset of resources 165, and the "low sensitivity" subset of resources 165. The distribution service 174 may, for example, transmit the "high sensitivity," "medium sensitivity," and "low sensitivity" subsets of resources 165 to the client device 120a to provide the client device 120a with access to the resources 165.

While the client device 120a may be authorized to access the resources 165 upon receipt from the distribution service 174, the client device 120a may cease to be authorized based on any changes in its location. To this end, the client side application 126 may monitor the location information 133 associated with the client device 120a to determine whether the client device 120a remains compliant with the location rules 181 associated with the resources 165. In one embodiment, in the event that the client device 120a fails to comply with some or all of the location rules 181, the client side application 126 may terminate access to the resources 165 in accordance with the location rules 181 by preventing the resources 165 from being accessed by the client device 120a while the location rules 181 are not satisfied. For example, the resources 165 may be configured to be inaccessible while the location rules 181 are not satisfied by the client device 120a and may be further configured to be unlocked while the location rules 181 are satisfied by the client device 120a. In another embodiment, in the event that the client device 120a fails to comply with some or all of the location rules 181, the client side application 126 may terminate access to the resources 165 in accordance with the location rules 181 by deleting the resources 165 from the client device 120a.

For example, if the client side application 126 determines that the client device 120a remains in its initial location, the client side application 126 may continue to provide access to each of the subsets of resources 165 on the client device 120a. However, if the client side application 126 determines that the current location of the client device 120a is no longer in its initial location, the client side application 126 may determine whether the client device 120a is authorized to access the resources 165 based on the current location of client device 120a. If the client device 120a remains located within the authorized location 1001, then the client side application 126 may continue to provide access to each of the subsets of resources 165. If the client device 120a is currently located within the authorized perimeter 1002, then the client side application 126 may provide access to the "medium sensitivity" and "low sensitivity" subsets of resources 165 and may remove access to the "high sensitivity" subset of resources 165, as may be indicated by the location rules 181 associated with the respective resources 165. Finally, if the client device 120a is neither located within the authorized location 1001 nor the authorized perimeter 1002, then the client side application 126 may provide access to the "low sensitivity" subset of resources 165 and may remove access to the "high sensitivity" and "medium sensitivity" subsets of resources 165. In another embodiment, the client side application 126 may delete and/or otherwise make inaccessible the "low sensitivity" subsets of resources 165 from the client device 120a if the client device 120a is neither located within the authorized location 1001 nor the authorized perimeter 1002.

In another embodiment, the client side application 126 executed by the client device 120b may transmit a request 177 for access to resources 165 to the distribution service 174 that may include user credentials 132, a client device identifier 135, and location information 133 related to the location of the client device 120b. As previously discussed, the location information 133 may be identified from the device profile 123 of the client device 120b or based at least in part on data associated with the network 110. On a first request for access, the distribution service 174 may determine that the client device 120b is authorized to access the distribution server 150 as the user credentials 132 and device identifier 135 associated with the client device 120b are authorized. The distribution service 174 may further determine whether the client device 120b is authorized to access resources 165 based on the location rules 181 associated with the resources 165. The location information 133 associated with the client device 120b may indicate that the client device 120b is located within the authorized perimeter 1002. Accordingly, the distribution service 174 may authorize the client device 120b to access the "medium sensitivity" and "low sensitivity" subsets of resources 165; for example, the distribution service 174 may transmit the "medium sensitivity" and "low sensitivity" subsets of resources 165 to the client device 120b to provide the client device 120b with access to the "medium sensitivity" and "low sensitivity" subsets of the resources 165.

While the client device 120b may be authorized to access the resources 165 upon receipt, the client device 120b may cease to be authorized based on changes to its location. To this end, the client side application 126 may monitor the location information 133 associated with the client device 120b to determine whether the client device 120b remains compliant with the location rules 181 associated with the resources 165. In one embodiment, if the client side application 126 determines that the client device 120b remains in its initial location, then the client side application 126 may continue to provide access to the "medium sensitivity" and "low sensitivity" resources 165. In another embodiment, if the client side application 126 determines that client device 120b is no longer in its initial location, then the client side application 126 may further determine whether client device 120b is authorized to access resources 165 based on the current location of client device 120b. For example, if the client device 120b remains located within the authorized perimeter 1002, then the client side application 126 may continue to provide access to the "medium sensitivity" and "low sensitivity" subsets of resources 165. If the client device 120b is now located within the authorized location 1001, then the client side application 126 may continue provide access to the "medium sensitivity" and "low sensitivity" subsets of resources 165 and may transmit a request 177 to the distribution service 174 to access the "high sensitivity" subset of resources 165. Finally, if the client device 120b is now neither located within the authorized location 1001 nor the authorized perimeter 1002, the client side application 126 may continue to provide access to the "low sensitivity" subset of resources 165 and may delete the "medium sensitivity" subset of resources 165 from client device 120b.

In a further embodiment, the client side application 126 executed by client device 120c may transmit a request 177 for access to resources 165 to the distribution service that may include user credentials 132, a client device identifier 135, and location information 133 specifying the location of the client device 120c. As previously discussed, the location information 133 may be identified from the device profile 123 of the client device 120c or based at least in part on data associated with the network 110. On a first request for access, the distribution service 174 may determine that the client device 120c is authorized to access the distribution server 150 as the user credentials 132 and device identifier 135 associated with the client device 120c are authorized. The distribution service 174 may further determine whether the client device 120c is authorized to access resources 165 based on the location rules 181 associated with the resources 165. The location information 133 associated with the client device 120c may indicate that the client device 120c is neither located within the authorized location 1001 nor located within the authorized perimeter 1002. Accordingly, the distribution service 174 may authorize the client device 120b to access the "low sensitivity" subset of resources 165; for example, the distribution service 174 may transmit the "low sensitivity" subset of resources 165 to the client device 120c to provide the client device 120c with access to the "low sensitivity" subset of the resources 165.

While the client device 120c may be authorized to access the resources 165 upon receipt, the client device 120c may cease to be authorized based on changes to its location. To this end, the client side application 126 may monitor the location information 133 associated with the client device 120c to determine whether the client device 120c remains compliant with the location rules 181 associated with the resources 165. In one embodiment, if the client side application 126 determines that the client device 120c remains in its initial location, then the client side application 126 may continue to provide access to the "low sensitivity" resources 165. In another embodiment, if the client side application 126 determines that client device 120c is no longer in its initial location, then the client side application 126 may further determine whether client device 120c is authorized to access resources 165 based on the current location of client device 120c. For example, if the client device 120c is neither located within the authorized location 1001 nor located within the authorized perimeter 1002, then the client side application 126 may continue to provide access to "low sensitivity" subset of resources 165. If the client device 120c is now located within the authorized location 1001, then the client side application 126 may continue to provide access to the "low sensitivity" subset of resources 165 and may transmit a request 177 to the distribution service 174 to access the "high sensitivity" and "medium sensitivity" subsets of resources 165. Finally, if the client device 120b is now located within the authorized perimeter 1002, then the client side application 126 may continue to provide access to the "low sensitivity" subset of resources 165 and may transmit a request 177 to the distribution service 174 to access the "medium sensitivity" subset of resources 165.

In another embodiment, the resources 165 accessible to the client device 120 may be determined based at least in part on the time rules 181 (FIG. 1). For example, the network 110 may provide time information 143 (FIG. 1) describing the current time associated with client devices 120. In one embodiment, time information 143 specifying the current time associated with client devices 120 in communication with the network 110 may be identified from the device profiles 123 of the respective client devices 120. The device profile 123 may include an indication of the time set by the user of the client device 120. Additionally, the device profile 123 may include an indication of the time provided to the client device 120 by an application executed by the client device 120, such as an FM radio application or Atomic Clock application. Moreover, the device profile 123 may include an indication of the time provided to the client device 120 by the network 110 itself, such as a CDMA network, GSM, and/or other cellular network 110 that may provide the time for client devices 120 communicating over such network 110. Furthermore, the device profile 123 may include an indication of the time provided to the client device 120 by a server accessible over the network 110, such as a heartbeat server and/or a time server.

In addition, the time information 143 specifying the current time associated with client devices 120 on the network 110 may be identified based at least in part on the location information 133 associated with the client devices 120. For instance, if the current time in Atlanta, Ga. is 1 PM, then the location information 133 specifying that a client device 120 is located in Atlanta, Ga. may be correlated with time information 143 specifying that the current time associated with the client device is 1 PM. By employing such a location-based time determination methodology, the settings of a client device 120 cannot be manipulated to gain an/or prolong access to resources 165. For instance, a user of a client device 120 might seek to prolong access to resources 165 by rolling back the set time of the client device 120 to a time when the client device 120 was authorized.

The distribution service 174 administrator may configure the time rules 191 to restrict access to resources 165 with "high sensitivity" to client devices 120 whose current time corresponds to a single authorized time. The distribution service 174 administrator may further configure the time rules 191 to restrict access to resources 165 with "medium sensitivity" to client devices 120 whose current time is within an authorized time window, i.e. a collection of sequenced authorized times. The magnitude of the authorized window may be based at least in part on the sensitivity of associated resources 165; thus, authorized windows associated with highly time sensitive resources 165 may be smaller in magnitude than authorized windows associated with resources 165 of lesser time sensitivity. For example, the time rules 191 may specify that the resources 165 may only be accessed by client devices 120 while the current time is between 12:01 PM and 1 PM. Additionally, the distribution service 174 administrator may configure the time rules 191 to require that access to the resources 165 be removed from client devices 120 that do not satisfy the time rules 191. Furthermore, the distribution service 174 administrator may configure the time rules 191 to permit the resources 165 to remain stored in an inaccessible format on incompliant client devices 120 that are located within the authorized location 1001 but require that the resources 165 be deleted from incompliant client devices 120 that are located outside of the authorized location 1001.

As an example, the authorized location 1001 may correspond to a Board Room in Atlanta, Ga., the authorized perimeter 1002 may correspond to the city of Atlanta, Ga., and the area outside of the authorized location 1001 and authorized perimeter 1002 may correspond to the city of Chicago, Ill. The Board Room in Atlanta, Ga. and the city of Atlanta, Ga. may both reside in the Eastern Time Zone, and the city of Chicago, Ill. may reside in the Central Time Zone. Thus, client devices 120 located within the authorized location 1001 and authorized perimeter 1002 may be associated with time information 143 specifying that the current time associated with such client devices 120 is the current time in the Eastern Time Zone. Similarly, client devices 120 located outside of the authorized location 1001 and authorized perimeter 1002 may be associated with time information 143 specifying that the current time associated with such client devices 120 is the current time in the Central Time Zone. Referring to FIG. 10, if the current time in the Eastern Time Zone is 1 PM and the current time in the Central Time Zone is 12 PM, then the time information 143 associated with the client device 120*a* may be 1 PM, the time information 143 associated with the client device 120*b* may be 1 PM, and the time information 143 associated with the client device 120*c* may be 12 PM.

In one embodiment, the client side application 126 executed by the client device 120*a* may transmit a request 177 for access to resources 165 to the distribution service 174 that may include user credentials 132, a client device identifier 135, and time information 143 related to the current time associated with the client device 120*a*. As previously discussed, the time information 143 may be identified from the device profile 123 of the client device 120*a* or based at least in part on data associated with the network 110, such as an indication of the location of the client device 120*a*.

On a first request for access, the distribution service 174 may determine that the client device 120*a* is authorized to access the distribution server 150 as the user credentials 132 and device identifier 135 associated with the client device 120*a* are authorized. The distribution service 174 may further determine whether the client device 120*a* is authorized to access resources 165 based on the time rules 191 associated with the resources 165. The time information 143 associated with the client device 120*a* may indicate that the current time associated with the client device 120*a* is 1 PM. Accordingly, the distribution service 174 may authorize the client device 120*a* to access the resources 165 because the current time of 1 PM falls within the authorized window of 12:01 PM-1 PM specified by the time rules 191 associated with the resources 165. For example, the distribution service 174 may transmit the resources 165 to the client device 120*a* to provide the client device 120*a* with access to the resources 165.

While the client device 120*a* may be authorized to access the resources 165 upon receipt, the client device 120*a* may cease to be authorized based on any changes in the current time associated with the client device 120*a*. To this end, the client side application 126 may monitor the time information 143 associated with the client device 120*a* to determine whether the client device 120*a* satisfies the time rules 191. If the client device 120*a* fails to satisfy some or all of the time rules 191, then the client side application 126 may remove access to the resources 165 on the client device 120*a*. For example, the client side application 126 may permit the resources 165 to remain stored in an inaccessible format on client device 120*a* because the client device 120*a* is located within the authorized location 1001.

In another embodiment, the client side application 126 executed by client device 120*b* may transmit a request 177 for access to resources 165 to the distribution service 174 that may include user credentials 132, a client device identifier 135, and time information 143 specifying the current time associated with the client device 120*b*. As previously discussed, the time information 143 may be identified from the device profile 123 of the client device 120*b* or based at least in part on data associated with the network 110. On a first request for access, the distribution service 174 may determine that the client device 120*b* is authorized to access the distribution server 150 as the user credentials 132 and device identifier 135 associated with the client device 120*b* are authorized. The distribution service 174 may further determine whether the client device 120*b* is authorized to access resources 165 based on the time rules 191 associated with the resources 165. The time information 143 associated with the client device 120*b* may indicate that current time associated with the client device 120*b* is 1 PM. Accordingly, the distribution service 174 may authorize the client device 120*b* to access the resources 165 because the current time of 1 PM falls within the authorized window of 12:01 PM-1 PM specified by the time rules 191 associated with the resources 165. For example, the distribution service 174 may transmit the resources 165 to the client device 120*b* to provide the client device 120*b* with access to the resources 165.

While the client device 120*b* may be authorized to access the resources 165 upon receipt, the client device 120*b* may cease to be authorized based on any changes in the current time associated with the client device 120*b*. To this end, the client side application 126 may monitor the time information 143 associated with the client device 120*b* to determine whether the client device 120*b* satisfies the time rules 191. If the client device 120*b* fails to satisfy some or all of the time rules 191, then the client side application 126 may remove access to the resources 165 on the client device 120*b*. For example, the client side application 126 may delete the resources 165 from the client device 120*b* because the client device 120*b* is not located within the authorized location 1001.

In a further embodiment, the client side application 126 executed by client device 120*c* may transmit a request 177 for access to resources 165 to the distribution service 174 that may include user credentials 132, a client device identifier 135, and time information 143 specifying the current time associated with the client device 120*c*. As previously discussed, the time information 143 may be identified from the device profile 123 of the client device 120c or based at least in part on data associated with the network 110. On a first request for access, the distribution service 174 may determine that the client device 120c is authorized to access the distribution server 150 as the user credentials 132 and device identifier 135 associated with the client device 120c are authorized. The distribution service 174 may further determine whether the client device 120c is authorized to access resources 165 based on the time rules 191 associated with the resources 165. The time information 143 associated with the client device 120c may indicate that current time associated with the client device 120c is 12 PM. Accordingly, the distribution service 174 may not authorize the client device 120c to access the resources 165 because the current time of 12 PM does not fall within the authorized window of 12:01 PM-1 PM specified by the time rules 191 associated with the resources 165.

The distribution service 174 may transmit a notice of non-compliance to the client device 120c that specifies that the client device 120c is not authorized to access the resources 165 at the current time of 12 PM. The distribution service 174 may further specify in the notice of non-compliance that the client device 120c may become authorized to access the resources 165 at 12:01 PM. In response to receiving the notice of non-compliance from the distribution service 174, the client side application 126 may transmit another request 177 for access to the resources 165 at 12:01 PM. In particular, the client side application 126 may transmit the request 177 once it has determined that the time information 143 associated with the client device 120c specifies that the current time associated with the client device 120c is 12:01 PM. In response to receiving such a request 177, the distribution service 174 may authorize the client device 120c to access the resources 165 because the current time of 12:01 PM falls within the authorized window of 12:01 PM-1 PM specified by the time rules 191 associated with the resources 165. For example, the distribution service 174 may transmit the resources 165 to the client device 120c to provide the client device 120c with access to the resources 165.

While the client device 120c may be authorized to access the resources 165 upon receipt, the client device 120c may cease to be authorized based on any changes in the current time associated with the client device 120c. To this end, the client side application 126 may monitor the time information 143 associated with the client device 120c to determine whether the client device 120c satisfies the time rules 191. If the client device 120c fails to satisfy some or all of the time rules 191, then the client side application 126 may remove access to the resources 165 on the client device 120c. For example, the client side application 126 may delete the resources 165 from the client device 120c because the client device 120c is not located within the authorized location 1001.

Finally, it is to be understood that the administrator of the distribution service 174 may configure the resources 165 to be associated with any combination of location rules 181, time rules 191, and distribution rules 171 to meet the varying security requirements associated with resources 165 that may be accessed over the network 110. The embodiments disclosed herein are only examples of the functionality provided by a distribution service 174 and a client side application 126 for controlling access to resources 165 on a network 110, and may be combined and/or altered without departing from the scope and substance of the disclosure.

Figure 11:
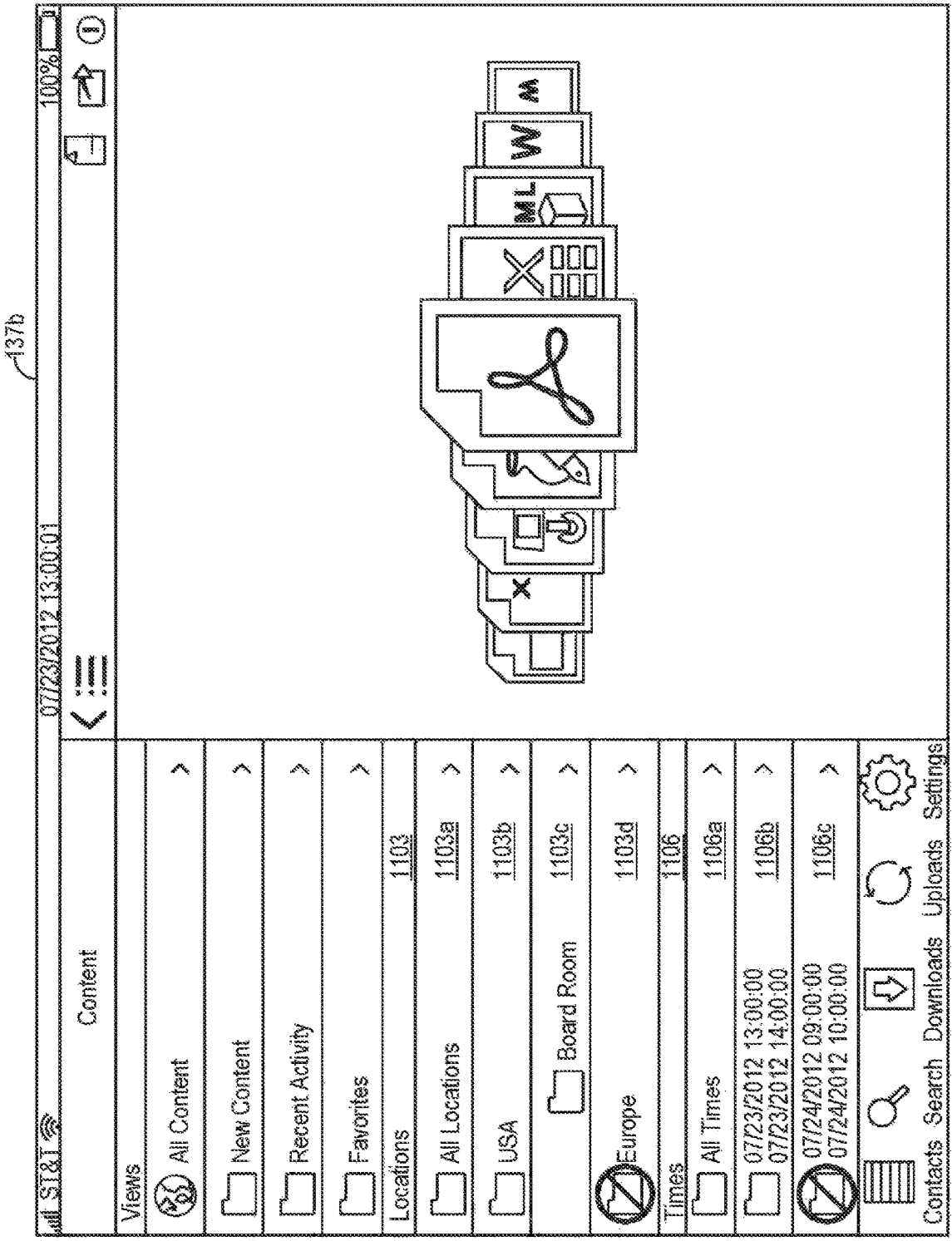
FIGS. 11-13 are exemplary user interfaces rendered on a client device in the networked environment of FIG. 1 according to certain embodiments of the present disclosure.

FIG. 11 is a further example of a browsing interface 137b, according to certain embodiments of the present disclosure.

The exemplary browsing interface 137b provides functionality for browsing resources 165 (FIG. 1) accessible to the client device 120 (FIG. 1). In this example, the browsing interface 137h includes a location-specific content navigation area 1103, presented in browsing interface 137h as "Locations," and a time-specific content navigation area 1106, presented in browsing interface 137h as "Times."

The location-specific content navigation area 1103 may present resources 165 accessible to the client device 120 based on the location of the client device 120. In particular, the resources 165 are organized according to a plurality of location rules 181 (FIG. 1) associated with the resources 165 that specify where the client device 120 is authorized to access the resources 165. If the location information 133 (FIG. 1) associated with the client device 120 indicates that the client device 120 is located within an authorized location defined by a location rule 181, the browsing interface 137b may provide an indication that the respective grouping of resources 165 is accessible. For example, the browsing interface 137b may indicate that a grouping of resources 165 is accessible by not superimposing a restricted symbol over the icon associated with the relevant grouping of resources 165. Conversely, if the location information 133 associated with the client device 120 indicates that the client device 120 is not located within an authorized location, the browsing interface 137b may provide an indication that the respective grouping of resources 165 is not accessible. For example, the browsing interface 137b may indicate that a grouping of resources 165 is not accessible by superimposing a restricted symbol over the icon associated with the relevant grouping of resources 165.

As an example, a client device 120 may be located within the "Board Room" and the Board Room may be located within the United States of America. The browsing interface 137b may provide an indication of which resources 165 are accessible by the client device 120 based on the client device 120 being located within the Board Room. The location-specific content navigation area 1103 may present four groupings of resources 165, such as the "All Locations" resource grouping 1103a, the "U.S.A." resource grouping 1103b, the "Board Room" resource grouping 1103c, and the "Europe" resource grouping 1103d.

The "All Locations" resource grouping 1103a may include all of the resources 165 that the client device 120 may be authorized to access based on the location of the client device 120. The client device 120 is authorized to access resources 165 restricted to the U.S.A. based on its location within the U.S.A and resources 165 restricted to the Board Room based on its location within the Board Room. Accordingly, the "All Locations" resource grouping 1103a may include the resources 165 from the "U.S.A." resource grouping 1103b and the "Board Room" resource grouping 1103c. The browsing interface 137b does not superimpose a restricted symbol over the icon associated with the "All Locations" resource grouping 1103a to indicate that such resource grouping is presently accessible by the client device 120. Similarly, as client device 120 may be authorized to access the "U.S.A." resource grouping 1103b and "Board Room" resource grouping 1103c based on its location, the browsing interface 137b does not superimpose a restricted symbol over the icon associated with either the "U.S.A." resource grouping 1103b or "Board Room" resource grouping 1103c to indicate that such resource groupings are presently accessible by the client device 120. On the other hand, the client device 120 may not be authorized to access the "Europe" resource grouping 1103d as the client device 120 is not located within Europe. Thus, the browsing interface 137b may superimpose a restricted symbol over the icon associated with the "Europe" resource grouping 1103d to indicate that such resource grouping is not presently accessible by the client device 120.

Similarly, the time-specific content navigation area 1106 may present resources 165 accessible to the client device 120 based on the current time associated with the client device 120. In particular, the resources 165 are organized according to a plurality of time rules 191 (FIG. 1) associated with the resources 165 that specify at what times the client device 120 is authorized to access the resources 165. If the time information 143 (FIG. 1) associated with the client device 120 indicates that the current time associated with the client device 120 is within an authorized window defined by a time rule 191, the browsing interface 137b may provide an indication that the respective grouping of resources 165 is accessible. Conversely, if the time information 143 associated with the client device 120 indicates that the current time associated with the client device 120 is not within an authorized window, the browsing interface 137b may provide an indication that the respective grouping of resources 165 is not accessible.

Continuing with the example, the current time associated with the client device 120 may be 13:00:01 on Jul. 23, 2012. The browsing interface 137b may provide an indication of which resources 165 are accessible to the client device 120 based on the current time associated with the client device 120 of 13:00:01 on Jul. 23, 2012. The time-specific content navigation area 1106 may present three groupings of resources 165, such as the "All Times" resource grouping 1106a, the "Jul. 23, 2012 13:00:00—Jul. 23, 2012 14:00:00" resource grouping 1106b, and the "Jul. 24, 2012 09:00:00—Jul. 24, 2012 10:00:00" resource grouping 1106c.

The "All Times" resource grouping 1106a may include all of the resources 165 that the client device 120 may be authorized to access based on the current time associated with the client device 120. The client device 120 is authorized to access resources 165 restricted to the authorized window between Jul. 23, 2012 13:00:00 and Jul. 23, 2012 14:00:00 based on the current time of Jul. 23, 2012 13:00:01. Accordingly, the "All Times" resource grouping 1106a may include the resources 165 from the "Jul. 23, 2012 13:00:00—Jul. 23, 2012 14:00:00" resource grouping 1106b. The browsing interface 137b does not superimpose a restricted symbol over the icon associated with the "All Times" resource grouping 1106a to indicate that such resource grouping is presently accessible by the client device 120. Similarly, as client device 120 may be authorized to access the "Jul. 23, 2012 13:00:00—Jul. 23, 2012 14:00:00" resource grouping 1106b based on the current time, the browsing interface 137b does not superimpose a restricted symbol over the icon associated with the "Jul. 23, 2012 13:00:00—Jul. 23, 2012 14:00:00" resource grouping 1106b to indicate that such resource grouping is presently accessible by the client device 120. On the other hand, the client device 120 may not be authorized to access the "Jul. 24, 2012 09:00:00—Jul. 24, 2012 10:00:00" resource grouping 1106c as the current time associated with the client device 120 is not within the authorized window between Jul. 24, 2012 13:00:00 and Jul. 24, 2012 14:00:00 based on the current time of 13:00:01 on Jul. 23, 2012. Accordingly, the browsing interface 137b may superimpose a restricted symbol over the icon associated with the "Jul. 24, 2012 09:00:00—Jul. 24, 2012 10:00:00" resource grouping 1106c to indicate that such resource grouping is not presently accessible by the client device 120.

Figure 12:
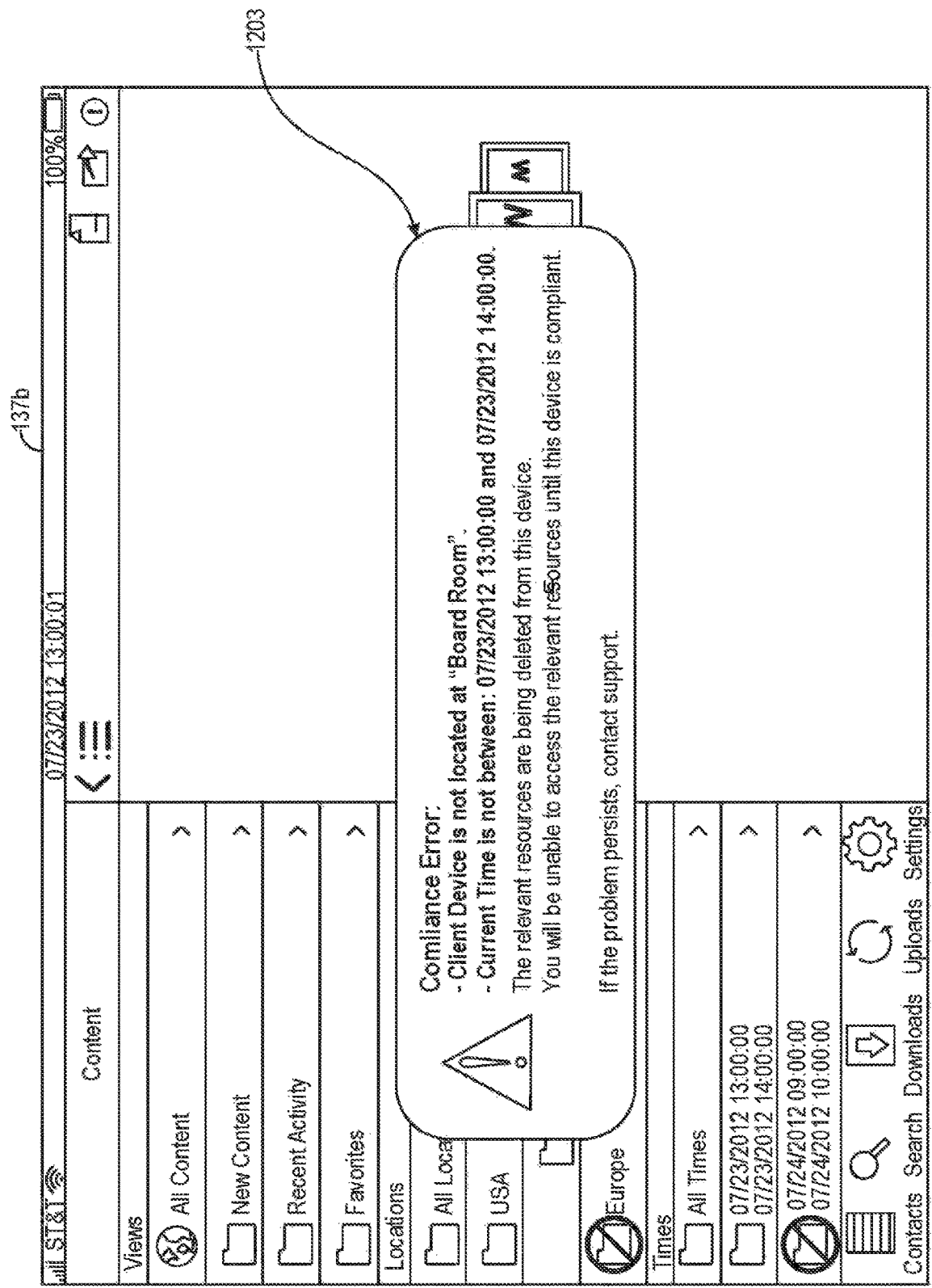

FIG. 12 is yet a further example of a browsing interface 137b, according to certain embodiments of the present disclosure. The exemplary browsing interface 137b provides functionality for browsing resources 165 (FIG. 1) accessible to the client device 120 (FIG. 1). In this example, the browsing interface 137b includes a compliance error message 1203 to alert the user that the client device 120 is no longer authorized to access the resources 165 were being accessed, based on the current state of the client device 120.

While preventing client devices 120 from initially gaining unauthorized access to resources 165 may be sufficient to protect some resources 165, more sensitive resources 165 may require protection on a continuous basis to ensure that the client device 120 remains compliant with any location rules 181 (FIG. 1) and/or time rules 191 (FIG. 1) associated with the resources 165. Responsive to a determination that a client device 120 is no longer authorized to access resources 165 based on changes to the location information 133 (FIG. 1) and/or time information 143 (FIG. 1) associated with the client device 120, the client device 120 may be required to initiate mediatory action in accordance with any unsatisfied location rules 181 and/or time rules 191 associated with the resources 165. For example, the location rules 181 and/or time rules 191 associated with the resources 165 may require the removal of the resources 165 from client devices 120 that are no longer compliant with the associated location rules 181 and/or time rules 191.

Thus, the location rules 181 associated with the resources 165 belonging to the "Board Room" resource grouping 1103c (FIG. 11) may be further configured to require that the associated resources 165 be removed from the client device 120 that is no longer located within the "Board Room." Similarly, the time rules 191 associated with the resources 165 belonging to the "Jul. 23, 2012 13:00:00—Jul. 23, 2012 14:00:00" resource grouping 1106b (FIG. 11) may be further configured to require that the associated resources 165 be removed from the client device 120 if the current time associated with the client device 120 is no longer within the authorized time window from Jul. 23, 2012 13:00:00 to Jul. 23, 2012 14:00:00. Furthermore, in the event that the client device 120 fails to comply with the location rules 181 and/or time rules 191, the browsing interface 137b may be configured to provide a compliance error that specifies why the previously accessible resources 165 may no longer be accessed by the client device 120.

As exemplified in FIG. 11, the client device 120 was initially authorized to access resources 165 belonging to the "Board Room" resource grouping 1103c and resources 165 belonging to the "Jul. 23, 2012 13:00:00—Jul. 23, 2012 14:00:00" resource grouping 1106b. The client device 120 was authorized to access the "Board Room" resource grouping 1103c as the location information 133 associated with the client device 120 satisfied the location rules 181 associated with the "Board Room" resource grouping 1103c. The client device 120 was further authorized to access the "Jul. 23, 2012 13:00:00—Jul. 23, 2012 14:00:00" resource grouping 1106b as the time information 143 associated with the client device 120 satisfied the time rules 191 associated with the "Jul. 23, 2012 13:00:00—Jul. 23, 2012 14:00:00" resource grouping 1106b.

As an example, the client device 120 may no longer be presently located within the "Board Room" and the current time associated with the client device 120 may no longer fall within the authorized window from Jul. 23, 2012 13:00:00 to Jul. 23, 2012 14:00:00. Accordingly, the client device 120 may no longer authorized to access either the resources 165 belonging to the "Board Room" resource grouping 1103c or the resources 165 belonging to the "Jul. 23, 2012 13:00:00—Jul. 23, 2012 14:00:00" resource grouping 1106*b*. The client device 120 may not be authorized to access the "Board Room" resource grouping 1103*c* as the location information 133 associated with the client device 120 does not satisfy the location rules 181 associated with the "Board Room" resource grouping 1103*c*. Similarly, the client device 120 may not be authorized to access the "Jul. 23, 2012 13:00:00—Jul. 23, 2012 14:00:00" resource grouping 1106*b* as the time information 143 associated with the client device 120 does not satisfy the time rules 191 associated with the "Jul. 23, 2012 13:00:00—Jul. 23, 2012 14:00:00" resource grouping 1106*b*.

Consequently, the client device 120 may initiate mediatory action in accordance with the unsatisfied location rules 181 associated with the "Board Room" resource grouping 1103*c* and the unsatisfied time rules 191 associated with the "Jul. 23, 2012 13:00:00—Jul. 23, 2012 14:00:00" resource grouping 1106*b*. In particular, the client device 120 may delete the resources 165 belonging to the "Board Room" resource grouping 1103*c* and the "Jul. 23, 2012 13:00:00—Jul. 23, 2012 14:00:00" resource grouping 1106*b* from the client device 120. Additionally, the client device 120 may provide a compliance error message 1203 on the browsing interface 137*b* to notify the user of the client device 120 of why the client device 120 is no longer authorized to access the previously authorized resources 165. The compliance error message 1203 may specify that the client device 120 is incompliant for the previously authorized resources 165 because the "Client Device is not located at 'Board Room'" and the "Current Time is not between: Jul. 23, 2012 13:00:00 and Jul. 23, 2012 14:00:00." The compliance error message 1203 may further specify that the "relevant resources have been deleted" from the client device 120 and that the client device 120 "will be unable to access the relevant resources" until the client device 120 is compliant with the associated location rules 181 and/or time rules 191. Finally, the browsing interface 137*b* may superimpose a restricted symbol over the icons associated with the "Board Room" resource grouping 1103*c* and the "Jul. 23, 2012 13:00:00—Jul. 23, 2012 14:00:00" resource grouping 1106*b* to indicate to that the client device 120 is not authorized to access the resources 165 belonging to such resource groupings.

Figure 13:
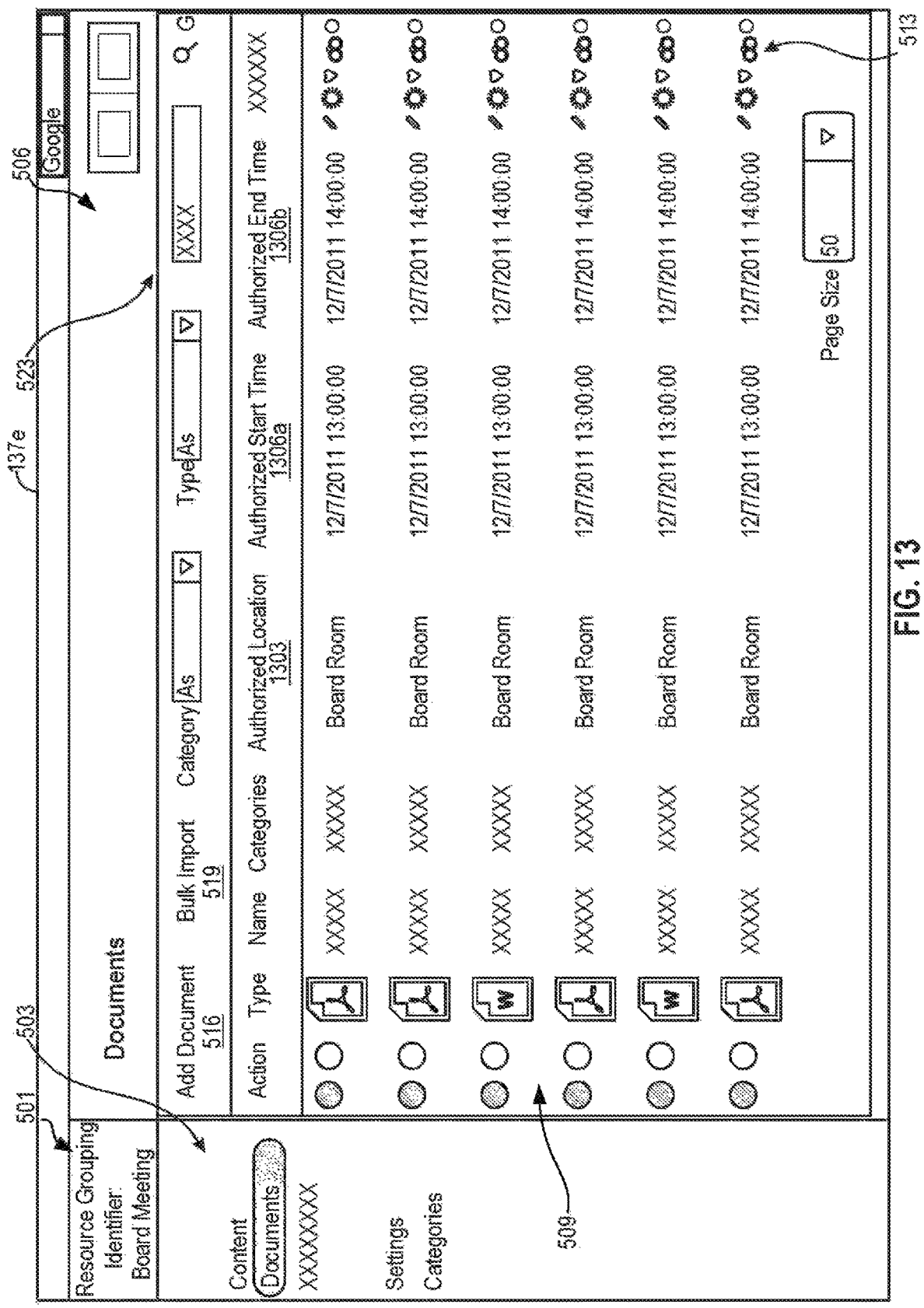

FIG. 13 is a further example of a landing interface 137*e* for an administrator of the distribution service 174 (FIG. 1) executed by the distribution server 150 (FIG. 1), according to certain embodiments of the present disclosure. The exemplary landing interface 137*e* includes a resource group indicator 501, navigation area 503, and a documents area 506. In one embodiment, the resource group indicator 501 may depict a resource grouping identifier 154 (FIG. 1) currently being managed. As an example, the user interface 137*e* depicts the resources 165 associated with the resource grouping identifier 154 (FIG. 1) called "Board Meeting." A drop-down button may be associated with the resource group indicator 501 for managing resources 165 (FIG. 1) associated with other resource grouping identifiers 154. The navigation area 503 may include a plurality of navigation controls that permit the user to manage the resources 165 hosted by the distribution server 150 that are associated with the resource grouping identifier 154 depicted by the resource indicator 501. For example, the navigation controls may include a plurality of buttons, such as a "documents" button, to manage resources 165 associated with the "Board Meeting" resource grouping identifier 154.

Additionally, the documents area 506 includes a listing of resources 165 that are associated with the resource grouping identifier 154 depicted by the resource indicator 501. In one embodiment, the resources 165 may be presented in a table 509 where each row in the table includes identifying information for each of the respective resources 165. For instance, the table may include a name of the resource 165, a type of the resource 165, a brief description of the resource 165, an authorized location 1303 associated with the resource 165, an authorized start time 1306*a* of an authorized window associated with the resource 165, and an authorized end time 1306*b* of an authorized window associated with the resource 165.

The authorized location 1303 may represent one or more locations where a client device 120 may be located to be authorized to access the resources 165, as specified by one or more location rules 181 (FIG. 1) associated with the resources 165. The authorized start time 1306*a* may represent one or more times when an authorized time window opens and the client device 120 becomes authorized to access the resources 165, as specified by one or more time rules 191 (FIG. 1) associated with the resources 165. The authorized end time 1306*b* may represent one or more times when an authorized time window closes and the client device 120 ceases to be authorized to access the resources 165, as specified by one or more time rules 191. For example, the resources 165 associated with the "Board Meeting" resource grouping identifier 154 may be accessed by a client device 120 located within the "Board Room" authorized location 1303 between the authorized start time 1306*a* of Jul. 23, 2012 13:00:00 and the authorized end time 1306*b* of Jul. 23, 2012 14:00:00.

In one embodiment, a plurality of management buttons 513 may also be presented for each resource 165. For instance, the management buttons 513 may permit the administrator to associate distribution rules 171 (FIG. 1) with resources 165 uploaded to the distribution server 150, such as location rules 181 specifying a plurality of locations where the associated resources 165 may be accessed and time rules 191 specifying when the associated resources 165 may be accessed. The management buttons 513 may further permit the administrator to edit the resource qualifiers 172 (FIG. 1) associated with the resource 165, add version information, view a listing of resource grouping identifiers 154 with access to the respective resource 165, download a copy of the resource 165, and remove the resource 165 from being hosted by the distribution server 150. In another embodiment, the documents area 506 may also include an "add document" button 516, a "bulk import" button 519, and sorting options 523. For instance, invoking the "add document" button 516 may call the distribution service 174 to add new resources 165 to be hosted by the distribution server 150, as is described with respect to FIGS. 6 and 7. Additionally, invoking the "bulk import" button 519 may call the distribution service 174 to simultaneously add and/or import multiple resources 165, as can be appreciated. Further, the sorting options 523 may include a plurality of options for the administrator to sort the resources 165 presented in the table 509, such as according to a resource category, a resource type and/or any other sorting option.

Figure 14:
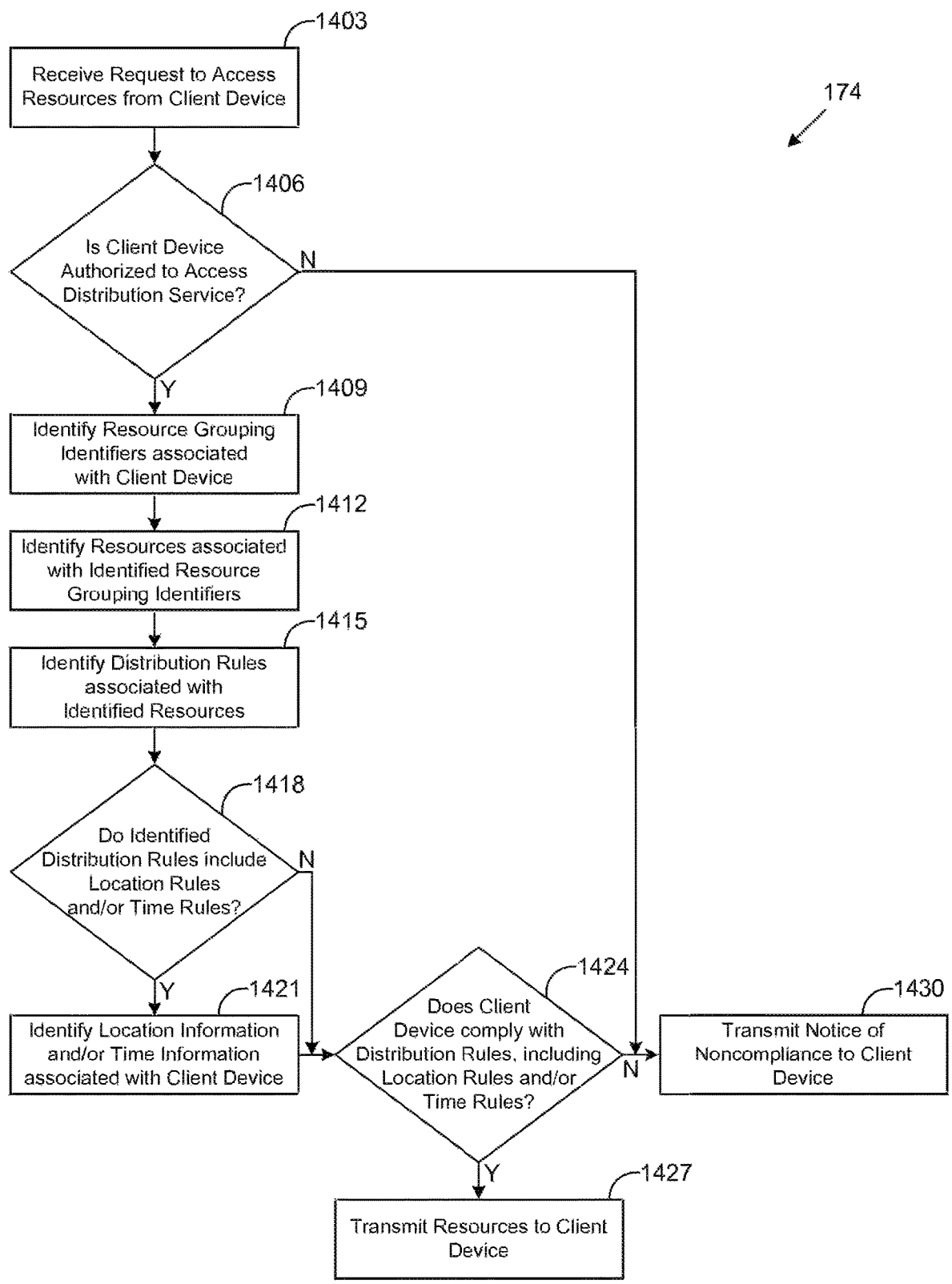
FIG. 14 is a flowchart illustrating exemplary functionality performed by a distribution service executed by a distribution server in the networked environment of FIG. 1 according to certain embodiments of the present disclosure.

FIG. 14 is a flowchart illustrating exemplary functionality performed by the distribution service 174 (FIG. 1) according to certain embodiments. It is understood that the flowchart of FIG. 14 provides merely an example of the many different types of functional arrangements that may be employed to implement the operation of the distribution service 174 as described herein. As an alternative, the flowchart of FIG. 14 may be viewed as depicting an example of steps of a method implemented in the distribution server 150 (FIG. 1) according to one or more embodiments. While the flowchart of FIG. 14 illustrates exemplary functionality performed by the distribution service 174 with respect to a single client device 120, it is understood that the exemplary functionality of the distribution service 174 may be simultaneously performed with respect to more than one client device 120.

Beginning with step 1403, the distribution service 174 receives a request 177 (FIG. 1) from a client device 120 (FIG. 1) that requests access to resources 165 (FIG. 1) hosted by the distribution server 150. In one embodiment, the request 177 may include a device identifier 135 (FIG. 1) associated with a client device 120 and user credentials 132 (FIG. 1) associated with the user operating the client device 120. In another embodiment, the request 177 may additionally include a device profile 123 (FIG. 1) and/or may include specific elements of the device profile 123 describing the state of a client device 120 such as location information 133 (FIG. 1), time information 143 (FIG. 1), and/or any other component of the device profile 123.

Next, in step 1406, the distribution service 174 determines whether the client device 120 and the user operating the client device 120 are authorized to access the distribution service 174. In one embodiment, the distribution service 174 may authorize the user and client device 120 pairing according to the approach described in application Ser. No. 13/316,073 entitled "CONTROLLING ACCESS TO RESOURCES ON A NETWORK," as described above. If the distribution service 174 determines that the user may not access the distribution service 174 from the client device 120, then the distribution service 174 may advance to step 1430 and notify the user of the failed authorization. For instance, the distribution service 174 may transmit a notification that specifies that the user is not authorized to access the distribution service 174 from the client device 120.

Returning to step 1406, if the distribution service 174 determines that the user may access the distribution service 174 from the client device 120, then the distribution service 174 advances to step 1409. In step 1409, the distribution service 174 identifies one or more resource grouping identifiers 154 that are associated with the client device 120. For example, the distribution service 174 may identify resource grouping identifiers 154 associated with the client device 120 based on the user credentials 132 and the device identifier 135. In one embodiment, a client device 120 may be associated with one or more resource grouping identifier 154, and a resource grouping identifier 154 may be associated with one or more client devices 120.

Next, in step 1412, the distribution service 174 identifies one or more resources 165 that are associated with the determined resource grouping identifiers 154. In one embodiment, a resource 165 may be associated with one or more resource grouping identifiers 154, and a resource grouping identifier 154 may be associated with one or more resources 165. Then, in step 1415, the distribution service 174 identifies one or more distribution rules 171 (FIG. 1) that are associated with the identified resources 165. In particular, the distribution rules 171 may include location rules 181 (FIG. 1) and/or time rules 191 (FIG. 1). In one embodiment, a resource 165 may be associated with one or more distribution rules 171. For example, the distribution rules 171 may include location rules 181 and time rules 191, as discussed above. Upon identifying all of the distribution rules 171 associated with the resources 165, the distribution service 174 proceeds to step 1418 and determines whether the identified distribution rules 171 include any location rules 181 and/or time rules 191.

If the distribution service 174 determines that the distribution rules 171 include location rules 181, the distribution service 174 proceeds to step 1421 to identify the location information 133 associated with the client device 120. Similarly, if the distribution service 174 determines that the distribution rules 171 include time rules 191, the distribution service 174 proceeds to step 1421 to identify the time information 143 associated with the client device 120. In one embodiment, the distribution service 174 may identify the location information 133 and/or time information 143 from the device profile 123 associated with the client device 120. In another embodiment, the distribution service 174 may identify the location information 133 and/or time information 143 based at least in part on network 110 (FIG. 10) data, global positioning data, a time server, and/or other approaches discussed above. Returning to step 1418, if the distribution service 174 determines that the distribution rules 171 neither include location rules 181 nor time rules 171, then the distribution service 174 may proceed to step 1424.

Next, in step 1424, the distribution service 174 determines whether the client device 120 from which the request 177 was received complies with the distribution rules 171 associated with each one of the identified resources 165, including any identified location rules 181 and/or time rules 191. In one embodiment, the distribution service 174 determines whether the client device 120 is compliant based on the device profile 123 associated with the client device 120. For instance, the distribution service 174 may have received the device profile 123 in conjunction with the request 177. In another embodiment, the distribution service 174 determines whether the client device 120 is compliant with the distribution rules 171, such as the location rules 181 and the time rules 191, based at least in part on location information 133 and/or time information 143 identified and/or received by the distribution service 174.

If the distribution service 174 determines that the client device 120 does not comply with any of the distribution rules 171 associated with each one of the resources 165, then the distribution service 174 proceeds to step 1430 and transmits a notification of noncompliance to the client device 120. In one embodiment, the distribution service 174 may determine that the client device 120 complies with the distribution rules 171 of a portion of the identified resources 165. For example, the distribution service 174 may transmit a notification of noncompliance to the client device 120 that specifies which of the identified resources 165 the client device 120 is not authorized to access and specifies which distribution rules 171 associated with such resources 165 are not satisfied by the client device 120.

Returning to step 1424, if the distribution service 174 determines that the client device 120 complies with the distribution rules 171 of all and/or a portion of the identified resources 165, the distribution service 174 proceeds to step 1427 and transmits the authorized resources 165 to the client device 120. In one embodiment, the distribution service 174 may transmit the authorized resources 165 to a client side application 126 (FIG. 1) on the client device 120. For example, the client side application 126 may be containerized, thereby restricting the authorized resources 165 from being transmitted outside of the containerized environment of the client side application 126. For example, the containerized client side application 126 may prohibit the resources 165 from being cut, copied, pasted, and/or otherwise accessed outside of the containerized environment of the client side application 126.

In one embodiment, the distribution service 174 may transmit the authorized resources 165 to the client device 120 based on its compliance with the distribution rules 171 associated with such resources 165. In another embodiment, the distribution service 174 may make the authorized resources 165 available for download by the client device 120. For instance, the client device 120 may receive an indication that the resource 165 is available for download and may, in response, transmit a request 177 to the distribution service 174 to download the resource 165. Upon receiving the request 177, the distribution service 165 may transmit the resource 165 to the client device 120. In a further embodiment, the distribution rules 171 associated with the resources 165 may be transmitted in conjunction with the resources 165 to enable the client device 120 to continuously monitor its compliance with the distribution rules 171. For instance, a client side application 126 on the client device 120 may be configured to continuously or periodically determine whether the client device 120 remains authorized to access the received resources 165.

Figure 15:
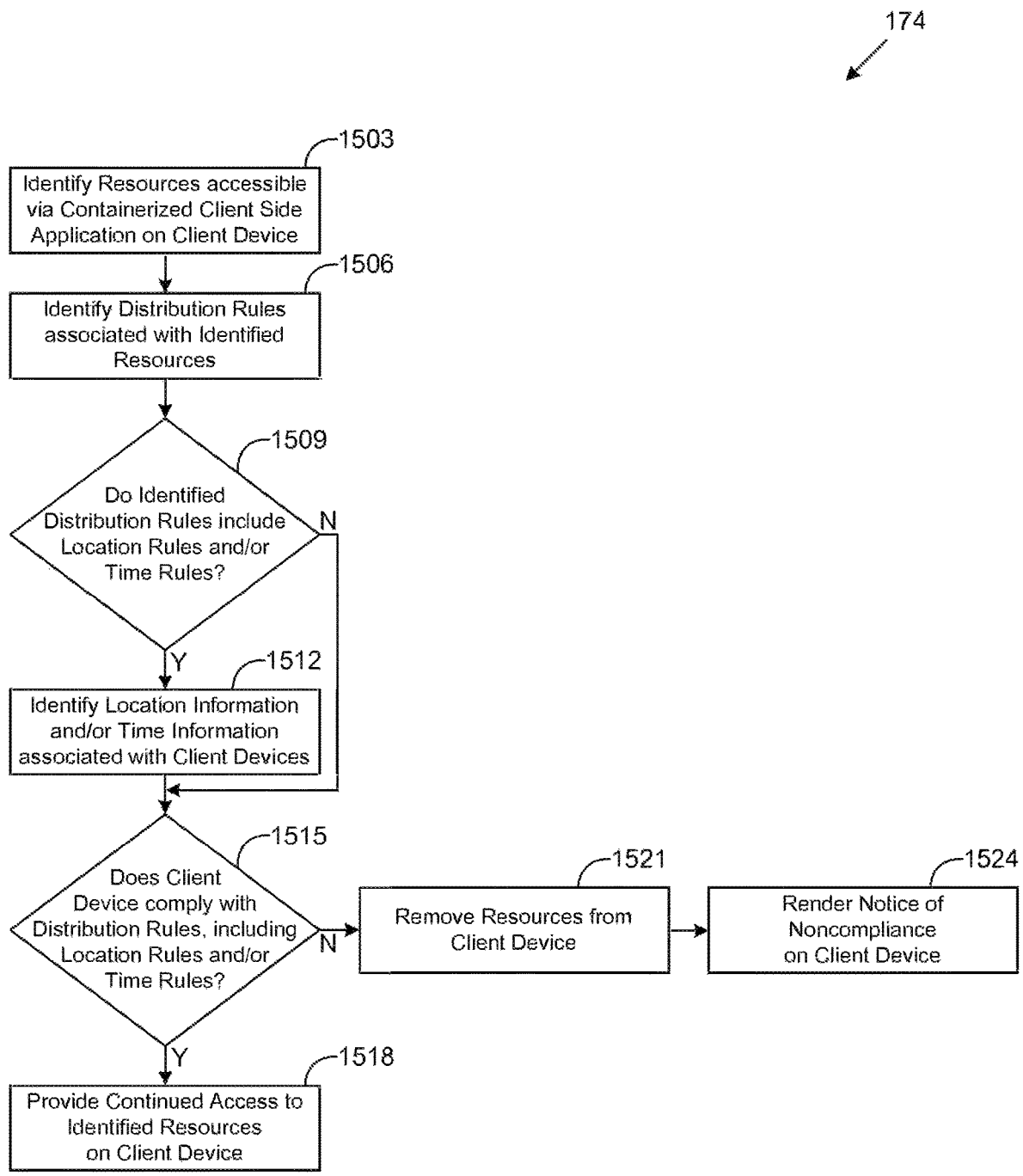
FIG. 15 is a flowchart illustrating exemplary functionality performed by a distribution service executed by a distribution server in the networked environment of FIG. 1 according to certain embodiments of the present disclosure.

FIG. 15 is a flowchart illustrating exemplary functionality performed by the distribution service 174 (FIG. 1) according to certain embodiments. It is understood that the flowchart of FIG. 15 provides merely an example of the many different types of functional arrangements that may be employed to implement the operation of the distribution service 174 as described herein. As an alternative, the flowchart of FIG. 15 may be viewed as depicting an example of steps of a method implemented in the distribution server 150 (FIG. 1) according to one or more embodiments. While the flowchart of FIG. 15 illustrates exemplary functionality performed by the distribution service 174 with respect to a single client device 120, it is understood that the exemplary functionality of the distribution service 174 may be simultaneously performed with respect to more than one client device 120.

Beginning with step 1503, the distribution service 174 identifies a client device 120 with access to one or more resources 165 associated with the distribution service 174 that are accessible through a containerized client side application 126 on the client devices 120. Resources 165 may be identified as accessible through a containerized client side application 126 if the resources 165 are associated with metadata specifying that the resources 165 may only be accessed on the client device 120 through a containerized client side application 126. Additionally, resources 165 may be identified as associated with the distribution service 174 if one or more copies of the resources 165 are stored on the data store 153 of the distribution server 150. In one embodiment, the distribution service 174 may call the client device 120 to query its data store 122 to determine whether one or more resources 165 stored on the data store 122 are associated with the distribution service 174. In another embodiment, the distribution service 174 may transmit a listing of resources 165 stored by the distribution service 174 to the client device 120 and request a response specifying whether one or more of the listed resources 165 reside on data store 122 of the client device 120.

Next, in step 1506, the distribution service 174 identifies one or more distribution rules 171 (FIG. 1) that are associated with the identified resources 165. In particular, the distribution rules 171 may include location rules 181 (FIG. 1) and/or time rules 191 (FIG. 1). Additionally, a resource 165 may be associated with one or more distribution rules 171, and a distribution rule 171 may be associated with one or more resources 165. In one embodiment, the distribution service 174 may determine whether the identified resources 165 are associated with distribution rules 171 that are stored on the data store 153 of the distribution server 150. In another embodiment, the distribution service 174 may request to query the data store 122 of the client device 120 to determine whether the contents of its data store 122 contains distribution rules 171 associated with the identified resources 165. Upon identifying one or more distribution rules 171 associated with the identified resources 165, the distribution service 174 proceeds to step 1509 and determines whether the identified distribution rules 171 include any location rules 181 and/or time rules 191.

If the distribution service 174 determines that the distribution rules 171 include location rules 181, the distribution service 174 proceeds to step 1512 to identify the location information 133 associated with the client device 120. Similarly, if the distribution service 174 determines that the distribution rules 171 include time rules 191, the distribution service 174 proceeds to step 1512 to identify the time information 143 associated with the client device 120. In one embodiment, the distribution service 174 may identify location information 133 and/or time information 143 from the device profile 123 of the client device 120. In another embodiment, the distribution service 174 may identify location information 133 and/or time information 143 based at least in part on network 110 (FIG. 10) data, as previously described. However, if the distribution service 174 determines that the distribution rules 171 neither include location rules 181 nor time rules 171, then the distribution service 174 may proceed to step 1515.

Next, in step 1515, the distribution service 174 determines whether the client device 120 complies with the distribution rules 171 associated with each one of the identified resources 165, including any identified location rules 181 and/or time rules 191. In one embodiment, the distribution service 174 may determine whether the client device 120 is compliant based on the device profile 123 of the client device 120. For instance, the distribution service 174 may call the client side application 126 of the client device 120 to retrieve the device profile 123 of the client device 120. In another embodiment, the distribution service 174 may determine whether the client device 120 is compliant with the distribution rules 171 based on location information 133 and/or time information 143 identified by the distribution service 174.

If the distribution service 174 determines that the client device 120 is compliant with the distribution rules 171 associated with the identified resources 165, then the distribution service 174 proceeds to step 1518 and provides continued access to the resources 165 on the client device 120. In one embodiment, the distribution service 174 may call the client device 120 to instruct the client side application 126 to continue to provide access to the resources 165. In another embodiment, the distribution service 174 may take no action and rather allow the client side application 126 of the client device 120 to continue to provide access to the resources 165 without instruction from the distribution service 174.

Returning to step 1515, if the distribution service 174 determines that the client device 120 does not comply with the distribution rules 171 such as the location rules 181 and the time rules 191, then the distribution service 174 proceeds to step 1521 and removes the identified resources 165 from the client device 120. In one embodiment, the distribution service 174 may remove the identified resources 165 from the client device 120 by instructing the client device 120 to delete the identified resources 165 from the client device 120. In another embodiment, the distribution service 174 may remove the identified resources 165 from the client device 120 by instructing the client device 120 to configure the resources 165 to be inaccessible and/or invisible to the client device 120. In yet another embodiment, the distribution service 174 may remove the identified resources 165 from the client device 120 by instructing the client device 120 to restore the client device 120 its default state. In yet another embodiment, the distribution service 174 may remove the identified resources 165 from the client device 120 by instructing the client device 120 to delete all data residing on the client device 120.

Additionally, in step 1524, the distribution service 174 transmits a notification of noncompliance to the client device 120. In one embodiment, the distribution service 174 may transmit a notification of noncompliance to the client device 120 that specifies one or more identified resources 165 and specifies that such identified resources 165 have been deleted from the client device 120 due to noncompliance with the distribution rules 171 associated with the identified resources 165. In another embodiment, in the event that location rules 181 and/or time rules 191 associated with the identified resources 165 are not satisfied by the client device 120, the distribution service 174 may transmit a notification of noncompliance to the client device 120 that further specifies the locations and times when the client device 120 may access the identified resources 165 based on the location rules 181 and/or time rules 191 associated with the resources 165.

While the distribution service 174 may determine that the client device 120 currently complies and/or does not currently comply with the distribution rules 171, the client device 120 may cease to comply and/or begin to comply with the distribution rules 171 due to changes to the state of the client device 120 over time. For instance, as the location information 133 and/or time information 143 associated with the client device 120 may change based on any changes to the location of the client device 120 or the current time associated with the client device 120, the client device 120 may become or cease to be authorized for access to resources 165. Thus, to ensure the ongoing security of the resources 165, the client side application 126 may continuously determine whether the client device 120 is authorized to access the resources 165 by returning to step 1603 after either providing access to the resources 165 in step 1621 or denying access to the resources 165 in steps 1624 and 1627.

Figure 16:
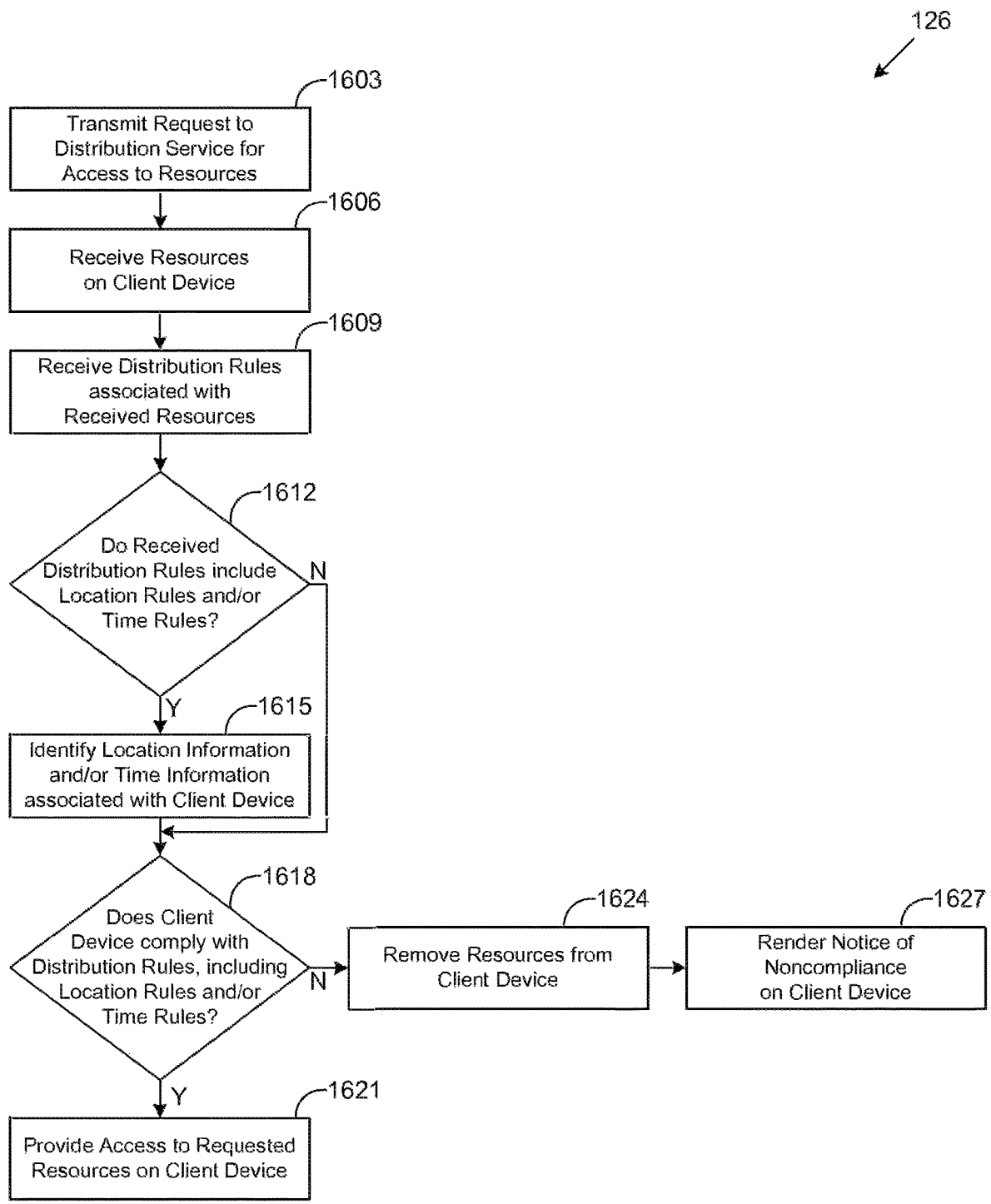
FIG. 16 is a flowchart illustrating exemplary functionality performed by a client side application executed by a client device in the networked environment of FIG. 1 according to certain embodiments of the present disclosure.

FIG. 16 is a flowchart illustrating exemplary functionality performed by a client side application 126 (FIG. 1) executed by a client device 120 (FIG. 1) according to certain embodiments. It is understood that the flowchart of FIG. 16 provides merely an example of the many different types of functional arrangements that may be employed to implement the operation of the client side application 126 as described herein. As an alternative, the flowchart of FIG. 16 may be viewed as depicting an example of steps of a method implemented in the client device 120 according to one or more embodiments.

Beginning with step 1603, the client side application 126 transmits a request 177 (FIG. 1) to the distribution service 174 (FIG. 1) to access resources 165 (FIG. 1). In one embodiment, the request 177 may include user credentials 132 (FIG. 1) associated with the user of the client device 120 and a device identifier 135 (FIG. 1) associated with the client device 120. For instance, the client side application 126 may populate the request 177 by prompting the user of the client device 120 to provide user credentials 132 associated with the distribution service 174 and may identify the device identifier 135 associated with the client device 120 from the device profile 123 (FIG. 1) of the client device 120. In another embodiment, the request 177 may include the device profile 123 (FIG. 1) associated with the client device 120, as previously described.

Next, in step 1606, the client device 120 receives a transmission of one or more resources 165 from the distribution service 174. In one embodiment, the client device 120 may receive each of the resources 165 associated with the request 177 previously transmitted to the distribution service 174. In another embodiment, the client device 120 may only receive the resources 165 associated with the request 177 that client device 120 is authorized to access. For instance, the client device 120 may receive resources 165 that distribution service 174 has determined that the client device 120 is authorized to access based on elements of the request 177, such as user credentials 132 associated with the user of the client device 120 and a device identifier 135 associated with the client device 120.

Additionally, in step 1609, the client side application 126 receives one or more distribution rules 171 (FIG. 1) associated with the resources 165 received from the distribution service 174. In particular, each resource 165 may be associated with one or more distribution rules 171, and each distribution rule 171 may be associated with one or more resources 165. For instance, a video resource 165 may be associated with a location rule 181 and a time rule 191 specific to a board meeting, and the same location rule 181 may be associated the video resource 165, a picture resource 165 and a document resource 165.

Upon receiving the distribution rules 171, in step 1612, the client side application 126 determines whether the distribution rules 171 received from the distribution service 174 include any location rules 181 and/or time rules 191. If the client side application 126 determines that the distribution rules 171 include location rules 181, then the client side application 126 proceeds to step 1615 to identify the location information 133 associated with the client device 120. Similarly, if the client side application 126 determines that the distribution rules 171 include time rules 191, then the client side application 126 proceeds to step 1615 to identify the time information 143 associated with the client device 120. In one embodiment, the client side application 126 may identify the location information 133 and/or time information 143 from the device profile 123 associated with the client device 120. In another embodiment, the client side application 126 may identify the location information 133 and/or time information 143 based at least in part on network 110 (FIG. 10) data, as previously described. On the contrary, if the client side application 126 determines that the distribution rules 171 include neither location rules 181 nor time rules 171, then the client side application 126 may proceed to step 1618 without identifying the location information 133 and/or time information 143 associated with the client device 120.

Next, in step 1618, the client side application 126 determines whether the client device 120 complies with the distribution rules 171 associated with each one of the resources 165, including any identified location rules 181 and/or time rules 191. In one embodiment, the client side application 126 may determine whether the client device 120 is compliant based on the device profile 123 associated with the client device 120. For example, the client side application 126 may determine whether the client device 120 is compliant with the distribution rules 171 based on location information 133 and/or time information 143 stored in the device profile 123 of the client device 120.

If the client side application 126 determines that the client device 120 is compliant with the distribution rules 171 associated with the resources 165, then the client side application 126 proceeds to step 1621 and provides the client device 120 with access to the resources 165. On the contrary, if the client side application 126 determines that the client device 120 does not comply with the distribution rules 171 associated with the resources 165, then the client side application 126 proceeds to step 1624 and removes the resources 165 from the client device 120. In one embodiment, the client side application 126 may remove the resources 165 from the client device 120 by deleting the resources 165 from the client device 120. In another embodiment, the client side application 126 may remove the resources 165 from the client device 120 by configuring the resources 165 to be inaccessible and/or invisible to the client device 120. In yet another embodiment, the client side application 126 may remove the resources 165 from the client device 120 by restoring the client device 120 to its default state. In yet another embodiment, the client side application 126 removes the resources 165 from the client device 120 by removing all data from the client device 120.

Additionally, in step 1627, the client side application 126 renders a notice of noncompliance on the client device 120. In one embodiment, the client side application 126 may render a notification of noncompliance that specifies the identities of the removed resources 165 and specifies that the resources 165 have been removed from the client device 120 due to noncompliance with the distribution rules 171 associated with the resources 165. In another embodiment, the client side application 126 may render a notification of noncompliance on the client device 120 that further specifies the locations and times when the client device 120 may access the identified resources 165 based on the location rules 181 and/or time rules 191 associated with the resources 165.

While the client side application 126 may determine that the client device 120 currently complies with the distribution rules 171 associated with the resources 165, the client device 120 may cease to comply with the distribution rules 171 based on changes to the state of the client device 120 over time. Similarly, while the client side application 126 may determine that the client device 120 currently does not currently comply with the distribution rules 171 associated with the resources 165, the client device 120 may begin to comply with the distribution rules 171 based on changes to the state of the client device 120 over time. For instance, as the location information 133 associated with the client device 120 may change over time based on changes to the location of the client device 120, the client device 120 may either become authorized for access to the resources 165 or may cease to be authorized for access to resources 165. Additionally, as the time information 143 associated with the client device 120 may change overtime based on changes to current time associated with the client device 120, the client device 120 may either become authorized for access to the resources 165 or may cease to be authorized for access to resources 165. Thus, to ensure the ongoing security of the resources 165, the client side application 126 may continuously determine whether the client device 120 is authorized to access the resources 165 by returning to step 1603 after either providing access to the resources 165 in step 1621 or denying access to the resources 165 in steps 1624 and 1627.

Figure 17:
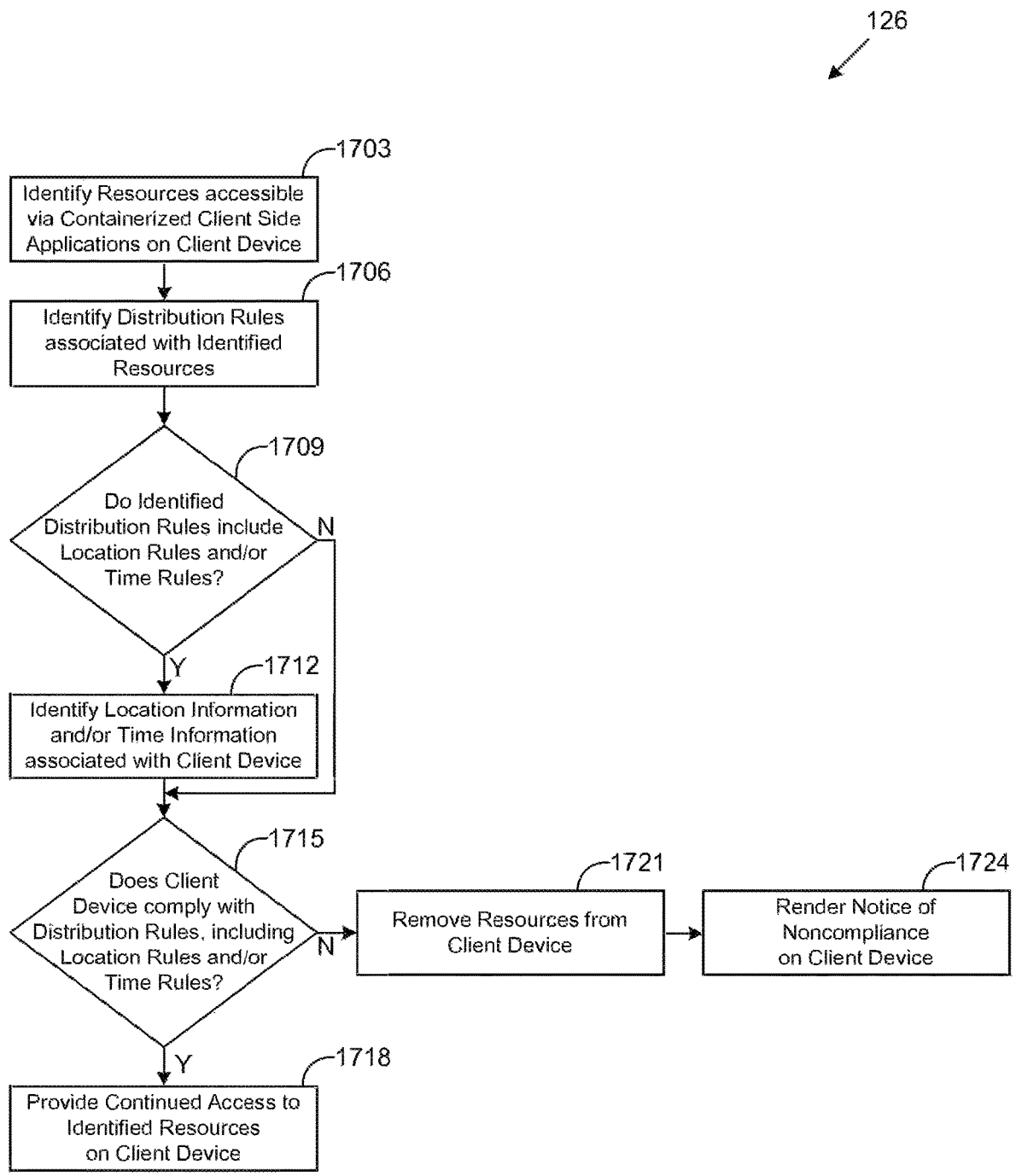
FIG. 17 is a flowchart illustrating exemplary functionality performed by a client side application executed by a client device in the networked environment of FIG. 1 according to certain embodiments of the present disclosure.

FIG. 17 is a flowchart illustrating exemplary functionality performed by a client side application 126 (FIG. 1) according to certain embodiments. It is understood that the flowchart of FIG. 17 provides merely an example of the many different types of functional arrangements that may be employed to implement the operation of the client side application 126 as described herein. As an alternative, the flowchart of FIG. 17 may be viewed as depicting an example of steps of a method implemented in the client device 120 (FIG. 1) according to one or more embodiments.

Beginning with step 1703, the client side application 126 identifies one or more resources 165 associated with the distribution service 174 (FIG. 1) that are accessible through a containerized client side application 126 on the client device 120. Resources 165 may be identified as accessible through a containerized client side application 126 if the resources 165 are associated with metadata specifying that the resources 165 may only be accessed on the client device 120 through a containerized client side application 126. Additionally, resources 165 may be identified as associated with the distribution service 174 if one or more copies of the resources 165 are stored on the data store 153 of the distribution server 150. In one embodiment, the client side application 126 may call the distribution service 174 to query the data store 153 of the distribution server 150 to determine whether one or more resources 165 stored on the data store 153 reside on the client device 120. In another embodiment, the client side application 126 may transmit a listing of resources 165 stored by the client device 120 to the distribution service 174 and request a response specifying whether one or more of the listed resources 165 reside on data store 153 of the distribution server 150.

Next, in step 1706, the client side application 126 identifies the distribution rules 171 (FIG. 1) that are associated with the identified resources 165. In particular, the distribution rules 171 may include location rules 181 (FIG. 1) and/or time rules 191 (FIG. 1). Additionally, a resource 165 may be associated with one or more distribution rules 171, and a distribution rule 171 may be associated with one or more resources 165. In one embodiment, the client side application 126 may determine whether distribution rules 171 associated with the identified resources 165 reside on the client device 120. In another embodiment, the client side application 126 may call the distribution service 174 to query the data store 153 of the distribution server 150 to determine whether the contents of its data store 153 contain distribution rules 171 associated with the identified resources 165. Upon identifying one or more distribution rules 171 associated with the identified resources 165, the client side application 126 proceeds to step 1709 and determines whether the identified distribution rules 171 include any location rules 181 and/or time rules 191.

If the client side application 126 determines that the distribution rules 171 include location rules 181, then the client side application 126 proceeds to step 1712 to identify the location information 133 associated with the client device 120. Similarly, if the client side application 126 determines that the distribution rules 171 include time rules 191, then the client side application 126 proceeds to step 1615 to identify the time information 143 associated with the client device 120. In one embodiment, the client side application 126 may identify the location information 133 and/or time information 143 from the device profile 123 associated with the client device 120. In another embodiment, the client side application 126 may identify the location information 133 and/or time information 143 based at least in part on network 110 (FIG. 10) data, as previously described. On the contrary, if the client side application 126 determines that the distribution rules 171 include neither location rules 181 nor time rules 171, then the client side application 126 may proceed to step 1715 without identifying the location information 133 and/or time information 143 associated with the client device 120.

Next, in step 1715, the client side application 126 determines whether the client device 120 complies with the distribution rules 171 associated with each one of the resources 165, including any identified location rules 181 and/or time rules 191. In one embodiment, the client side application 126 may determine whether the client device 120 is compliant based on the device profile 123 associated with the client device 120. In another embodiment, the client side application 126 may determine whether the client device 120 is compliant based on location information 133 and/or time information 143 associated with the client device 120 identified by the client side application 126.

If the client side application 126 determines that the client device 120 is compliant with the distribution rules 171 associated with the resources 165, then the client side application 126 proceeds to step 1621 and provides the client device 120 with access to the resources 165. On the contrary, if the client side application 126 determines that the client device 120 does not comply with the distribution rules 171 associated with the resources 165, then the client side application 126 proceeds to step 1624 and removes the resources 165 from the client device 120. In one embodiment, the client side application 126 may remove the resources 165 from the client device 120 by deleting the resources 165 from the client device 120. In another embodiment, the client side application 126 may remove the resources 165 from the client device 120 by configuring the resources 165 to be inaccessible and/or invisible to the client device 120. In yet another embodiment, the client side application 126 may remove the resources 165 from the client device 120 by restoring the client device 120 to its default state. In yet another embodiment, the client side application 126 removes the resources 165 from the client device 120 by removing all data from the client device 120.

Additionally, in step 1724, the client side application 126 renders a notice of noncompliance on the client device 120. In one embodiment, the client side application 126 may render a notification of noncompliance that specifies the identities of the removed resources 165 and specifies that the resources 165 have been removed from the client device 120 due to noncompliance with the distribution rules 171 associated with the resources 165. In another embodiment, the client side application 126 may render a notification of noncompliance on the client device 120 that further specifies the locations and times when the client device 120 may access the identified resources 165 based on the location rules 181 and/or time rules 191 associated with the resources 165.

While the client side application 126 may determine that the client device 120 currently complies with the distribution rules 171 associated with the resources 165, the client device 120 may cease to comply with the distribution rules 171 based on changes to the state of the client device 120 over time. Similarly, while the client side application 126 may determine that the client device 120 currently does not currently comply with the distribution rules 171 associated with the resources 165, the client device 120 may begin to comply with the distribution rules 171 based on changes to the state of the client device 120 over time. For instance, as the location information 133 associated with the client device 120 may change over time based on changes to the location of the client device 120, the client device 120 may either become authorized for access to the resources 165 or may cease to be authorized for access to resources 165. Additionally, as the time information 143 associated with the client device 120 may change overtime based on changes to current time associated with the client device 120, the client device 120 may either become authorized for access to the resources 165 or may cease to be authorized for access to resources 165. Thus, to ensure the ongoing security of the resources 165, the client side application 126 may continuously determine whether the client device 120 is authorized to access the resources 165 by returning to step 1703 after either providing continued access to the resources 165 in step 1718 or denying access to the resources 165 in steps 1721 and 1724.

FIG. 18 shows schematic block diagrams of an exemplary distribution server 150 and an exemplary client device 120 according to an embodiment of the present disclosure. The distribution server 150 includes at least one processor circuit, for example, having a processor 1803 and a memory 1806, both of which are coupled to a local interface 1809. To this end, the distribution server 150 may comprise, for example, at least one server computer or like device. Similarly, the client device 120 includes at least one processor circuit, for example, having a processor 1853 and a memory 1856, both of which are coupled to a local interface 1859. Additionally, the client device 120 may be in data communication with a display 136 for rendering user interfaces 137 (FIG. 1) and one or more other I/O devices 1863 for inputting and outputting data. To this end, the client device 120 may comprise, for example, at least one client computer or like device.

The following is a general discussion of the components of the distribution server 150 and the client device 120. The local interface 1809 and 1859 may comprise, for example, a data bus with an accompanying address/control bus or other bus structure as can be appreciated. Stored in the memory 1806 and 1856 are both data and several components that are executable by the processors 1803 and 1853. In particular, with regard to the distribution server 150, stored in the memory 1806 and executable by the processor 1803 are a distribution service 174 and potentially other applications. Additionally, with regard to the client device 120, stored in the memory 1856 and executable by the processor 1853 are a client side application 126 and potentially other applications. Also stored in the memory 1806 and 1856 may be a data store 153 and 122 and other data. In addition, an operating system may be stored in the memory 1806 and 1856 and executable by the processor 1803 and 1853.

It is to be understood that there may be other applications that are stored in the memory 1806 and 1856 and are executable by the processor 1803 and 1853 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 1806 and 1856 and are executable by the processor 1803 and 1853. In this respect, the term "executable" means a program file that is in a form that can ultimately be run by the processor 1803 and 1853. Examples of executable programs may be, for example, a compiled program that can be translated into machine code in a format that can be loaded into a random access portion of the memory 1806 and 1856 and run by the processor 1803 and 1853, source code that may be expressed in proper format such as object code that is capable of being loaded into a random access portion of the memory 1806 and 1856 and executed by the processor 1803 and 1853, or source code that may be interpreted by another executable program to generate instructions in a random access portion of the memory 1806 and 1856 to be executed by the processor 1803 and 1853, etc. An executable program may be stored in any portion or component of the memory 1806 and 1856 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1806 and 1856 are defined herein as including both volatile and nonvolatile memory and data storage components. Volatile components are those that do not retain data values upon loss of power. Nonvolatile components are those that retain data upon a loss of power. Thus, the memory 1806 and 1856 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1803 and 1853 may represent multiple processors, and the memory 1806 and 1856 may represent multiple memories that operate in parallel processing circuits, respectively. In such a case, the local interface 1809 and 1859 may be an appropriate network 110 (FIG. 1) that facilitates communication between any two of the multiple processor 1803 and 1853, or between any two of the memory 1806 and 1856, etc. The local interface 1809 and 1859 may comprise additional systems designed to coordinate this communication, including, for example, performing load balancing. The processor 1803 and 1853 may be of electrical or of some other available construction.

Although the distribution service 174, client side application 126, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 8, 9, 14, 15, 16, and 17 show certain functionality and operations performed by the distribution service 174 and client side application 126, respectively. If embodied in software, each box may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1803 and 1853 in a computer system or other system. The machine code may be converted from the source code, etc. If embodied in hardware, each block may represent a circuit or a number of interconnected circuits to implement the specified logical function(s).

Although the flowcharts of FIGS. 8, 9, 14, 15, 16, and 17 show a specific order of execution, it is understood that the order of execution may differ from that which is depicted. For example, the order of execution of two or more steps may be scrambled relative to the order shown. Also, two or more blocks shown in succession in FIGS. 8, 9, 14, 15, 16, and 17 may be executed concurrently or with partial concurrence. Further, in some embodiments, one or more of the steps shown in FIGS. 8, 9, 14, 15, 16, and 17 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the distribution service 174 and the client side application 126, that comprises software or code can be embodied in any non-transitory computer-readable medium for use by or in connection with an instruction execution system such as, for example, a processor 1803 and 1853 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising code that, when executed by the computing device, causes the computing device to at least:

transmit a request to access a plurality of resources at a distribution service;

receive, from the distribution service, the plurality of resources and a plurality of location rules associated with the plurality of resources;

determine an authorized location and an authorized perimeter area associated with the authorized location based on the plurality of location rules associated with the plurality of resources, the authorized location and the authorized perimeter area are determined to have different access rights to the plurality of resources;

determine a location of the computing device; and grant access to a resource among the plurality of resources for the computing device based on the location of the computing device with respect to the authorization location or the authorized perimeter area.

2. The non-transitory computer-readable medium of claim 1, wherein the program comprising code that, when executed by the computing device, further causes the computing device to at least:

detect a change of the location of the computing device from the authorized location to the authorized perimeter area; and remove access to the resource based on the change of the location of the computing device to the authorized perimeter area.

3. The non-transitory computer-readable medium of claim 2, wherein removing access to the resource comprises deleting the resource from a memory of the computing device.

4. The non-transitory computer-readable medium of claim 2, wherein the program comprising code that, when executed by the computing device, further causes the computing device to at least:

display a non-compliance notification on the computing device based on removing access the resource, the notification indicating that a respective location rule associated with the resource has been violated.

5. The non-transitory computer-readable medium of claim 1, wherein determining the location of the computing device is further based on a signal strength of a transmission signal from a network beacon.

6. The non-transitory computer-readable medium of claim 1, wherein the authorized perimeter area encompasses the authorized location.

7. The non-transitory computer-readable medium of claim 1, wherein determining the location of the computing device is further based on a previously known location of the computing device and movement sensor data obtained from a movement sensor electrically coupled to the computing device.

8. A system, comprising:

a computing device; and a memory device including instructions that when executed by the computing device cause the computing device to at least:

transmit a request to access a plurality of resources at a distribution service;

receive, from the distribution service, the plurality of resources and a plurality of location rules associated with the plurality of resources;

determine an authorized location and an authorized perimeter area associated with the authorized location based on the plurality of location rules associated with the plurality of resources, the authorized location and the authorized perimeter area are determined to have different access rights to the plurality of resources;

determine a location of the computing device; and grant access to a resource among the plurality of resources for the computing device based on the location of the computing device with respect to the authorization location or the authorized perimeter area.

9. The system of claim 8, wherein the instructions, when executed by the computing device, cause the computing device to at least:

detect a change of the location of the computing device from the authorized location to the authorized perimeter area; and remove access to the resource based on the change of the location of the computing device to the authorized perimeter area.

10. The system of claim 9, wherein removing access to the resource comprises deleting the resource from a memory of the computing device.

11. The system of claim 9, wherein the instructions, when executed by the computing device, cause the computing device to at least:

display a non-compliance notification on the computing device based on removing access the resource, the notification indicating that a respective location rule associated with the resource has been violated.

12. The system of claim 8, wherein determining the location of the computing device is further based on a signal strength of a transmission signal from a network beacon.

13. The system of claim 8, wherein the authorized perimeter area encompasses the authorized location.

14. The system of claim 8, wherein determining the location of the computing device is further based on a previously known location of the computing device and movement sensor data obtained from a movement sensor electrically coupled to the computing device.

15. A method, comprising:

transmitting, using a client device, a request to access a plurality of resources at a distribution service;

receiving, using the client device, from the distribution service, the plurality of resources and a plurality of location rules associated with the plurality of resources;

determining, using the client device, an authorized location and an authorized perimeter area associated with the authorized location based on the plurality of location rules associated with the plurality of resources, the authorized location and the authorized perimeter area are determined to have different access rights to the plurality of resources;

determining, using the client device, a location of the computing device; and granting, using the client device, access to a resource among the plurality of resources for the computing device based on the location of the computing device with respect to the authorization location or the authorized perimeter area.

16. The method of claim 15, further comprising:

detecting, using the client device, a change of the location of the computing device from the authorized location to the authorized perimeter area; and removing, using the client device, access to the resource based on the change of the location of the computing device to the authorized perimeter area.

17. The method of claim 16, wherein removing access to the second resource comprises deleting the resource from a memory of the computing device.

18. The method of claim 16, further comprising:
   displaying, using the client device, a non-compliance notification on the computing device based on removing access the resource, the notification indicating that a respective location rule associated with the resource has been violated.

19. The method of claim 15, wherein determining the location of the computing device is further based on a signal strength of a transmission signal from a network beacon.

20. The method of claim 15, wherein the authorized perimeter area encompasses the authorized location.

\* \* \* \* \*